(12) United States Patent
Kurobe et al.

(10) Patent No.: US 6,333,948 B1
(45) Date of Patent: Dec. 25, 2001

(54) VIDEO CODING APPARATUS, VIDEO CODING METHOD AND STORAGE MEDIUM CONTAINING VIDEO CODING PROGRAM

(75) Inventors: Akio Kurobe, Tondabayashi; Shoichi Masaki, Katano, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/247,081

(22) Filed: Feb. 9, 1999

(30) Foreign Application Priority Data

Feb. 9, 1998 (JP) .................................................. 10-26944

(51) Int. Cl.[7] ...................................................... H04N 7/36
(52) U.S. Cl. ............................... 375/240.13; 375/240.24; 375/240.27
(58) Field of Search ..................... 348/415.1; 375/240.13, 375/240.27, 240.24; H04N 7/36

(56) References Cited

U.S. PATENT DOCUMENTS 5,729,295 * 3/1998 Okada .............................. 375/240.13
6,037,987 * 3/2000 Sethuraman ...................... 375/240.13
6,160,848 * 12/2000 Sivan ............................... 375/240.13
6,259,736 * 7/2001 Chujoh et al. ................... 375/240.13

FOREIGN PATENT DOCUMENTS 5-236464    9/1993   (JP) .............................. H04N/7/137

* cited by examiner

*Primary Examiner*—Howard Britton
(74) *Attorney, Agent, or Firm*—Wenderoth, Lind & Ponack, L.L.P.

(57) ABSTRACT

In a video coding apparatus coding a motion picture while switching a coding mode between an INTER coding mode and an INTRA coding mode, a motion information management part determines whether or not there is motion exceeding a prescribed threshold in an object in each region of m groups of blocks in each frame of the motion picture during a lapse of a prescribed time T from a prescribed point. On the basis of the result of this determination, a whole-group refresh part performs whole-group refresh (INTRA coding in one frame) on a group of blocks of a region having motion exceeding the threshold, and a dispersed refresh part performs dispersed refresh (INTRA coding in frames varying with the block) on a group of blocks of a region having no motion exceeding the threshold. Thus, appearance of a disturbance line is avoided and influence by a transmission error is eliminated in a short time while reducing increase of a coding quantity resulting from refresh.

98 Claims, 33 Drawing Sheets

ARRAY REF: | CLASSIFICATION OF GOB1 | CLASSIFICATION OF GOB2 | CLASSIFICATION OF GOB3 | ---------- | CLASSIFICATION OF GOB12 |

1:WHOLE-GROUP REFRESH
0:DISPERSED REFRESH

START
↓
LIMIT MOTION VECTOR SEARCH RANGE NOT TO MAKE REFERENCE FROM UNREFRESHED REGION IN WHOLE-GROUP REFRESH REGION
↓
END

VIDEO CONFERENCE

WIRELESS VIDEO MONITORING

VIDEO SERVER         PC

INTERNET VIDEO DISTRIBUTION

FIG. 35 PRIOR ART
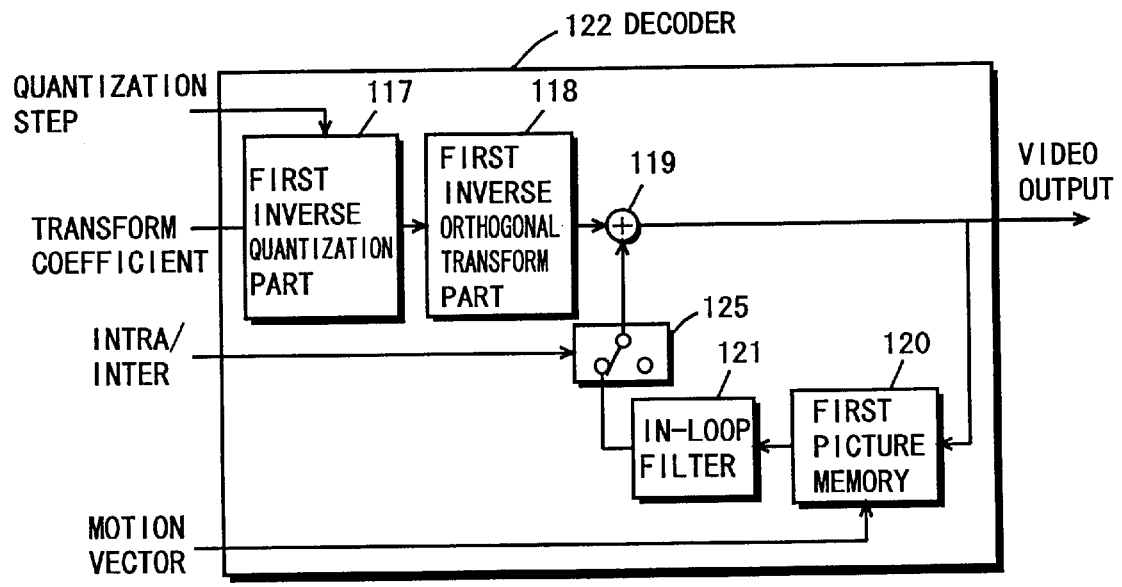
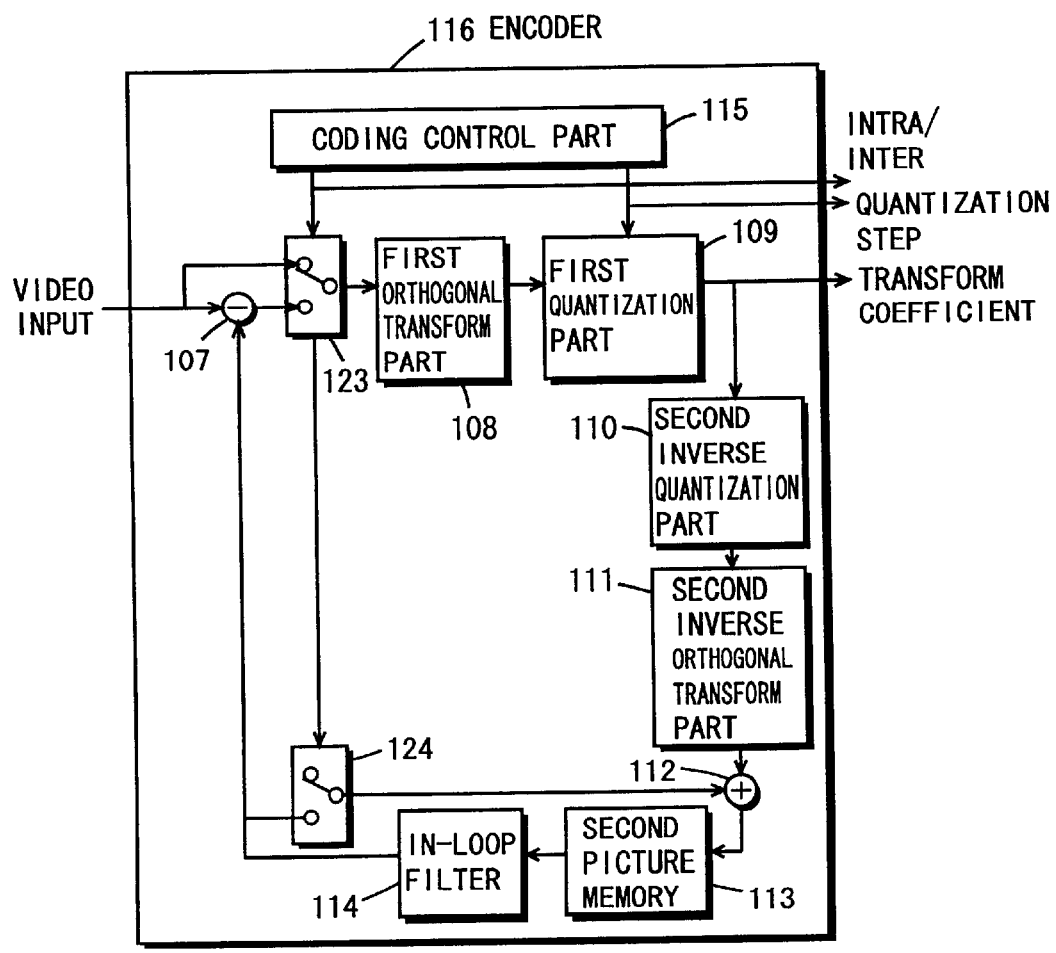

VIDEO CODING APPARATUS, VIDEO CODING METHOD AND STORAGE MEDIUM CONTAINING VIDEO CODING PROGRAM

BACKGROUND OF THE INVENTION

1. Field of the Invention

The present invention relates to a video coding apparatus and a video coding method for compression-coding a video signal in high efficiency and transmitting the same, and more particularly, it relates to refresh of video coding for eliminating influence caused by a transmission error in a reproduced picture.

2. Description of the Background Art

As the field of application of the technique of compression coding a video signal in high efficiency and transmitting the same, a visual telephone or a video conference shown in FIG. 34A is general. Further, application to a system shown in FIG. 34B for transmitting a video signal through digital radio communication utilizing a transmission path of wireless LAN for monitoring a danger point or transmitting a picture between mobiles, and application to picture distribution utilizing Internet shown in FIG. 34C are expected.

In the case of wireless monitoring, it is indispensable to compression-code the picture signal in high efficiency for efficiently utilizing the frequency band in view of effective use of wireless resources, and the communication quality represented by the error rate lowers by at least two or three digits as compared with a cable system. Therefore, the wireless monitoring is readily influenced by an error when performing high-efficiency compression coding omitting redundant information, and hence it is indispensable to improve error resistance by devising a refresh method or the like as described later. Dissimilarly to the visual telephone, transmission of picture information is generally unidirectional from a camera side to a monitor side in the case of monitoring, and the range of utilization rather widens when the refresh functions through a unidirectional transmission path.

A portable visual telephone employing digital radio communication such as PHS (Personal Handyphone System) is also assumed. In this case, a bidirectional transmission path can be ensured although the quality is inferior as compared with the cable system.

Also in the case of Internet, the Internet network presupposes the best effort, there is no guarantee on the quality of a packet waste rate or the like, and it is indispensable to consider effective utilization of resources and processing against packet loss. In the case of Internet, a bidirectional communication path is ensured and hence a method presupposing bidirectionality can be utilized in 1:1 transmission system. However, in the case of a broadcasting type 1:multiple transmission system, there is such a problem that processing of feedback information on the server side concentrates and hence the range of utilization rather widens when the refresh unidirectionally functions. Further, such a case that the server side is storage information is also assumed in the case of Internet, and hence feedback information cannot be utilized since processing of coding has been ended before the communication time.

In general, there has been devised a method of transmitting coded data with an error detection code on the coding side when a feedback path is included in the communication path and, if an error is detected when the decoding side performs error detection of the received data, noticing the coding side this error through the feedback path so that the coding side INTRA-codes and refreshes all coding after the notice of the error. ITU-T recommendation H.261 standardizes this error notice as a screen update request.

With reference to video coding in a video conference or a visual telephone, the conventional video coding method is now described in detail.

Generally in coding of a video conference or visual telephone signal, it is general to employ coding which combines inter-picture coding utilizing frame-to-frame correlation and intra-picture coding with each other along the frame direction. A television image formed by 30 pictures (frames) per second has large correlation along the time axis direction, and if employing pixels on the same position of a screen precedent by one frame for prediction through Inter-frame correlation, it follows that most ideal prediction can be performed when the screen is still. In INTER coding, however, Inter-frame correlation contrarily lowers if there is motion in the screen, resulting in being rather lower even as compared with correlation between adjacent pixels in a field. On the other hand, each pixel of a picture signal per frame has small level change with respect to an adjacent pixel and its correlation is strong. It is assumed that its self correlation function can be approximated by a negative exponential function. At this time, Power spectral density which is Fourier transform of the self correlation function has a property of being maximized at a zero frequency component (i.e., dc component) and monotonously decreasing as the frequency component increases. While Fourier transform is best known as orthogonal transform to a frequency region, the Fourier transform includes complex number calculation and its structure is complicated, and hence it is general to employ two-dimensional DCT (Discrete Cosine Transform) in coding of pictures as substitute orthogonal transform. After a transform coefficient decomposed into frequency components by DCT is quantized to a level zero which is an uncoded transform coefficient (zero value of the coded coefficient) and to a level $\pm K$ from a level $\pm 1$ which are non-zero values of the coded coefficient taking discrete quantization representative values, run-length coding for coding the number of successive zeros preceding the coded coefficient and Huffman coding for allocating variable length codes in response to the originating rate of the level of the non-zero value of the coded coefficient are performed, whereby video data are compressed.

For example, ITU-T recommendation H.261 applies motion compensation inter-picture coding to a picture having small motion while performing coding shown below on a prediction error between frames. Further, no inter-picture coding is applied to a picture having large motion but the following coding is directly performed on frame pixels. FIG. 35 shows an encoder and a decoder for video data according to H.261.

As shown in FIG. 35, an encoder 116 for video data according to H.261 comprises a subtraction part 107, a first orthogonal transform part 108 performing two-dimensional cosine transform, a first quantization part 109, a second inverse quantization part 110, a second inverse orthogonal transform part 111, an addition part 112, a second picture memory 113 for motion compensation, an in-loop filter 114, a coding control part 115 and selectors 123 and 124.

On the other hand, a decoder 122 comprises a first inverse quantization part 117, a first inverse orthogonal transform part 118, an addition part 119, a first picture memory 120 for motion compensation, an in-loop filter 121 and a selector 125.

The encoder 116 calculates by the subtraction part 107 a prediction error between frames by taking the difference between a video input signal previously transformed to CIF (Common Intermediate Format) of 352 by 288 dots and prediction data stored in the second picture memory 113 for motion compensation. At this time, motion in the range of 15 by 15 pixels is motion-compensated by specifying the prediction data as an arbitrary block of 16 by 16 pixels among 16 by 16 pixels around the block. The motion quantity is specified by a two-dimensional motion vector and transmitted to the decoder along with the video data. The decoding side decodes data of the picture memory for motion compensation in a region displaced from a decoding block by this motion vector as prediction data. For such large motion that no motion compensation is effective, INTRA coding with no prediction is selected by the selectors 123 and 124. The prediction error and the frame pixels are divided into blocks of 8 pixels by 8 lines, and two-dimensional cosine transform is performed on each block in the first orthogonal transform part 108. The pixels of each block are transformed to frequency components by the DCT. The obtained transform coefficients are quantized in the first quantization part 109. By the quantization, the respective transform coefficients are represented from the level 0 of the zero value of the coded coefficient to levels of non-zero values of the coded coefficient which are integers up to a level ±127. The quantized data, transmitted to the decoder through a communication part or the like, is inverse-transformed by the second inverse quantization part 110 and the second inverse orthogonal transform part 111 at the same time, thereafter added to the prediction data stored in the second picture memory 113 for motion compensation by the addition part 112, and stored in the second picture memory 113 for motion compensation to be next prediction data. The decoder 122 inverse-transforms the inputted video data through the first inverse quantization part 117 and the first inverse orthogonal transform part 118, thereafter adds the same to the prediction data stored in the first picture memory 120 for motion compensation through the adder 119, and obtains a video output while storing the same as next prediction data in the first picture memory 120 for motion compensation. When an input block is INTRA data, no prediction data is selected by the selector 125 but the input data is directly inverse-transformed, extracted as a video output, and stored in the picture memory for motion compensation.

The above is exemplary predictive coding of a video signal, particularly coding which combines inter-picture coding and intra-picture coding. In INTER coding, mismatch is caused between the contents of frame memories of the coding side and the decoding side when a transmission error is occurred, and hence influence of the error propagates to all subsequent reproduced pictures. Therefore, it is necessary to transmit INTRA-coded video data for refreshing the reproduced pictures.

INTRA coding, which is coding utilizing no correlation between frames, has an enormous coding quantity as compared with INTER coding. When transmitting a frame in which all blocks are INTRA-coded for refresh, therefore, it takes time for transmission and hence a delay time increases. In general, therefore, means of dividing one frame into a plurality of groups of blocks and refreshing a group of blocks every frame by INTRA coding thereby reducing increase of the coding quantity per frame is considered. Japanese Patent Laying-Open No. 5-236464 further solves such a problem that, on the boundary between a refreshed group of blocks and an unrefreshed group of blocks, a mismatch error remains due to such an operation that a refreshed block selects by motion prediction an unrefreshed block in which mismatch is caused as a reference picture. As shown in FIG. 36, this example transmits a group of blocks formed by two rows of blocks or two columns of blocks by INTRA coding and changes the two rows or two columns transmitted by INTRA coding in the row direction or the column direction successively in units of one row or one column. Thus, no motion prediction is performed on a block on the boundary between the groups of blocks while upper and lower or front and rear blocks are refreshed together and hence no block in which mismatch is caused is selected as a reference picture and no mismatch error remains. Further, this example assumes that, as to a subsequent block in two rows or two columns of blocks, no refresh is performed but motion compensation may be inhibited.

In the aforementioned conventional refresh method for picture coding dividing one frame into a plurality of groups of blocks and performing refresh in units of the groups of blocks, it is conceivable to reduce the number blocks of a simultaneously refreshed group of blocks, in order to further reduce increase of the coding quantity per frame. However, even if halving the number of the blocks of the group of blocks simultaneously refreshed by INTRA coding, blocks to be subjected to INTRA coding over two frames or three frames or blocks inhibited from motion compensation over two frames or three frames increase, when such a problem that a mismatch error remains on the boundary between the refreshed group of blocks and the unrefreshed group of blocks due to motion prediction is to be avoided. Therefore, coding efficiency lowers while the generated coding quantity does not much decreases. FIG. 37 is an example in a case of considering those obtained by dividing a group of blocks formed by three columns of blocks further into two left and right groups of blocks as a group of blocks. Referring to FIG. 37, slanted blocks are those to be INTRA-coded. While the number of blocks to be INTRA-coded is 3/4 that in FIG. 36 in the first frame, that in the second frame is at least equivalent, and that in the third frame is 5/4. Such overhead becomes further remarkable when reducing the group of blocks, while the time necessary for refreshing one screen lengthens and hence the group of blocks cannot be much reduced.

In other words, even if reducing increase of the coding quantity per frame by dividing one screen into a plurality of groups of blocks and refreshing a group of blocks per frame by INTRA coding, it has been impossible to remarkably reduce increase of the coding quantity when considering propagation of mismatch resulting from motion prediction. When transmitting a picture having no frame skip for minimizing a delay by a buffer for smoothing dispersion of the coding quantity in a decided transmission band, the information quantity per frame must be rendered as constant as possible. In order to transmit a picture of 30 frames/sec. at a transmission rate of 900 Kbits/sec., for example, it is necessary to approach the generated coding quantity per frame to 30 Kbits to the utmost. In order to reduce the coding quantity increased for transmitting an INTRA-coded group of blocks at this time, coding must be performed while enlarging the quantization step in the quantization part 109 in the encoder 116 shown in FIG. 35. When enlarging the quantization step, coding quantity decreases but a quantization error increases and quantization distortion occurs in the picture. There has been such a problem that, when a group of blocks having a different coding mode makes periodic motion under circumstances where quantization distortion is conspicuous, the group of blocks is recognized as a circulating disturbance line. This disturbance line is particularly remarkably recognized as disturbance in a still picture region.

SUMMARY OF THE INVENTION

Therefore, an object of the present invention is to provide a video coding apparatus and a video coding method reducing increase of a coding quantity resulting from refresh while avoiding appearance of a disturbance line resulting from an operation of dividing one frame into a plurality of groups of blocks and performing refresh in units of the blocks, in which influence by a transmission error is eliminated in a short time.

The present invention has the following features to attain the object above.

A first aspect of the present invention is directed to a video coding apparatus, dividing each frame of a motion picture into a predetermined number m of groups of blocks, for coding the motion picture while switching a coding mode between an INTER coding mode and an INTRA coding mode in units of block included in each group of blocks, comprising:

a motion determination part for determining whether or not there is motion exceeding a predetermined threshold in an object in each region of the number m of groups of blocks in each frame during a lapse of a prescribed time T from a prescribed point;

a whole-group refresh part for performing whole-group refresh, defined as an operation of INTRA-coding all blocks included in a group of blocks in a coding process for the same frame, on a group of blocks of a region determined by the motion determination part as having motion exceeding the threshold; and a dispersed refresh part for performing dispersed refresh, defined as an operation of INTRA-coding each block included in a group of blocks in a coding process for frames varying with the block while regarding groups of blocks being in the same position in respective frames as the same group of blocks among groups of blocks in the frames, on a group of blocks of a region determined by the motion determination part as having no motion exceeding the threshold.

As described above, in the first aspect, whole-group refresh is performed on a group of blocks having a high possibility of causing a transmission error due to motion in the object in the region while dispersed refresh is performed on a group of blocks having a low possibility of causing a transmission error due to no motion in the object in the region. Therefore, a disturbance line can be eliminated in a still picture region while, also when a transmission error occurs in a block finally refreshed as a group of blocks at a point when motion of a group of blocks having motion disappears, it is possible to refresh this.

In the present invention, when ITU-T recommendation H.261 or H.263 is used as the video coding mode, "block" corresponds to a macroblock, and "group of blocks" corresponds to a GROUP OF BLOCKS. However, the "group of blocks" is not restricted to the GROUP OF BLOCKS.

According to a second aspect, in the first aspect, the whole-group refresh part performs, on the basis of a determination result by the motion determination part, whole-group refresh on a group of blocks to be subjected to the whole-group refresh at least MS times (MS: prescribed natural number) even after motion exceeding the threshold disappears from the object in the region of the group of blocks.

As described above, in the second aspect, even if an error occurs in refresh data processed immediately before motion disappears, refresh can be simultaneously performed at next refresh timing.

According to a third aspect, in the first aspect, the video coding apparatus further comprises a refresh timing management part for managing the timing of the whole-group refresh and the dispersed refresh so that the whole-group refresh part performs the whole-group refresh on a group of blocks of a region determined by the motion determination part as having motion exceeding the threshold in a coding process for a frame at a point after a lapse of the time T from the prescribed point and the dispersed refresh part completes the dispersed refresh on a group of blocks of a region determined by the motion determination part as having no motion exceeding the threshold during a lapse of the time T from the prescribed point.

As described above, in the third aspect, a disturbance line can be eliminated in a still picture region while, also when a transmission error occurs in a block finally refreshed as a group of blocks at a point when motion of a group of blocks having motion disappears, it is possible to more quickly refresh this.

According to a fourth aspect, in the third aspect, the dispersed refresh part completes, when blocks of a group of blocks being in the process of the dispersed refresh are continuously INTRA-coded at least S times (S: prescribed natural number) in frames varying with the block, the disperse refresh on the group of blocks during a lapse of a prescribed time T' longer than the time T.

As described above, in the fourth aspect, it is possible to improve coding efficiency by suppressing influence by a transmission error by reducing the number of INTRA-coded blocks in a group of blocks where a still region continues.

According to a fifth aspect, in the third aspect, the dispersed refresh part divides a group of blocks to be subjected to dispersed refresh into subgroups of blocks of a number equal to a frame number corresponding to the time T and INTRA-codes a subgroup of blocks in a coding process for one frame.

As described above, in the fifth aspect, a block to be subjected to refresh by INTRA coding at timing varying with the block is dispersed in frames of a number corresponding to the time T, whereby coding quantity fluctuation is suppressed and an INTRA-coded block can be rendered inconspicuous.

According to a sixth aspect, in the fourth aspect, the dispersed refresh part divides a group of blocks to be subjected to dispersed refresh into subgroups of blocks of a number equal to a frame number corresponding to the time T' and INTRA-codes a subgroup of blocks in a coding process for one frame.

As described above, in the sixth aspect, a block to be subjected to refresh by INTRA coding at timing varying with the block is dispersed in frames of a number corresponding to the time T', whereby coding quantity fluctuation is suppressed and an INTRA-coded block can be rendered inconspicuous.

According to a seventh aspect, in the fourth aspect, the whole-group refresh part performs the whole-group refresh in a coding process for a frame at a point after a lapse of a prescribed time T'' shorter than the time T in response to the ratio of groups of blocks completely subjected to the dispersed refresh during a lapse of the prescribed time T'.

As described above, in the seventh aspect, the number of INTRA-coded blocks in a group of blocks of a region having motion is increased through improvement of the coding efficiency by reduction of the number of INTRA-coded block in a group of blocks where a still region continues, whereby influence by a transmission error can be more quickly refreshed while suppressing deterioration of the coding efficiency and the picture.

According to an eighth aspect, in the seventh aspect, the refresh timing management part calculates the prescribed time T" in accordance with the following equation:

$$T''=kT(m-B)/(mk-B)$$

where m is the number of groups of blocks in each frame, B is the number of groups of blocks completely subjected to the dispersed refresh during a lapse of the prescribed time T' and an integer not more than m, and k is T'/T.

As described above, in the eighth aspect, the number of INTRA-coded blocks in a group of blocks of a region having motion is increased through improvement of the coding efficiency by reduction of the number of INTRA-coded blocks in a group of blocks where a still region continues, whereby influence by a transmission error can be more quickly refreshed while suppressing deterioration of the coding efficiency and the picture quality.

A ninth aspect of the present invention is directed to a video coding apparatus, dividing each frame of a motion picture into a predetermined number m of groups of blocks, for coding the motion picture while switching a coding mode between an INTER coding mode and an INTRA coding mode in units of block included in each group of blocks, comprising:

a whole-group refresh part for performing whole-group refresh, defined as an operation of INTRA-coding all blocks included in a group of blocks in a coding process for the same frame, on one group of blocks at most with respect to each frame; and a refresh timing management part for managing the timing of whole-group refresh so that a frame number Tf corresponding to an interval for performing whole-group refresh on groups of blocks being in the same positions in respective frames among groups of blocks in the frames is greater than the number m.

As described above, in the ninth aspect, it follows that there exists a frame including no simultaneously INTRA-coded group of blocks, and the picture quality can be improved by highly efficient video coding utilizing Inter-frame correlation.

According to a tenth aspect, in the third aspect, the refresh timing management part manages the timing for performing INTRA coding so that a frame number Tf corresponding to an interval for performing INTRA coding on blocks having the same positions in the frame among blocks in each frame is greater than the number n.

As described above, in the tenth aspect, the number of a block subjected to INTRA coding decreases below the number of blocks in the group of blocks in a frame including no blocks subjected to whole-group refresh, whereby both effects of highly efficient coding and refresh by INTRA coding can be attained.

According to an eleventh aspect, in the first aspect, the video coding apparatus further comprises a refresh timing management part for managing the timing of whole-group refresh and dispersed refresh so that an interval in which INTRA coding is performed on blocks being in the same position in respective frames among groups of blocks in the frames by the whole-group refresh part or the dispersed refresh part is the time T', the motion determination part determines, on the basis of management by the refresh timing management part, whether or not there is motion exceeding the threshold in an object in each region during a lapse of the time T from a point displaced frame by frame every region of the number m of groups of blocks in each frame, and the whole-group refresh part performs, on the basis of management by the refresh timing management part, whole-group refresh on one group of blocks at most with respect to each frame.

As described above, in the eleventh aspect, it is possible to render groups of blocks subjected to whole-group refresh successively adjacent to each other, and it is possible to perform efficient refresh minimizing limitation of the range of a motion vector.

According to a twelfth aspect, in the ninth aspect, the video coding apparatus further comprises a motion determination part for determining, on the basis of management by the refresh timing management part, whether or not there is motion exceeding the threshold in an object in respective regions of the number m of groups of blocks in each frame during a lapse of the time T from a point displaced frame by frame for each of the regions, and the whole-group refresh part performs the whole-group refresh on a group of blocks of a region determined by the motion determination part as having motion exceeding the threshold.

According to a thirteenth aspect, in the eleventh aspect, the motion determination part determines presence/absence of motion also with respect to a region of a group of blocks subjected to dispersed refresh by detecting whether or not there is motion exceeding the threshold in an object in respective regions of the groups of blocks during a lapse of the time T from a point displaced frame by frame for each of the regions in parallel with the dispersed refresh, the dispersed refresh part terminates, when motion exceeding the threshold is detected in an object in a region of a group of blocks being in the process of the dispersed refresh by the motion determination part, the dispersed refresh on the group of blocks, and the whole-group refresh part performs, after a lapse of the time T from a point when the dispersed refresh on a group of blocks in a region where motion exceeding the threshold is detected is started, whole-group refresh on a group of blocks of the region.

According to a fourteenth aspect, in the eleventh aspect, the motion determination part determines presence/absence of motion by detecting whether or not there is motion exceeding the threshold in an object in respective regions of the groups of blocks during a lapse of the time T from a point displaced frame by frame for each of the regions in parallel with dispersed refresh by the dispersed refresh part, the dispersed refresh part performs the dispersed refresh on each group of blocks from a point when determination of presence/absence of motion of an object in a region of the group of blocks is started by the motion determination part and terminates the dispersed refresh on the group of blocks when motion exceeding the threshold is detected in an object in a region of a group of blocks being in the process of the dispersed refresh, and the whole-group refresh part performs, after a lapse of the time T from a point when dispersed refresh on a group of blocks of a region where motion exceeding the threshold is detected is started, whole-group refresh on the group of blocks of the region.

As described above, in the fourteenth aspect, whether a transmission error occurs in a group of blocks subjected to whole-group refresh and motion of an object of the region of the group of blocks disappears and hence no whole-group refresh is performed after a lapse of the time T or a transmission error occurs in a block being refreshed at different timing, every block of the group of blocks is certainly refreshed up to a lapse of the time T.

According to a fifteenth aspect, in the eleventh aspect, the motion determination part divides the region of each group of blocks into a prescribed number of divided regions and detects whether or not there is motion exceeding a previously set threshold in an object every divided region thereby determining presence/absence of motion in each divided region, and the whole-group refresh part INTRA-codes, in a coding process for a frame at a point of next whole-group refresh on the group of blocks of a region including the divided region determined as having motion, all blocks in the divided region in place of the whole-group refresh.

As described above, in the fifteenth aspect, motion of an object smaller as compared with the group of blocks can be efficiently refreshed, and it is possible to obtain a picture having smaller disturbance resulting from refresh.

According to a sixteenth aspect, in the eleventh aspect, the motion determination part divides the region of each group of blocks into a prescribed number of divided regions and detects whether or not there is motion exceeding a previously set threshold in an object every divided region thereby determining presence/absence of motion in each divided region, the dispersed refresh part terminates, when a divided region included in the region of a group of blocks being in the process of the dispersed refresh is determined by the motion determination part as having motion, dispersed refresh on the group of blocks of the region including the divided region, and the whole-group refresh part INTRA-codes, in a coding process for a frame at a point of next whole-group refresh on the group of blocks of the region including the divided region determined as having motion, all blocks in the divided region in place of the whole-group refresh.

As described above, in the sixteenth aspect, motion of an object smaller as compared with the group of blocks can be efficiently refreshed and it is possible to obtain a picture having smaller disturbance resulting from refresh.

According to a seventeenth aspect, in the eleventh aspect, the whole-group refresh part refreshes, when an object is vertically long or the object moves in the vertical direction, respective groups of blocks along the vertical direction among groups of blocks arranged in the vertical and transverse directions.

As described above, in the seventeenth aspect, groups of blocks subjected to whole-group refresh are continuous, whereby refresh can be efficiently performed, while the number of continuous frames including no groups of blocks subjected to whole-group refresh increases, whereby the picture quality can be improved by highly efficient video coding utilizing Inter-frame correlation.

According to an eighteenth aspect, in the eleventh aspect, the whole-group refresh part refreshes, when the object is transversely long or the object moves in the transverse direction, respective groups of blocks along the transverse direction among groups of blocks arranged in the vertical and transverse directions.

As described above, in the eighteenth aspect, groups of blocks subjected to whole-group refresh are continuous, whereby refresh can be efficiently performed, while the number of continuous frames including no groups of blocks subjected to whole-group refresh increases, whereby the picture quality can be improved by highly efficient video coding utilizing Inter-frame correlation.

According to a nineteenth aspect, in the first aspect, the motion determination part has a threshold set part for changing the threshold.

According to a twentieth aspect, in the nineteenth aspect, the threshold set part has:

a part for detecting a blur quantity of a camera or a picture, and a part for setting a value varying with the blur quantity as said threshold.

As described above, in the nineteenth or twentieth aspect, even if a blur occurs in the picture by vibration of the camera or the like, refresh can be performed by a proper method by precisely determining a still region and a moving region.

According to a twenty-first aspect, in the first aspect, the video coding apparatus further comprises a coding precision control part for rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of the frame coded n frames before on the basis of a determination result by the motion determination part.

According to a twenty-second aspect, in the ninth aspect, the video coding apparatus further comprises a coding precision control part for rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of the frame coded n frames before on the basis of a determination result by the motion determination part.

As described above, in the twenty-first or twenty-second aspect, the information quantity between frames can be smoothed and a motion picture having small frame skip can be obtained.

According to a twenty-third aspect, in the first aspect, the video coding apparatus further comprises a coding precision control part for rendering, when no group of blocks subjected to whole-group refresh is included in a frame to be currently coded and a group of blocks to be subjected to whole-group refresh is included in a frame coded n (n: predetermined natural number) frames before, the picture quality of the frame to be currently coded superior to the picture quality of the frame coded n frames before on the basis of a determination result by the motion determination part.

According to a twenty-fourth aspect, in the ninth aspect,
the video coding apparatus further comprises a coding precision control part for rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of the frame coded n frames before on the basis of a determination result by the motion determination part.

As described above, in the twenty-third or twenty-fourth aspect, the information quantity between frames can be smoothed, and a motion picture having small frame skip can be obtained.

According to a twenty-fifth aspect, in the twenty-first aspect,
the coding precision control part includes a quantization precision control part for rendering the picture quality of the frame to be currently coded inferior to the picture quality of the frame coded n frames before by lowering quantization precision for the frame to be currently coded.

As described above, in the twenty-fifth aspect, the information quantity between frames can be readily smoothed by merely changing the parameter of quantization precision, and a motion picture having small frame skip can be obtained.

According to a twenty-sixth aspect, in the twenty-third aspect,
the coding precision control part includes a quantization precision control part for rendering the picture quality of the frame to be currently coded superior to the picture quality of the frame coded n frames before by improving quantization precision for the frame to be currently coded.

As described above, in the twenty-sixth aspect, the information quantity between frames can be smoothed by merely changing the parameter of quantization precision, and a motion picture having small frame skip can be obtained.

According to a twenty-seventh aspect, in the first aspect,
the video coding apparatus further comprises a coding precision control part for rendering the picture quality of a block to be subjected to INTRA coding among blocks included in a group of blocks to be subjected to dispersed refresh by the dispersed refresh part superior to the picture quality of the remaining blocks in a frame including the group of blocks.

As described above, in the twenty-seventh aspect, quantization distortion resulting from refresh can be eliminated in a still region.

According to a twenty-eighth aspect, in the first aspect,
the video coding apparatus further comprises a coding precision control part for controlling precision of coding so that the picture quality of a block to be subjected to INTRA coding among blocks included in a group of blocks to be subjected to dispersed refresh by the dispersed refresh part does not lower below a previously set lower limit.

As described above, in the twenty-eighth aspect, quantization distortion resulting from refresh can be eliminated in a still region.

According to a twenty-ninth aspect, in the first aspect,
the video coding apparatus further comprises a coding precision control part for controlling precision of coding so as to equalize, when the picture quality of a block to be subjected to INTRA coding among blocks included in a group of blocks to be subjected to dispersed refresh by the dispersed refresh part is higher than a previously set lower limit, the picture quality with the picture quality of the remaining blocks in a frame including the group of blocks and to set, when the picture quality of the block to be subjected to INTRA coding is lower than the lower limit, the picture quality at the lower limit.

As described above, in the twenty-ninth aspect, quantization distortion resulting from refresh can be eliminated in a still region.

According to a thirtieth aspect, in the twenty-seventh aspect,
the coding precision control part includes a quantization precision control part for rendering quantization precision for the block to be subjected to INTRA coding higher than quantization precision for the remaining blocks in the frame.

As described above, in the thirtieth aspect, quantization distortion resulting from refresh in a still region can be simply eliminated by merely changing the parameter of quantization precision.

According to a thirty-first aspect, in the first aspect,
the video coding apparatus further comprises a quantization precision control part for controlling quantization precision so that quantization precision for a block to be subjected to INTRA coding among blocks included in a group of blocks to be subjected to dispersed refresh by the dispersed refresh part does not lower below a previously set lower limit.

As described above, in the thirty-first aspect, quantization distortion resulting from refresh in a still region can be simply eliminated by merely changing the parameter of quantization precision.

According to a thirty-second aspect, in the first aspect,
the video coding apparatus further comprises a quantization precision control part for controlling quantization precision so as to equalize, when quantization precision for a block to be subjected to INTRA coding among blocks included in a group of blocks to be subjected to dispersed refresh by the dispersed refresh part is higher than a previously set lower limit, the quantization precision with quantization precision for the remaining blocks in a frame including the group of blocks and to set, when quantization precision for the block to be subjected to INTRA coding is lower than the lower limit, the quantization precision at the lower limit.

As described above, in the thirty-second aspect, quantization distortion resulting from refresh in a still region can be simply eliminated by merely changing the parameter of quantization precision.

According to a thirty-third aspect, in the first aspect,
each group of blocks is formed by a plurality of blocks in each of m predetermined regions in each frame.

According to a thirty-fourth aspect, in the ninth aspect,
each group of blocks is formed by a plurality of blocks in each of m predetermined regions in each frame.

As described above, in the thirty-third or thirty-fourth aspect, a refresh operation (whole-group refresh) simultaneously refreshing blocks and a refresh operation (whole-group refresh) refreshing blocks at timing varying with the block can be readily controlled.

According to a thirty-fifth aspect, in the thirty-third aspect,
the predetermined region is A GROUP OF BLOCKS.

According to a thirty-sixth aspect, in the thirty-fourth aspect, the predetermined region is A GROUP OF BLOCKS.

As described above, in the thirty-fifth or thirty-sixth aspect, even if a transmission error occurs in information at the time of coding a picture and the information is erroneous, picture quality deterioration resulting from the transmission error can be kept in the GROUP OF BLOCKS and error resistance can be improved.

A thirty-seventh aspect of the present invention is directed to a video coding apparatus dividing each frame of a motion picture into a predetermined number m of groups of blocks for coding the motion picture while switching a coding mode between an INTER coding mode and an INTRA coding mode in units of block included in each group of blocks, comprising:

a coding quantity determination part for determining whether or not a coding quantity resulting from coding of each group of blocks during a lapse of a prescribed time T from a prescribed point is in excess of a predetermined threshold;

a whole-group refresh part for performing whole-group refresh, defined as an operation of INTRA-coding all blocks included in a group of blocks in a coding process for the same frame, on a group of blocks so determined by the coding quantity determination part that the coding quantity is in excess of the threshold; and a dispersed refresh part for performing dispersed refresh, defined as an operation of INTRA-coding each block included in a group of blocks in a coding process for frames varying with the block while regarding groups of blocks being in the same position in respective frames as the same group of blocks among groups of blocks in the frames, on a group of blocks so determined by the coding quantity determination part that the coding quantity is less than the threshold.

As described above, in the thirty-seventh aspect, whole-group refresh is performed on a group of blocks having a high possibility of causing a transmission error due to a large coding quantity while dispersed refresh is performed on a group of blocks having a low possibility of causing a transmission error due to a small coding quantity. Therefore, a disturbance line can be eliminated in a still picture region while, even if a transmission error occurs as to a group of blocks still having a small coding quantity, it is possible to refresh this.

A thirty-eighth aspect of the present invention is directed to a video coding apparatus, employed in a picture transmission system formed by a coding apparatus for coding motion picture and transmitting coded data of the motion picture and a decoding apparatus for receiving the transmitted coded data and decoding the same while performing detection of an error in the coded data to be decoded and transmitting error notice to the coding apparatus when an error is detected as the coding apparatus, for dividing each frame of the motion picture into a predetermined number m of groups of blocks and coding the motion picture while switching a coding mode between an INTER coding mode and an INTRA coding mode in units of block included in each group of blocks, comprising:

an error receiving part for receiving the error notice;

a refresh selection part for determining, when the error notice is received by the error receiving part, whether or not there is motion exceeding a predetermined threshold in an object in a region of each group of blocks in each frame coded up to a moment preceding a point of receiving of the error notice by a prescribed time RTmax and deciding performance of refresh by INTRA coding on a group of blocks of a region having motion exceeding the threshold; and a whole-group refresh part for performing whole-group refresh, defined as an operation of INTRA-coding all blocks included in a group of blocks in a coding process for the same frame, on a group of blocks decided by the refresh selection part to be subjected to refresh.

As described above, in the thirty-eighth aspect, largeness/smallness of motion of an object per group of blocks can be determined at a point when the coding side is posted on an error from the decoding side while going back to the point coding the frame of the error, whereby only a necessary group of blocks can be simultaneously refreshed at a necessary time, and it is possible to improve the coding efficiency without damaging error resistance.

According to a thirty-ninth aspect, in the thirty-eighth aspect, the video coding apparatus further comprises a dispersed refresh part for performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks decided by the refresh selection part to be subjected to refresh.

According to a fortieth aspect, in the thirty-eighth aspect, the refresh selection part includes a motion information storage management part for storing, in coding each frame of the motion picture, motion information indicating the magnitude of motion of an object in a region of each group of blocks in the frame, and holding the motion information from a point of coding of the frame up to a point after a lapse of a prescribed time RTmax, and determines, on the basis of the motion information held by the motion information storage management part, whether or not there is motion exceeding the threshold in an object in a region of each group of blocks in each frame coded up to a moment preceding a point of receiving of the error notice by the time RTmax.

According to a forty-first aspect, in the thirty-eighth aspect, the time RTmax is the maximum value of a time from a point when any frame in the motion picture is coded up to a point when the error receiving part receives the error notice when coded data of the frame is transmitted to the decoding apparatus and an error is detected in the coded data.

As described above, in the forty-first aspect, largeness/smallness of motion of an object per group of blocks can be determined at a point when the coding side is posted on an error from the decoding side while going back to the point coding the frame of the error, whereby only a necessary group of blocks can be simultaneously refreshed at a necessary time, and it is possible to improve the coding efficiency without damaging error resistance.

According to a forty-first aspect, in the fortieth aspect, the video coding apparatus further comprises a time calculation part for calculating a time from a point when each frame in the motion picture is coded up to a point when the error receiving part receives the error notice when coded data of the frame is transmitted to the decoding apparatus and an error is detected in the coded data as the time RTmax every frame of the motion picture, and the motion information storage management part holds the motion information on the basis of the time RTmax calculated by the time calculation part.

As described above, in the forty-second aspect, the time for holding motion information is calculated every frame of the picture, whereby only necessary motion information can be held and waste of a storage region can be eliminated.

According to a forty-third aspect, in the thirty-eighth aspect, the whole-group refresh part performs whole-group refresh, when performance of refresh for a plurality of groups of blocks being in different regions is decided by the refresh selection part, on each of the plurality of groups of blocks once while successively displacing the same frame by frame.

As described above, in the forty-third aspect, blocks for INTRA coding having low coding efficiency can be dispersed and it is possible to preferentially refresh a group of blocks requiring refresh.

According to a forty-fourth aspect, in the forty-third aspect, the refresh selection part determines, when the error notice is received by the error receiving part while the whole-group refresh part performs whole-group refresh on each of the plurality of groups of blocks once while successively displacing the same frame by frame, whether or not there is motion exceeding the threshold in an object in a region of each group of blocks in each frame coded up to a moment preceding a point of the receiving by the time RTmax and additionally decides a group of blocks of a region having motion exceeding the threshold on the basis of a result of the determination as a group of blocks to be subjected to refresh, and the whole-group refresh part performs refresh on each of a plurality of groups of blocks for which performance of refresh is decided by the refresh selection part, inclusive of a group of blocks for which performance of refresh is redundantly decided, once while successively displacing the same frame by frame.

As described above, in the forty-fourth aspect, even if an error occurs while successively refreshing a group of blocks to be subjected to whole-group refresh, it is possible to properly whole-group refresh only a necessary group of blocks.

According to a forty-fifth aspect, in the fortieth aspect, the motion information storage management part stores, in coding each frame of the motion picture, prescribed motion information indicating motion exceeding the threshold as the motion information about a group of blocks subjected to whole-group refresh in the coding and holds the prescribed motion information from a point of the coding up to a point after a lapse of the time RTmax.

As described above, in the forty-fifth aspect, it is possible to simultaneously refresh an INTRA-coded group of blocks having low coding efficiency and readily causing an error when error notice is received from the decoding side similarly to a group of blocks whose object has large motion.

According to a forty-sixth aspect, in the thirty-eighth aspect, the video coding apparatus further comprises a search range limit part for limiting, in coding of a block adjacent to a group of blocks queued to whole-group refresh, being a group of blocks to be subjected to the whole-group refresh but not yet subjected to the whole-group refresh, among blocks included in a group of blocks not subjected to the whole-group refresh, a motion vector search range so that the group of blocks queued to whole-group refresh is not referred to.

As described above, in the forty-sixth aspect, it is possible to prevent a group of blocks not subjected to whole-group refresh from propagation of influence by an error.

According to a forty-seventh aspect, in the forty-sixth aspect, the search range limit part limits the motion vector search range, in coding of a block included in each group of blocks, so that no block included in a group of blocks other than the group of blocks including the currently-coded block is referred to during a period when the whole-group refresh is performed.

As described above, in the forty-seventh aspect, it is possible to further readily prevent a group of blocks not subjected to whole-group refresh from propagation of influence by an error.

A forty-eighth aspect of the present invention is directed to a video coding method of dividing each frame of a motion picture into a predetermined number m of groups of blocks for coding the motion picture while switching a coding mode between an INTER coding mode and an INTRA coding mode in units of block included in each group of blocks, comprising:

a motion determination step of determining whether or not there is motion exceeding a predetermined threshold in an object in each region of the number m of groups of blocks in each frame during a lapse of a prescribed time T from a prescribed point;

a whole-group refresh step of performing whole-group refresh, defined as an operation of INTRA-coding all blocks included in a group of blocks in a coding process for the same frame, on blocks of a region determined in the motion determination step as having motion exceeding the threshold; and a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks of a region determined in the motion determination step as having no motion exceeding the threshold.

According to a forty-ninth aspect, in the forty-eighth aspect, whole-group refresh is performed on the basis of a determination result in the motion determination step at least MS times (MS: prescribed natural number) on a group of blocks subjected to the whole-group refresh even after motion exceeding the threshold disappears from an object in a region of the group of blocks.

According to a fiftieth aspect, in the forty-eighth aspect, the whole-group refresh is performed in a coding process for frames at a point after a lapse of the time T from the prescribed point, and the dispersed refresh is completed during a lapse of the time T from the prescribed point.

According to a fifty-first aspect, in the fiftieth aspect, when blocks in a group of blocks being in the process of the dispersed refresh are INTRA-coded in frames varying with the block continuously in excess of S times (S: prescribed natural number), the dispersed refresh for the group of blocks is completed during a lapse of a prescribed time T' longer than the time T.

According to a fifty-second aspect, in the fifty-first aspect, the whole-group refresh is performed in a coding process for frames at a point after a lapse of a prescribed time T'' shorter than the time T in response to the rate of a group of blocks completely subjected to the dispersed refresh during a lapse of the prescribed time T'.

According to a fifty-third aspect, in the fifty-second aspect, the prescribed time T'' is calculated in accordance with the following equation:

$$T''=kT(m-B)/(mk-B)$$

where m is the number of groups of blocks in each frame, B is the number of groups of blocks completely subjected to the dispersed refresh during a lapse of the prescribed time T' and an integer not more than m, and k is T'/T.

According to a fifty-fourth aspect, in the forty-eighth aspect, a group of blocks to be subjected to the dispersed refresh is divided into subgroups of blocks of a number equal to a frame number corresponding to the time T and a subgroup of blocks is INTRA-coded in a coding process for one frame in the dispersed refresh step.

A fifty-fifth aspect of the present invention is directed to a video coding method, which divides each frame of a motion picture into a predetermined number m of groups of blocks, for coding the motion picture while switching a coding mode between an INTER coding mode and an INTRA coding mode in units of block included in each group of blocks, comprising:

a whole-group refresh step of performing whole-group refresh, defined as an operation of INTRA-coding all blocks included in a group of blocks in a coding process for the same frame, on one group of blocks at most with respect to each frame, wherein a frame number Tf corresponding to an interval for performing the whole-group refresh on groups of blocks being in the same position in respective frames among groups of blocks in the frames is greater than the number m.

According to a fifty-sixth aspect, in the forty-eighth aspect, a frame number Tf corresponding to an interval for performing INTRA coding on blocks being in the same position in respective frames among blocks in the frames is greater than the number m.

According to a fifty-seventh aspect, in the forty-eighth aspect, an interval in which INTRA coding is performed by the whole-group refresh or the dispersed refresh on blocks being in the same position in respective frames among blocks in the frames is the time T, a determination is made in the motion determination step as to whether or not there is motion exceeding the threshold in an object in each region during a lapse of the time T from a point displaced frame by frame every region of the number m of groups of blocks in each frame, and the whole-group refresh is performed on one group of blocks at most with respect to each frame.

According to a fifty-eighth aspect, in the fifty-fifth aspect, the video coding method further comprises a motion determination step of determining whether or not there is motion exceeding the threshold in an object in respective regions of the number m of groups of blocks in each frame during a lapse of the time T from a point displaced frame by frame for each of the regions, and the whole-group refresh is performed on a group of blocks of a region determined as having motion exceeding the threshold in the whole-group refresh step.

According to a fifty-ninth aspect, in the fifty-seventh aspect, presence/absence of motion is determined in the motion determination step by detecting whether or not there is motion exceeding the threshold in an object in respective regions of the groups of blocks during a lapse of the time T from a point displaced frame by frame for each of the regions also as to a region of a group of blocks to be subjected to the dispersed refresh in parallel with the dispersed refresh, when motion exceeding the threshold is detected in an object in a region of a group of blocks being in the process of the dispersed refresh, the dispersed refresh on the group of blocks is terminated, and after a lapse of the time T from a point when the dispersed refresh on a group of blocks of a region where motion exceeding the threshold is detected, the whole-group refresh is performed on the group of blocks of the region.

According to a sixtieth aspect, in the fifty-seventh aspect, presence/absence of motion is determined in the motion determination step by detecting whether or not there is motion exceeding the threshold in an object in respective regions during a lapse of the time T from a point displaced frame by frame for each of the regions in parallel with the dispersed refresh, when the dispersed refresh on each group of blocks is performed from a point when determination of presence/absence of motion of an object in a region of the group of blocks is started and motion exceeding the threshold is detected in an object in a region of a group of blocks being in the process of the dispersed refresh, the dispersed refresh on the group of blocks is terminated, and after a lapse of the time T from a point when the dispersed refresh on a group of blocks of a region where motion exceeding the threshold is detected is started, the whole-group refresh is performed on the group of blocks of the region.

According to a sixty-first aspect, in the fifty-seventh aspect, a region of each group of blocks is divided into a prescribed number of divided regions in the motion determination step and presence/absence of motion in each divided region is determined by detecting whether or not there is motion exceeding a previously set threshold in an object every divided region, and all blocks of the divided region are INTRA-coded in a coding process for a frame at a point of next whole-group refresh on a group of blocks of a region including a divided region where motion exceeding the threshold is detected.

According to a sixth-second aspect, in the fifty-seventh aspect, a region of each group of blocks is divided into a prescribed number of divided regions in the motion determination step and presence/absence of motion in each divided region is determined by detecting whether or not there is motion exceeding a previously set threshold in an object every divided region, when motion exceeding the threshold is detected in an object in a divided region included in a region of a group of blocks being in the process of the dispersed refresh, dispersed refresh on the group of blocks of a region including the divided region is terminated, and all blocks of the divided region are INTRA-coded in a coding process for a frame at a point of next whole-group refresh on a group of blocks of a region including a divided region where motion exceeding the threshold is detected.

According to a sixty-third aspect, in the fifty-seventh aspect, when an object is vertically long or the object moves in the vertical direction, groups of blocks subjected to the whole-group refresh are respectively refreshed along the vertical direction among groups of blocks arranged in the vertical and transverse directions.

According to a sixty-fourth aspect, in the fifty-seventh aspect, when an object is transversely long or the object moves in the transverse direction, groups of blocks subjected to the whole-group refresh are respectively refreshed along the transverse direction among groups of blocks arranged in the vertical and transverse directions.

According to a sixty-fifth aspect, in the forty-eighth aspect, the video coding method further comprises a threshold set step of changing the threshold used in the motion determination step.

According to a sixty-sixth aspect, in the sixty-fifth aspect, the threshold set step includes:

a step of detecting a blur quantity of a camera or a picture, and a step of setting a value varying with the blur quantity as the threshold.

According to a sixty-seventh aspect, in the forty-eighth aspect, the video coding method further comprises a coding precision control step of rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of the frame coded n frames before on the basis of a determination result in the motion determination step.

According to a sixth-eighth aspect, in the fifty-fifth aspect, the video coding method further comprises a coding precision control step of rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of the frame coded n frames before on the basis of a determination result in the motion determination step.

According to a sixty-ninth aspect, in the forty-eighth aspect, the video coding method further comprises a coding precision control step of rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of the frame coded n frames before on the basis of a determination result in the motion determination step.

According to a seventieth aspect, in the fifty-fifth aspect, the video coding method further comprises a coding precision control step of rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of the frame coded n frames before on the basis of a determination result in the motion determination step.

According to a seventy-first aspect, in the sixty-seventh aspect, the coding precision control step includes a quantization precision control step of rendering the picture quality of the frame to be currently coded inferior to the picture quality of the frame coded n frames before by lowering quantization precision for the frame to be currently coded.

According to a seventy-second aspect, in the sixty-ninth aspect, the coding precision control step includes a quantization precision control step of rendering the picture quality of the frame to be currently coded superior to the picture quality of the frame coded n frames before by improving quantization precision for the frame to be currently coded.

According to a seventy-third aspect, in the forty-eighth aspect, the dispersed refresh step includes a coding precision control step of rendering the picture quality of a block to be subjected to INTRA coding among blocks included in a group of blocks to be subjected to the dispersed refresh superior to the picture quality of the remaining blocks in a frame including the group of blocks.

According to a seventy-fourth aspect, in the forty-eighth aspect, the dispersed refresh step includes a coding precision control step of controlling precision of coding so that the picture quality of a block to be subjected to INTRA coding among blocks included in a group of blocks to be subjected to the dispersed refresh does not lower below a previously set lower limit.

According to a seventy-fifth aspect, in the forty-eighth aspect, the dispersed refresh step includes a coding precision control step of controlling precision of coding for equalizing, when the picture quality of a block to be subjected to INTRA coding among blocks included in a group of blocks to be subjected to the dispersed refresh is higher than a previously set lower limit, the picture quality with the picture quality of the remaining blocks in a frame including the group of blocks and setting, when the picture quality of the block to be subjected to INTRA coding is lower than the lower limit, the picture quality at the lower limit.

According to a seventy-sixth aspect, in the seventy-third aspect, the coding precision control step includes a quantization precision control step of rendering quantization precision for the block to be subjected to INTRA coding higher than quantization precision for the remaining blocks in the frame.

According to a seventh-seventh aspect, in the forty-eighth aspect, the dispersed refresh step includes a quantization precision control step of controlling quantization precision so that quantization precision for a block to be subjected to INTRA coding among blocks included in a group of blocks to be subjected to the dispersed refresh does not lower below a previously set lower limit.

According to a seventy-eighth aspect, in the forty-eighth aspect, the dispersed refresh step includes a quantization precision control step of controlling quantization precision for equalizing, when quantization precision for a block to be subjected to INTRA coding among blocks included in a group of blocks to be subjected to the dispersed refresh is higher than a previously set lower limit, the quantization precision with quantization precision for the remaining blocks in a frame including the blocks and setting, when quantization precision for the block to be subjected to INTRA coding is lower than the lower limit, the quantization precision at the lower limit.

According to a seventy-ninth aspect, in the forty-eighth aspect, each group of blocks is formed by a plurality of blocks in each of m predetermined regions in each frame.

According to an eightieth aspect, in the fifty-fifth aspect, each group of blocks is formed by a plurality of blocks in each of m predetermined regions in each frame.

According to an eighty-first aspect, in the seventy-ninth aspect, the predetermined region is a GROUP OF BLOCKS.

According to a eighty-second aspect, in the eightieth aspect, the predetermined region is a GROUP OF BLOCKS.

An eighty-third aspect of the present invention is directed to a video coding method of dividing each frame of a motion picture into a predetermined number m of groups of blocks for coding the motion picture while switching a coding mode between an INTER coding mode and an INTRA coding mode in units of block included in each group of blocks, comprising:

a coding quantity determination step of determining whether or not a coding quantity resulting from coding of each group of blocks during a lapse of a prescribed time T from a prescribed point is in excess of a predetermined threshold;

a whole-group refresh step of performing whole-group refresh, defined as an operation of INTRA coding all blocks included in a group of blocks in a coding process for the same frame, on a group of blocks so determined in the coding quantity determination step that the coding quantity is in excess of the threshold; and a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks so determined in the coding quantity determination step that the coding quantity is less than the threshold.

According to an eighty-fourth aspect, the present invention is directed to a video coding method, employed in a picture transmission system formed by a coding apparatus for coding a motion picture and transmitting coded data of the motion picture and a decoding apparatus for receiving the transmitted coded data and decoding the same while performing detection of an error in the coded data to be decoded and transmitting error notice to the coding apparatus when an error is detected, for dividing each frame of the motion picture into a predetermined number m of groups of blocks and coding the motion picture while switching a coding mode between an INTER coding mode and an INTRA coding mode in units of block included in each group of blocks, comprising:

an error receiving step of receiving the error notice;

a refresh selection step of determining, when the error notice is received, whether or not there is motion exceeding a predetermined threshold in an object in a region of each group of blocks in each frame coded up to a moment preceding a point of receiving of the error notice by a prescribed time RTmax and deciding performance of refresh by INTRA coding on a group of blocks of a region having motion exceeding the threshold; and a whole-group refresh step of performing whole-group refresh, defined as an operation of INTRA-coding all blocks included in a group of blocks in a coding process for the same frame, on a group of blocks decided in the refresh selection step to be subjected to refresh.

According to an eighty-fifth aspect, in the eighty-fourth aspect, the video coding method further comprises a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks decided in the refresh selection step to be subjected to refresh.

According to an eighty-sixth aspect, in the eighty-fourth aspect, the video coding method further comprises a motion information storage step of storing, in coding each frame of the motion picture, motion information indicating the magnitude of motion of an object in a region of each group of blocks in the frame, and a hold time management step of managing a hold time for the motion information so as to hold the motion information stored in the motion information storage step at least for the time RTmax, and a determination is made in the refresh selection step on the basis of the motion information whose hold time is managed as to whether or not there is motion exceeding the threshold in an object in a region of each group of blocks in each frame coded up to a moment preceding a point of receiving of the error notice by the time RTmax.

According to an eighty-seventh aspect, in the eighty-fourth aspect, the time RTmax is the maximum value of a time from a point when any frame in the motion picture is coded up to a point when the error notice is received by the coding apparatus when coded data of the frame is transmitted to the decoding apparatus and an error is detected in the coded data.

According to an eighty-eighth aspect, in the eighty-sixth aspect, the video coding method further comprises a time calculation step of calculating a time from a point when each frame in the motion picture is coded up to a point when the error notice is received by the coding apparatus when coded data of the frame is transmitted to the decoding apparatus and an error is detected in the coded data, and the hold time for the motion information is managed in the hold time management step employing the time calculated in the time calculation step as the prescribed time RTmax.

According to an eighty-ninth aspect, in the eighty-fourth aspect, when performance of refresh on a plurality of groups of blocks being in different regions is decided in the refresh selection step, each of the plurality of groups of blocks is performed whole-group refresh once while being successively displaced frame by frame.

According to a ninetieth aspect, in the eighty-ninth aspect, when the error notice is received while each of the plurality of groups of blocks is performed whole-group refresh once while being successively displaced frame by frame, whether or not there is motion exceeding the threshold in an object of a region of each group of blocks in each frame coded up to a moment preceding a point of the receiving by the time RTmax is determined in the refresh selection step and a group of blocks of a region having motion exceeding the threshold is additionally decided as a group of blocks to be subjected to refresh on the basis of a result of the determination, and each of a plurality of groups of blocks for which performance of refresh is decided in the refresh selection step, inclusive of a group of blocks for which performance of refresh is redundantly decided, is performed whole-group refresh once while being successively displaced frame by frame.

According to a ninety-first aspect, in the eighty-sixth aspect, prescribed motion information indicating motion exceeding the threshold is stored in the motion information storage step in coding each frame of the motion picture as the motion information about a group of blocks subjected to whole-group refresh in the coding, and the prescribed motion information is held by management of the hold time in the hold time management step from a point of the coding up to a point after a lapse of at least the prescribed time RTmax.

According to a ninety-second aspect, in the eighty-fourth aspect, the video coding method further comprises a search range limit step of limiting, in coding of a block adjacent to a group of blocks queued to whole-group refresh, which is a group of blocks to be subjected to the whole-group refresh but not yet subjected to the whole-group refresh, among blocks included in a group of blocks not subjected to the whole-group refresh, a motion vector search range so that the group of blocks queued to whole-group refresh is not referred to.

According to a ninety-third aspect, in the ninety-second aspect, the motion vector search range is so limited in the search range limit step, in coding of a block included in each group of blocks, that no block included in a group of blocks other than the group of blocks including the currently-coded block is referred to during a period when the refresh is performed.

A ninety-fourth aspect of the present invention is directed to a storage medium containing a video coding program thereon for dividing each frame of a motion picture into a predetermined number m of groups of blocks and coding the motion picture while switching a coding mode between an INTER coding mode and an INTRA coding mode in units of a block included in each group of blocks as a program executed in a computer unit. The storage medium contains a video coding program recorded thereon for implementing on the computer unit operating environment including:

a motion determination step of determining whether or not there is motion exceeding a predetermined threshold in an object in each region of the number m of groups of blocks in each frame during a lapse of a prescribed time T from a prescribed point;

a whole-group refresh step of performing whole-group refresh, defined as an operation of INTRA-coding all blocks included in a group of blocks in a coding process for the same frame, on a group of blocks of a region determined in the motion determination step as having motion exceeding the threshold; and a dispersed refresh step of performing dispersed refresh, defined as an operation of INTRA-coding each block included in a group of blocks while regarding groups of blocks being in the same position in respective frames among groups of blocks in the frames as the same group of blocks in a coding process for frames varying with the block, on a group of blocks of a region determined in the motion determination step as having no motion exceeding the threshold.

A ninety-fifth aspect of the present invention is directed to a storage medium containing a video coding program thereon for dividing each frame of a motion picture into a predetermined number m of groups of blocks and coding the motion picture while switching a coding mode between an INTER coding mode and an INTRA coding mode in units of block included in each group of blocks as a program executed in a computer unit. The storage medium contains a video coding program recorded thereon for implementing on the computer unit operating environment including:

a whole-group refresh step of performing whole-group refresh, defined as an operation of INTRA-coding all blocks included in a group of blocks in a coding process for the same frame, on one group of blocks at most with respect to each frame, wherein a frame number Tf corresponding to an interval for performing the whole-group refresh on groups of blocks being in the same position in respective frames among groups of blocks in the frames is greater than the number m.

A ninety-sixth aspect of the present invention is directed to a storage medium containing a video coding program thereon for dividing each frame of a motion picture into a predetermined number m of groups of blocks and coding the motion picture while switching a coding mode between an INTER coding mode and an INTRA coding mode in units of a block included in each group of blocks as a program executed in a computer unit. The storage medium contains a video coding program for implementing on the computer unit operating environment including:

a coding quantity determination step of determining whether or not a coding quantity resulting from coding of each group of blocks during a lapse of a prescribed time T from a prescribed point is in excess of a predetermined threshold;

a whole-group refresh step of performing whole-group refresh, defined as an operation of INTRA-coding all blocks included in a group of blocks in a coding process for the same frame, on a group of blocks so determined in the coding quantity determination step that the coding quantity is in excess of the threshold; and a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks so determined in the coding quantity determination step that the coding quantity is less than the threshold.

A ninety-seventh aspect of the present invention is directed to a storage medium containing a video coding program thereon, employed in a picture transmission system formed by a coding apparatus for coding a motion picture and transmitting coded data of the motion picture and a decoding apparatus for receiving the transmitted coded data and decoding the same while performing detection of an error in the coded data to be decoded and transmitting error notice to the coding apparatus when an error is detected, for dividing each frame of the motion picture in to a predetermined number m of groups of blocks and coding the motion picture while switching a coding mode between an INTER coding mode and an INTRA coding mode in units of block included in each group of blocks as a program executed on a computer unit. The storage medium contains a video coding program recorded thereon for implementing on the computer unit operating environment including:

an error receiving step of receiving the error notice;

a refresh selection step of determining, when the error notice is received, whether or not there is motion exceeding a predetermined threshold in an object in a region of each group of blocks in each frame coded up to a moment preceding a point of receiving of the error notice by a prescribed time RTmax and deciding performance of refresh by INTRA coding on a group of blocks of a region having motion exceeding the threshold; and a whole-group refresh step of performing whole-group refresh, defined as an operation of INTRA-coding all blocks included in a group of blocks in a coding process for the same frame, on a group of blocks decided in the refresh selection step to be subjected to refresh.

According to a ninety-eighth aspect, in the ninety-seventh aspect, the storage medium contains a video coding program thereon for implementing on the computer unit operating environment further including a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks for which performance of refresh is decided in the refresh selection step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 35 is a block diagram showing the structures of conventional examples of an encoder and a decoder for video data;

DESCRIPTION OF THE PREFERRED EMBODIMENTS

First Embodiment

Figure 13:
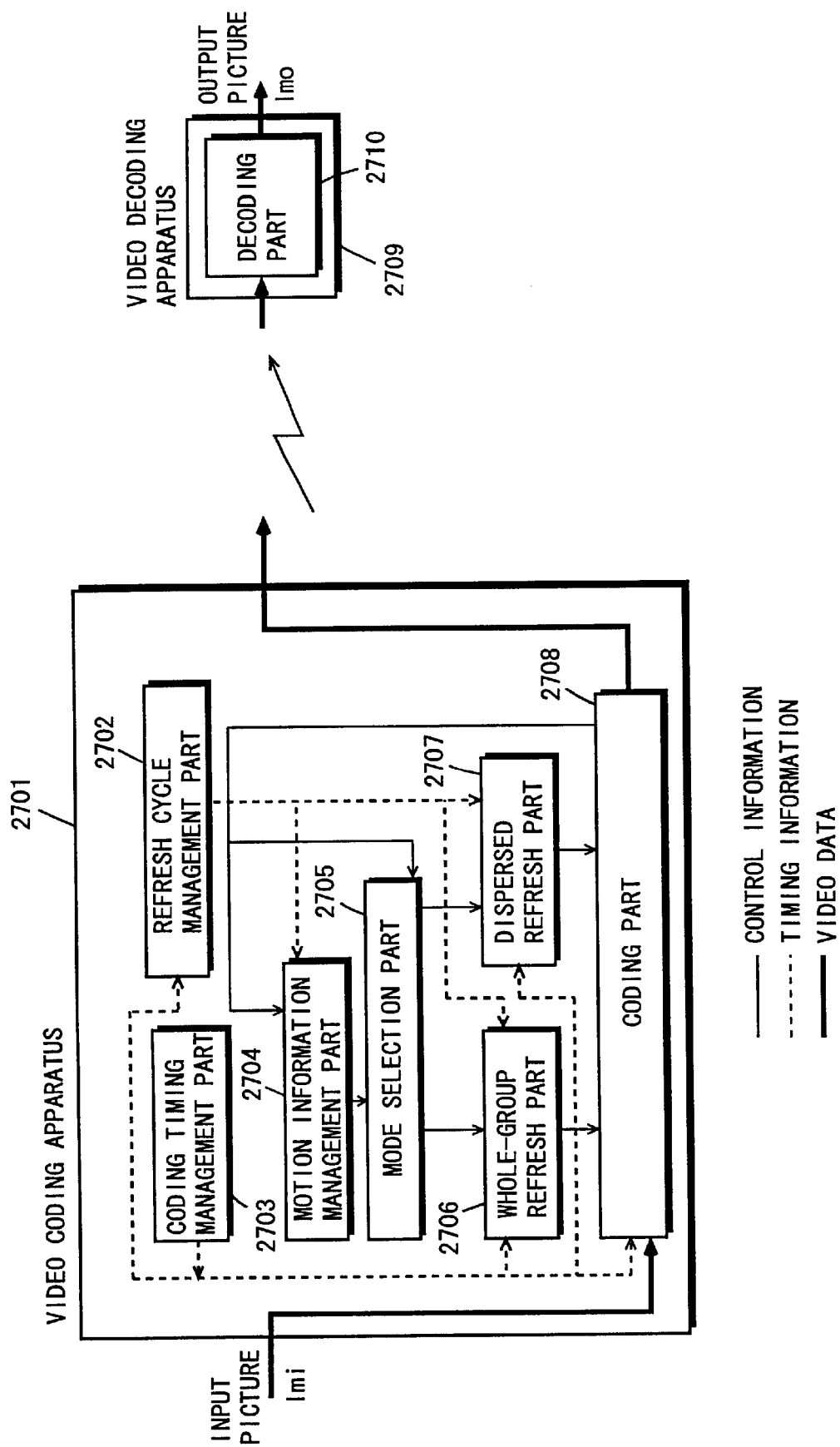
FIG. 13 is a block diagram showing the structure of a picture transmission system based on the video coding methods according to the first to seventh embodiments.

FIG. 13 is a block diagram showing the structure of a picture transmission system based on a video coding method according to a first embodiment of the present invention. This system comprises a video coding apparatus 2701 and a video decoding apparatus 2709. The video coding apparatus 2701 performs compression coding on an input picture Imi and transmits coded data obtained by the coding. The video decoding apparatus 2709 has a decoding part 2710, receives the coded data transmitted from the video coding apparatus 2701 and performs decoding by the decoding part 2710, and outputs a picture obtained by the decoding as an output picture Imo.

The video coding apparatus 2701 has a coding part 2708 performing coding combining inter-picture coding and intra-picture coding, and additionally comprises, for performing refresh by rendering the coding part 2708 perform INTRA coding, a refresh cycle management part 2702, a coding timing management part 2703, a motion information management part 2704, a mode selection part 2705, a whole-group refresh part 2706 and a dispersed refresh part 2707. The structure of the coding part 2708 is similar to the structure of a conventional encoder 116 shown in FIG. 33, and in this coding part 2708, selectors corresponding to the selectors 123 and 124 of the encoder 116 are controlled by the whole-group refresh part 2706 and the dispersed refresh part 2708.

Each part of such a video coding apparatus 2701 may be directly implemented by hardware, while the same can also be implemented employing software. In the latter case, each part of the video coding apparatus 2701 can be implemented by forming the video coding apparatus with a CPU (Central Processing Unit), a memory and an external memory device so that the CPU executes a prescribed program (hereinafter referred to as "video coding program") loaded from the external memory device in the memory, for example. In this case, the video coding program is typically provided by a storage medium (floppy disk, CD-ROM, DVD or the like) storing the program. In other words, the user sets a purchased storage medium in the aforementioned video coding apparatus 2701, make the apparatus read the video coding program stored therein and installs the same in a memory device such as a hard disk unit. Alternatively, a video coding program transmitted to the video coding apparatus 2701 through a communication line online may be installed in the memory device. Further, the maker may previously install the video coding program in the memory device before shipping the video coding apparatus. The program installed in such a manner is loaded in the memory from the memory device and executed by the CPU.

Operations of the video coding apparatus 2701 having the aforementioned structure are now described while noting a refresh operation.

Figure 1:
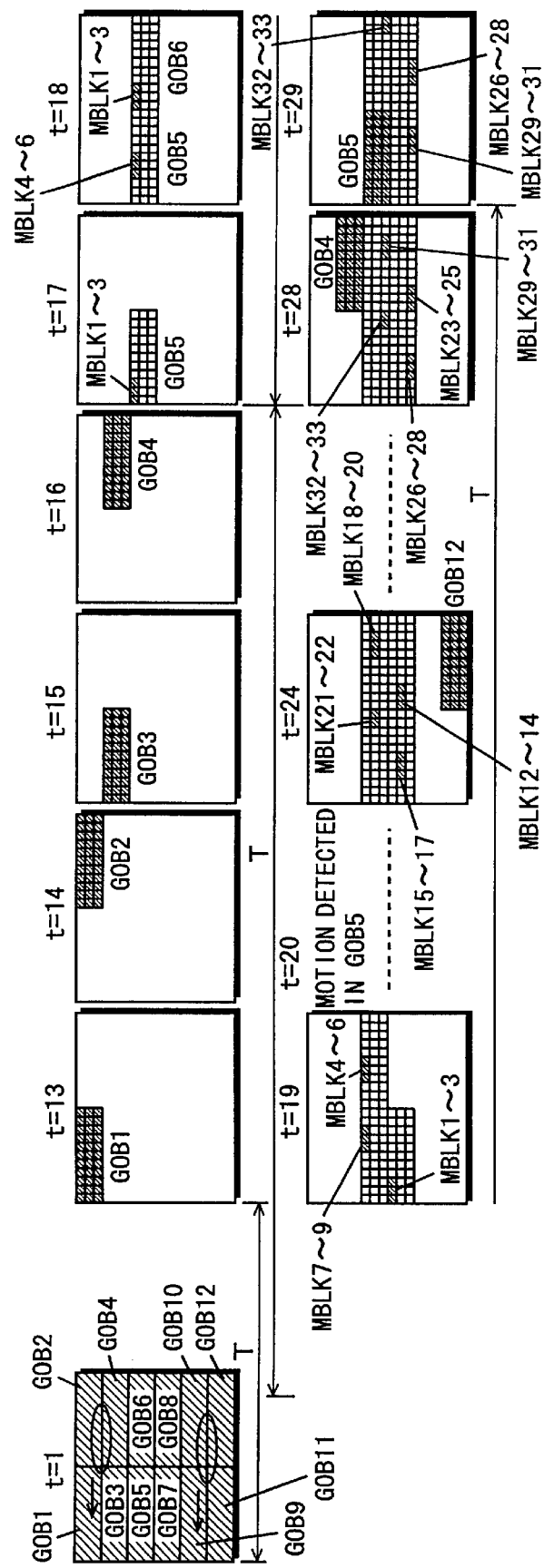
FIG. 1 is a diagram showing an exemplary refresh operation by a video coding method according to a first embodiment of the present invention.

FIG. 1 is a diagram showing an exemplary refresh operation in the case of applying the video coding method according to the first embodiment of the present invention to a CIF picture of H. 261 or H.263 recommended by ITU (International Telecommunication Union). The CIF picture is of 352 by 288 dots, and this is divided into 22 by 18 blocks in units of a macroblock (hereinafter referred to as "MBLK") of 16 by 16 dots, and a GROUP OF BLOCKS (hereinafter referred to as "GOB") is further formed every 11 by 3 blocks. In other words, the CIF picture is formed by 2 by 6 GOBs, and each GOB is further formed by 11 by 3 MBLKs. In this embodiment, "block" indicates MBLK, while "group of blocks" is not limited to GOB. The following description is made with reference to the case of assuming GOB as a group of blocks. Numbers from GOB1 to GOB12 are attached to GOBs in the order shown in FIG. 1. When refreshing the same by performing INTRA coding GOB by GOB every frame in the order of the numbers, for example, refresh on the whole of one screen completes in 12 frames. Therefore, the first description is made with reference to the case of assuming that a refresh cycle T is 12 frames. In the following description (also including description of other embodiments), it is assumed that a time or a period is thus expressed by the number of frames and it is regarded that coding performed on each block included in the same frame is performed at the same point. Further, it is assumed that groups of blocks having the same positions in the frame among groups of blocks in each frame are not distinguished but identified as the same groups of blocks and referred to with the same number.

For each GOB, the motion information management part 2704 determines whether or not there is motion of an object in the GOB during 12 frames previous to timing when the GOB is individually refreshed on the basis of information obtained from the coding part 2708 every frame. As to the method of determination, a method of comparing the magnitude of a motion vector of each MBLK in the GOB with a set threshold and assuming that there is motion in the object in the GOB if there are MBLKs having motion vectors exceeding the threshold in excess of a prescribed number can be employed. Alternatively, presence/absence of motion in the object in the GOB may be determined by comparing the coding quantity of each of 12 frames with a set threshold and determining that there is motion if there is at least one frame whose coding quantity exceeds the threshold. On the basis of the result of such determination of motion, the mode selection part 2705 selects one of a whole-group refresh mode and a dispersed refresh mode as the refresh mode. When there is motion in the object in the GOB, the mode selection part 2705 selects the whole-group refresh mode and the whole-group refresh part 2706 controls the selectors in the coding part 2708, thereby INTRA-coding all MBLKs belonging to the GOB simultaneously (i.e., in a coding process for the same frame), i.e., performing whole-group refresh on the GOB. When there is no motion in the object in the GOB, the mode selection part 2705 selects the dispersed refresh mode and the dispersed refresh part 2707 controls selectors in the coding part 2708, thereby performing INTRA coding on each MBLK in the GOB at timing varying with the MBLK (i.e., in a coding process for frames varying with the MBLK), i.e., performing dispersed refresh on the GOB. Timing information for coding including such refresh (INTRA coding) is generated by the coding timing management part 2703 and supplied to the coding part 2708 and the refresh cycle management part 2702. Timing information indicating the refresh cycle is generated by the refresh cycle management part 2702 and supplied to the motion information management part 2704, the whole-group refresh part 2706 and the dispersed refresh part 2707.

The aforementioned refresh operation in the video coding apparatus 2701 is described in further detail.

For a GOB having motion in the object in the GOB in 12 frames, all MBLKs belonging to the GOB are INTRA-coded in a next frame (whole-group refresh). Further, a determination of motion in following 12 frames is started from this frame. The GOB having no motion in the object in the GOB in 12 frames is subjected to refresh by INTRA coding from the next frame at timing varying with the MBLK (dispersed refresh). While how to vary the timing is not limited, circulation can be made in the GOB with 11 frames when INTRA-coding three MBLKs per frame, for example. Further, a determination of motion in 12 frames is made in parallel with this. FIG. 1 shows an operation in such a case that there has been motion in the object in GOB1 to GOB4 and in GOB9 to GOB12 in the first 12 frames. Referring to FIG. 1, slanted parts are blocks being INTRA-coded. From a point of a lapse of 12 frames, refresh in units of GOB is performed every frame from GOB1 successively to GOB4 (t=13 to t=16), while there has been no motion in GOB5 and hence dispersed refresh of GOB5 is started for INTRA-coding MBLKs1 to 3 (t=17). At the next timing, MBLK4 to MBLK6 are INTRA-coded for GOB5. Similarly there has been no motion in GOB6, and hence dispersed refresh of GOB6 is started for INTRA-coding MBLKs1 to 3 (t=18). Thereafter a similar operation is repeated. Motion has been detected in GOB5 at t=20, and hence whole-group refresh is performed on GOB5 at t=29.

Figure 2:
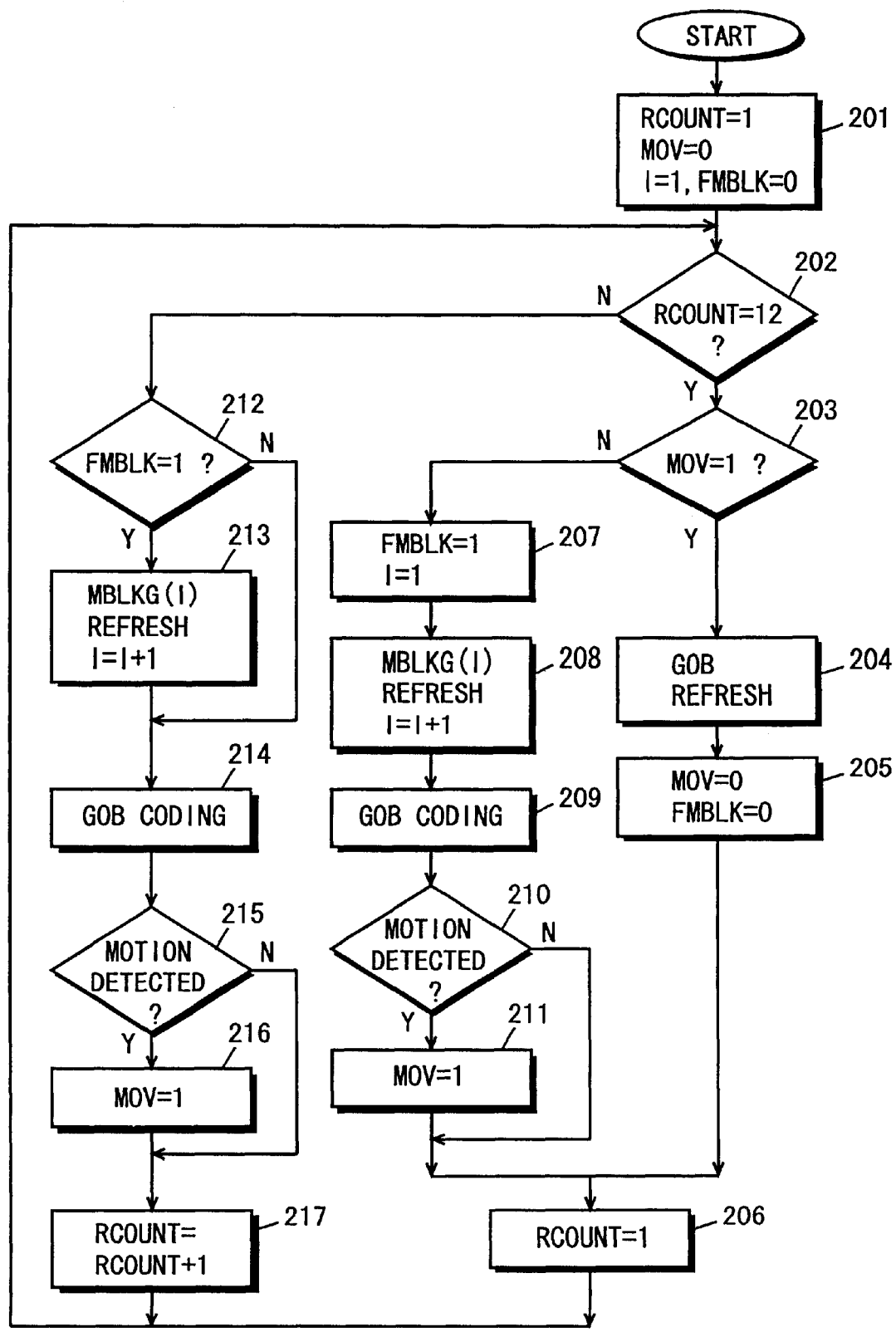
FIG. 2 is a flow chart showing the video coding method according to the first embodiment.

FIG. 2 is a flow chart showing the video coding method used in the video coding apparatus 2701, and shows the aforementioned operation for one GOB. Referring to FIG. 2, RCOUNT denotes a count value of the refresh cycle. MOV is a flag indicating presence/absence of motion in the object in the GOB, and "1" indicates that there is motion while "0" indicates that there is no motion. FMBLK is a flag indicating whether or not INTRA coding is performed at timing varying with the MBLK, i.e., a flag indicating whether or not dispersed refresh is performed, and "1" indicates that dispersed refresh is performed while "0" indicates that no dispersed refresh is performed. MBLKG(I) indicates a group, in classification of the MBLKs in the GOB into timing of I=1 to K, INTRA-coded every frame. These, which may correspond to the numbers of the MBLKs, are associated to be capable of performing refresh in such order that a refresh block is most visually inconspicuous.

In the video coding according to this embodiment, initialization of each variable and flag is first performed at a step 201. Namely, the refresh cycle management part 2702 initializes RCOUNT to "1", and the mode selection part 2705 initializes MOV to "0", I to "1" and FMBLK to "0" respectively. Then, the refresh cycle management part 2702 determines at a step 202 whether or not it is refresh timing. If the result is of refresh timing, the mode selection part 2705 determines at a step 203 whether or not there has been motion on the basis of the flag MOV. This flag MOV is set by the motion information management part 2704, as described later.

When it is determined at the step 203 that there has been motion in the GOB (when MOV=1), the mode selection part 2705 selects the whole-group refresh mode. In response to this selection, the whole-group refresh part 2706 performs at a step 204 whole-group refresh (also referred to as "GOB refresh") on the GOB, and the mode selection part 2705 resets MOV and FMBLK at a step 205. Thereafter the refresh cycle management part 2702 initializes RCOUNT to "1" at a step 206, and the process returns to the step 202 in order to perform coding on the next frame, for again determining whether or not it is the refresh cycle.

When it is determined at the step 203 that there has been no motion in the GOB (when MOV=0), the mode selection part 2705 sets FMBLK at a step 207 for selecting the dispersed refresh mode and sets I to "1". In response to this mode selection, the dispersed refresh part 2707 INTRA-codes MBLKs belonging to MBLKG(I) and increments I at a step 208. At a next step 209, the coding part 2708 performs coding of blocks in the GOB other than MBLKG(I). After this coding, the motion information management part 2704 determines at a step 210 whether or not there has been motion in the GOB in coding of the frame, and sets MOV at a step 211 when there has been motion. Thereafter the refresh cycle management part 2702 initializes RCOUNT to "1" at a step 206 and the process returns to the step 202 in order to perform coding for a next frame, for again determining whether or not it is the refresh cycle.

When it is determined at the step 202 that it is not refresh timing, the mode selection part 2705 determines at a step 212 whether or not it is the dispersed refresh mode on the basis of the flag FMBLK. In the case of the dispersed refresh mode (when FMBLK=1), the dispersed refresh part 2707 INTRA-codes a group of MBLKs indicated by MBLKG(I) and increments I at a step 213. At a next step 214, the coding part 2708 performs coding of the blocks other than MBLKG (I) in the GOB. After this coding, the motion information management part 2704 determines at a step 215 whether or not there has been motion in the GOB in coding of the frame, and sets MOV at a step 216 if there has been motion. Thereafter the refresh cycle management part 2702 increments RCOUNT at a step 217 and the process returns to the step 202 in order to perform coding on the next frame, for again determining whether or not it is the refresh cycle.

In the video coding according to this embodiment, the operations of the aforementioned steps 201 to 217 are performed on every GOB.

According to this embodiment, as hereinabove described, a refresh block by INTRA coding of a group of blocks having no motion is divided into a number of transmission frames in a refresh cycle for refreshing one screen with no overhead. Thus, the number of INTRA-coded blocks per frame decreases and quantization in a smaller quantization step is enabled. Further, cyclic motion of a group of blocks is dispersed in the refresh cycle, whereby a disturbance line can be eliminated in a still picture region. In addition, dispersed refresh is performed for a group of blocks having no motion, whereby, even if a transmission error occurs in a block finally refreshed as a group of blocks at a point when motion of a group of blocks having motion disappears, it is possible to refresh this.

Figure 3:
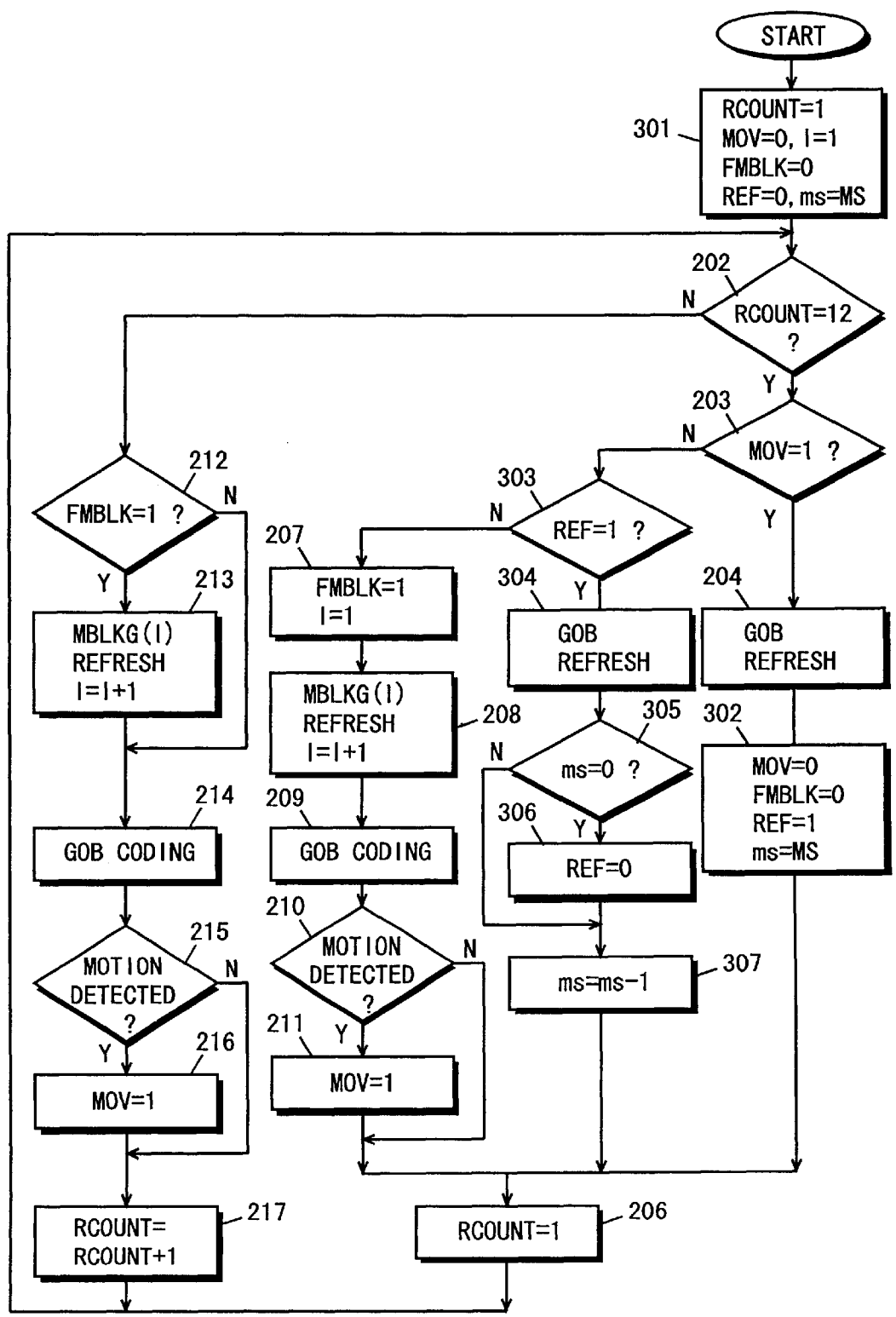
FIG. 3 is a flow chart showing a video coding method according to a modification of the first embodiment of the present invention.

In order to, when a transmission error occurs in a block finally refreshed as a group of blocks at a point when motion of a group of blocks having motion disappears, simultaneously refresh this, the group of blocks may be simultaneously refreshed at least once at the point when the motion of the group of blocks having motion disappears. FIG. 3 is a flow chart showing the video coding method of this case as to one GOB, and corresponds to the flow chart shown in FIG. 2. In this video coding method, a flag REF and a variable ms showing the count value are newly introduced and initialized at a step 301 along with RCOUNT, MOV, I and MBLK. In other words, the mode selection part 2705 sets REF=0 and ms=MS at a step 301 (where MS represents a predetermined natural number). As to a group of blocks simultaneously GOB refreshed, i.e., a group of blocks to be subjected to whole-group refresh, the mode selection part 2705 sets REF=1 and ms=MS at a step 302, and even if it is determined that there is no motion at a step 203, the mode selection part 2705 selects the whole-group refresh mode at a step 303 on the basis of the flag REF. In response to this selection, the whole-group refresh part 2706 performs GOB refresh at a step 304. This is repeated MS times until REF=0 at steps 305, 306 and 307 executed by the mode selection part 2705. In this case, further, the frequency for performing refresh at timing varying with the block may be reduced so that the dispersed refresh part 2707 completes refresh of the group of blocks in a cycle T' larger than T. In this case, coding efficiency can be improved while suppressing influence by a transmission error small by reducing the number of INTRA-coded blocks in a group of blocks where a still picture is continuous.

While it is assumed in the aforementioned first embodiment that the determination method of comparing the magnitude of a motion vector of each MBLK in the GOB with the set threshold and regarding that there is motion in the object in the GOB if MBLKs having motion vectors exceeding the threshold are present in excess of the set number or the determination method of comparing the coding quantity of each of 12 frames with the set threshold value and determining that there is motion in the object if there is at least one frame whose coding quantity exceeds the threshold is employed for the determination as to whether or not there is motion in the object in GOB, a determination method of comparing the motion vector absolute value total of each MBLK in the GOB with the set threshold and determining that there is motion in the object in the GOB when it exceeds the threshold may be employed in place thereof.

Second Embodiment

A video coding method according to a second embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

As described with reference to the description of background art, even if the number of blocks of a group of blocks simultaneously refreshed by INTRA coding is halved, blocks to be subjected to INTRA coding over two frames or three frames or blocks inhibited from motion compensation over two frames or three frames are increased and hence the coding efficiency is reduced while the generated coding quantity is not much reduced. In other words, even if reducing increase of a coding quantity per frame by dividing one screen into a plurality of groups of blocks and refreshing a group of blocks by INTRA coding per frame, it has been impossible to extremely reduce the increase of the coding quantity when considering propagation of mismatch resulting from motion prediction. Therefore, in the second embodiment of the present invention, timing of refresh by a whole-group refresh part 2706 is managed so that a refresh cycle management part 2702 introduces a frame including no group of blocks to be subjected to whole-group refresh into a refresh cycle. Thus, the coding efficiency is improved by INTER differential coding for improving the picture quality. Here also, the description is made with reference to the case of the CIF picture of H.261 or H.263 recommended in ITU. When setting the refresh cycle T=33 frames and performing refresh in units of a GOB in continuous 12 frames therein, for example, frames not to be subjected to refresh in the unit of GOB are 21 frames, the coding efficiency is high during this period and the picture quality can be improved by the improvement of the efficiency when considering the coding quantity as constant. Further, the refresh can be performed in about one second.

Figure 4:
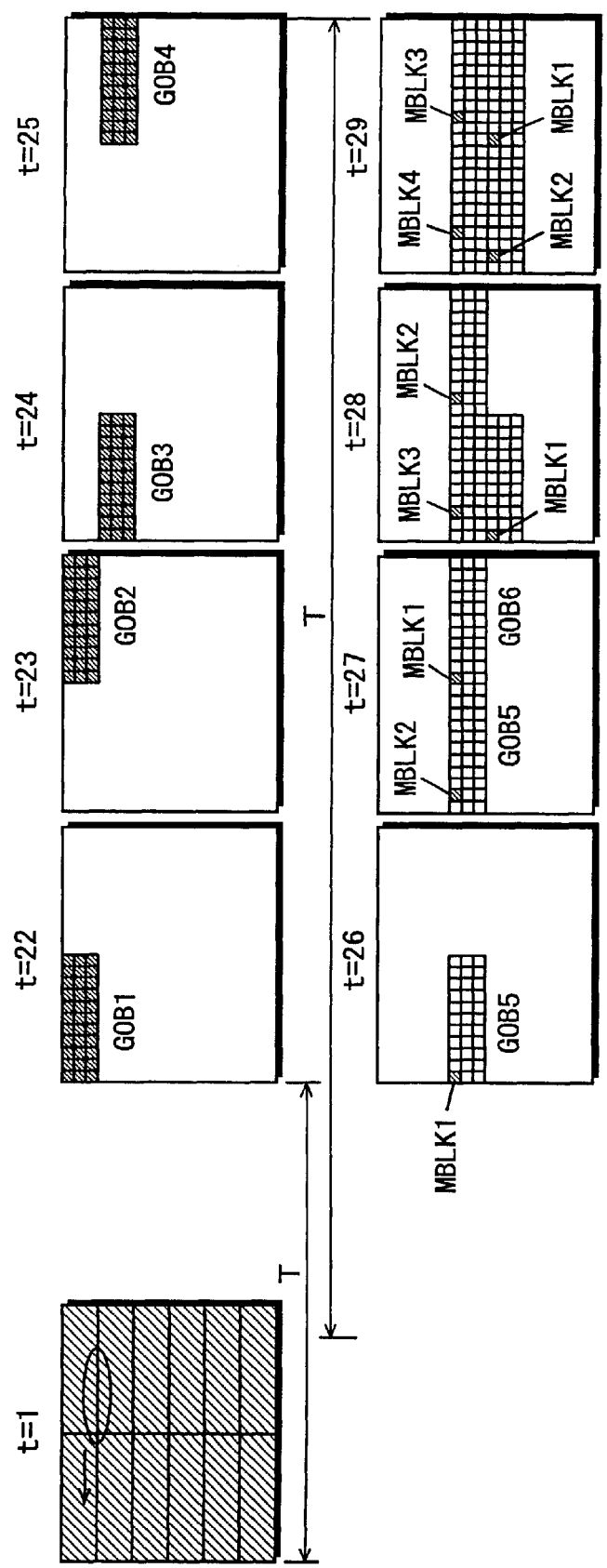
FIG. 4 is a diagram showing an exemplary refresh operation in a video coding method according to a second embodiment of the present invention.

In this embodiment, further, a dispersed refresh part 2707 disperses refresh of the GOB to be coded at timing varying with the MBLK described with reference to the first embodiment in the refresh cycle, thereby improving the coding efficiency. While the first embodiment INTRA-codes 3 MBLKs per frame in order to refresh the MBLKS in the GOB in 11 frames, MBLKS of the GOB may be refreshed in 33 frames in this embodiment when setting the refresh cycle to 33 frames as described above, for example, and hence one MBLK may be INTRA-coded per frame. In the video coding method of this embodiment in the case of thus setting the refresh cycle to 33 frames, a refresh operation is performed as shown in FIG. 4. FIG. 4 corresponds to FIG. 1 in the first embodiment, and parts slanted in FIG. 4 are blocks (MBLK) being subjected to INTRA coding.

Figure 5:
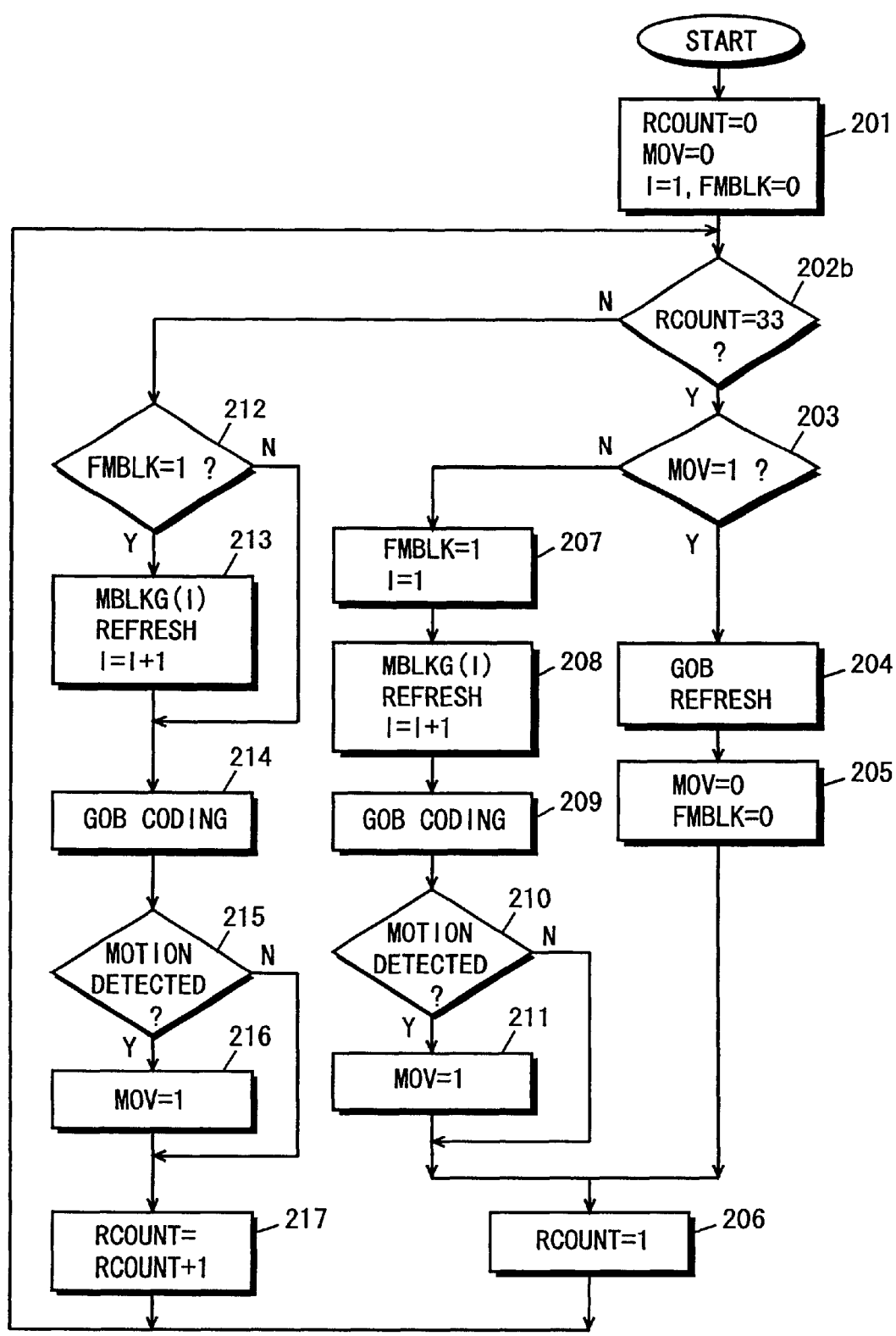
FIG. 5 is a flow chart showing the video coding method according to the second embodiment.

FIG. 5 is a flow chart showing the video coding method according to this embodiment as to one GOB. In this flow chart, the step 202 of the flow chart shown in FIG. 2 is replaced with a step 202b for determining whether or not a count value RCOUNT of the refresh cycle is equal to "33". Thus, the refresh cycle management part 2702 manages the timing of whole-group refresh by the whole-group refresh part 2706 and dispersed refresh by the dispersed refresh part 2707 and sets the refresh cycle to 33 frames. In this case, MBLKG(I) each becomes one MBLK, while the refresh may be rendered inconspicuous by performing mapping in order different from the number of MBLK.

According to this embodiment, as hereinabove described, the number of INTRA-coded blocks to be INTRA-coded decreases below the number of blocks of the group of blocks in a frame including no group of blocks to be subjected to whole-group refresh, whereby both effects of video coding in high efficiency and refresh by INTRA coding can attained.

Third Embodiment

A video coding method according to a third embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

In the first embodiment or the second embodiment, the dispersed refresh is not interrupted even if, while performing dispersed refresh on a certain group of blocks, motion is detected in the object of the group of blocks. Even if motion is detected in GOB5 at t=20 in FIG. 1, for example, GOB5 is thereafter also refreshed at timing varying with the block. In this case, the group of blocks is simultaneously refreshed at an end point (t=29) of the refresh cycle. In this embodiment, therefore, when a motion information management part 2704 detects motion in the object in the group of blocks while performing dispersed refresh, a mode selection part 2705 makes a dispersed refresh part 2707 interrupt the dispersed refresh.

Figure 6:
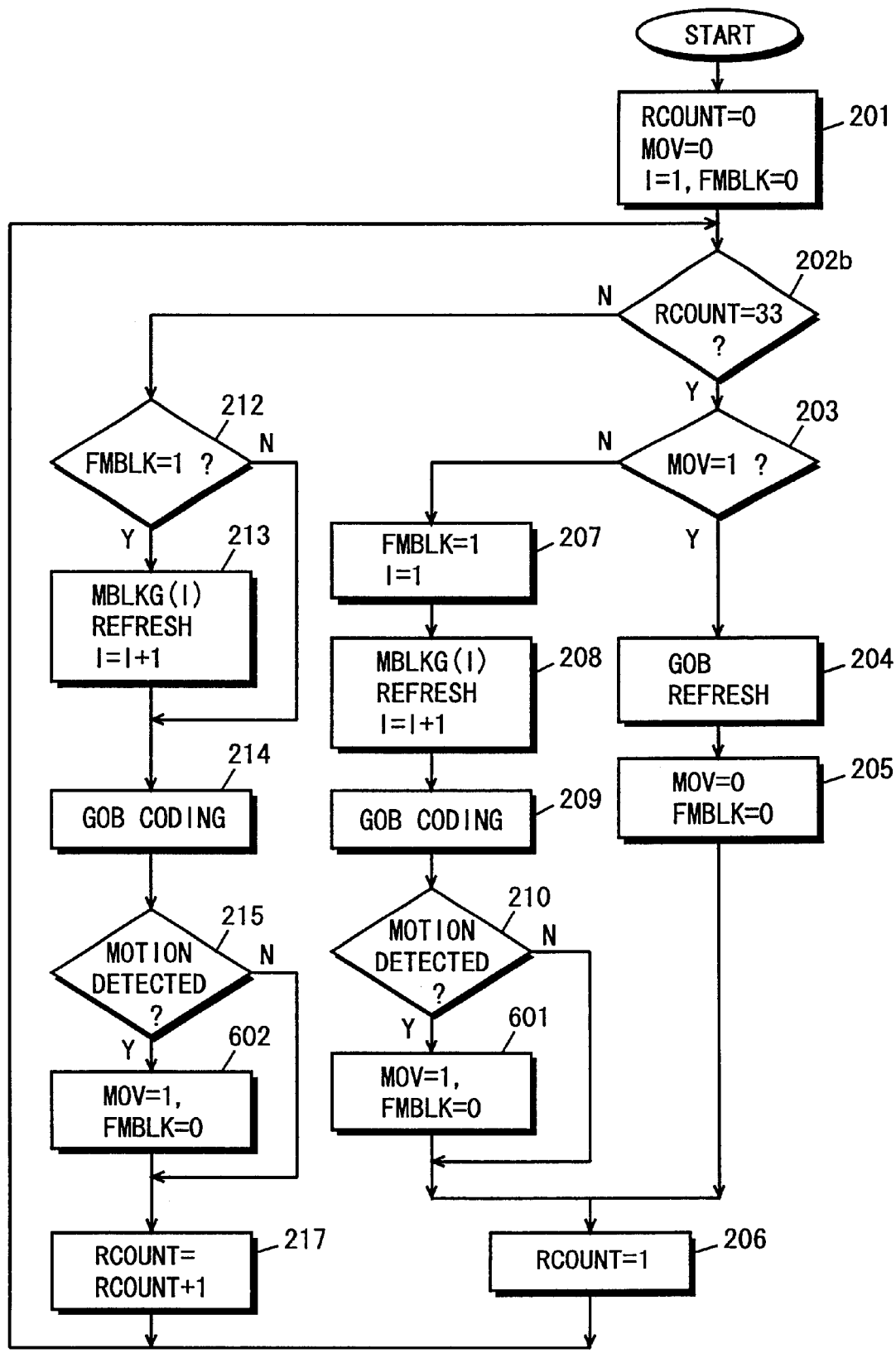
FIG. 6 is a flow chart showing a video coding method according to a third embodiment of the present invention.

FIG. 6 is a flow chart showing the video coding method according to this embodiment as to one GOB. In this flow chart, the step 211 and the step 216 of the flow chart shown in FIG. 5 are changed to a step 601 and a step 602 respectively. In these steps 601 and 602, the motion information management part 2704 resets FMBLK when motion is detected. Thus, the dispersed refresh by the dispersed refresh part 2707 is interrupted (see the step 212).

Figure 7:
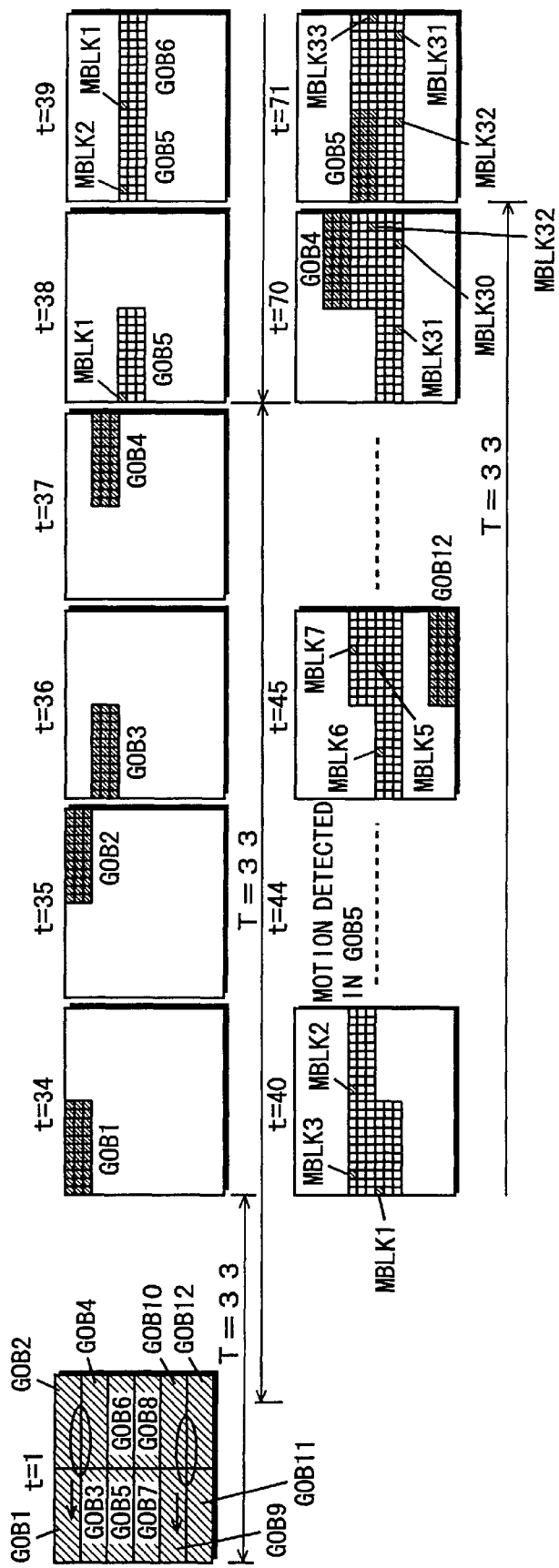
FIG. 7 is a diagram showing an exemplary refresh operation in the video coding method according to the third embodiment.

FIG. 7 is a diagram showing an exemplary refresh operation in this embodiment. When motion is detected in GOB5 at t=44 as shown in FIG. 7, the dispersed refresh part 2707 interrupts the operation of performing refresh at timing varying with the block in GOB5 after a next frame, and the whole-group refresh part 2706 simultaneously refreshes GOB5 at a point t=71 after a lapse of a period of 33 frames starting from a point t=38 when dispersed refresh of GOB5 is started.

According to this embodiment, as hereinabove described, blocks of a group of blocks to be subjected to whole-group refresh after a lapse of a time T from start of the dispersed refresh are not subjected to dispersed refresh up to a point of the whole-group refresh after motion is detected, whereby the coding efficiency is further improved.

Fourth Embodiment

A video coding method according to a fourth embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

In the third embodiment, when a transmission error occurs in a group of blocks to be subjected to whole-group refresh and motion of an object in the region of the group of blocks disappears, no whole-group refresh is performed on this group of blocks after a lapse of the time T from the point of the whole-group refresh while dispersed refresh starts after one refresh cycle from this point. In the worst case, therefore, it follows that influence by the error remains for a time twice the refresh cycle. In this embodiment, therefore, a dispersed refresh part 2707 performs dispersed refresh from a point starting determination of presence/absence of motion of an object every group of blocks, a motion information management part 2704 determines presence/absence of motion of the object every group of blocks every time coding one frame in parallel therewith up to a lapse of a time T, and with respect to a group of blocks in which motion exceeding a predetermined threshold is detected in the object, a mode selection part 2705 makes the dispersed refresh part 2707 interrupt the dispersed refresh at the point, and a whole-group refresh part 2706 whole-group refreshes this group of blocks after a lapse of a time T from the point starting the dispersed refresh.

Figure 8:
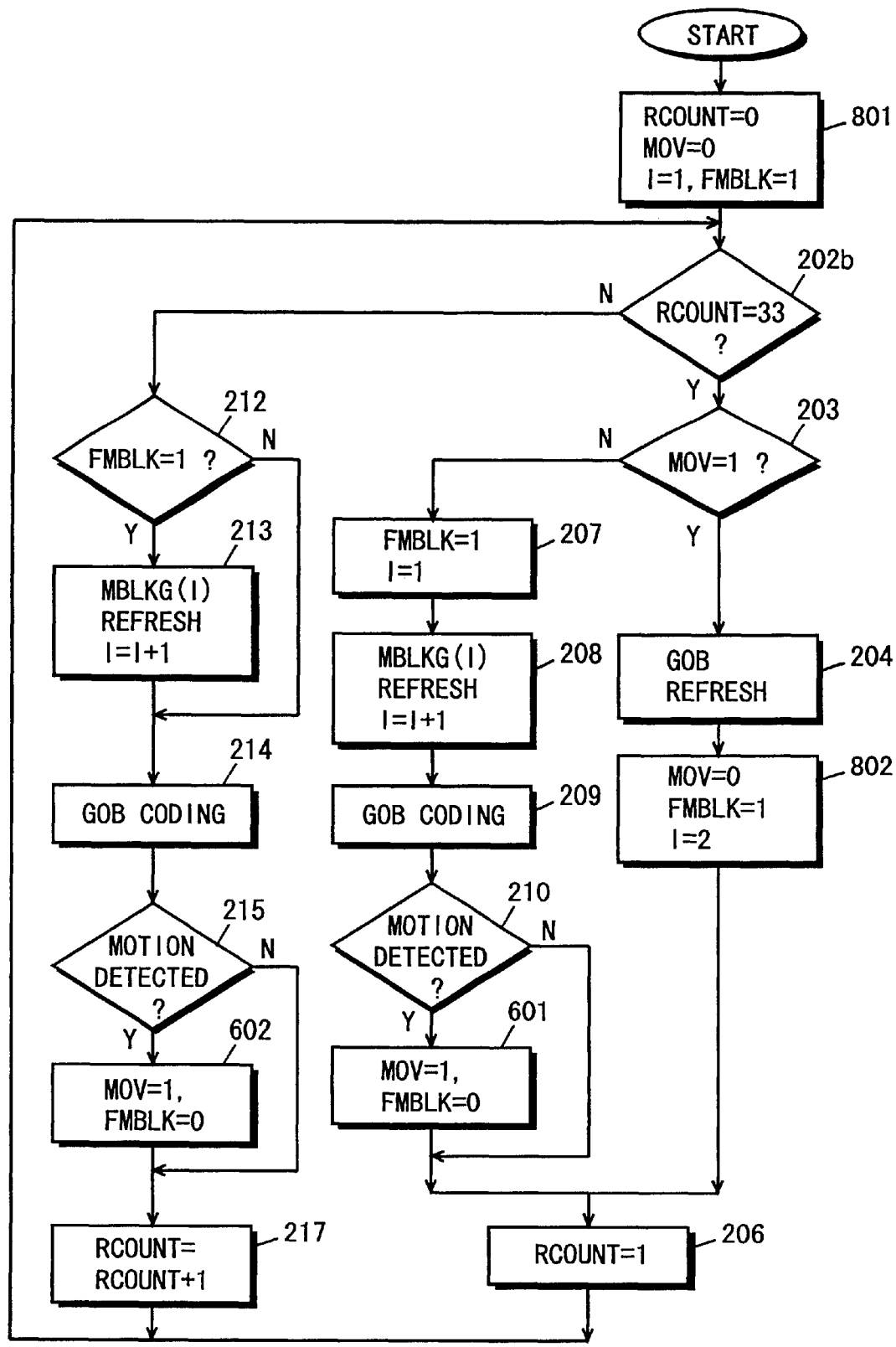
FIG. 8 is a flow chart showing a video coding method according to a fourth embodiment of the present invention.

FIG. 8 is a flow chart showing the video coding method according to this embodiment as to one GOB. In this flow chart, the step 201 and the step 205 of the flow chart shown in FIG. 6 are changed to a step 801 and a step 802 respectively. In these steps 801 and 802, a mode selection part 2705 sets FMBLK.

Figure 9:
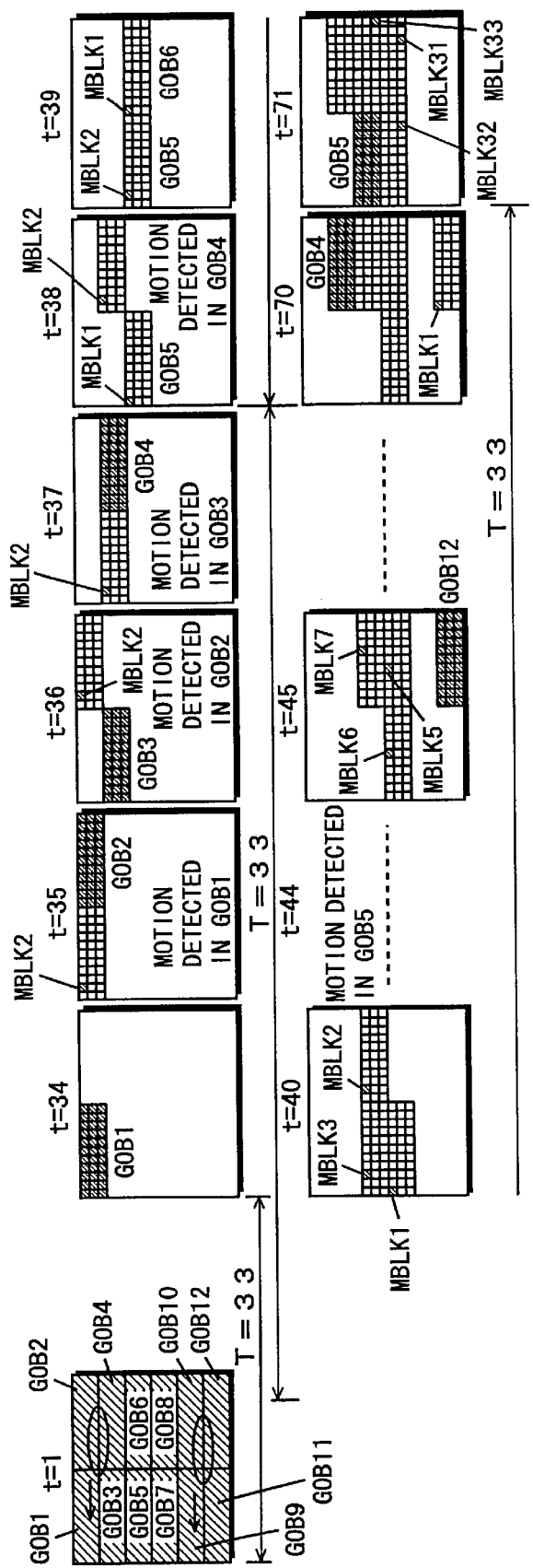
FIG. 9 is a diagram showing an exemplary refresh operation in the video coding method according to the fourth embodiment.

FIG. 9 is a diagram showing an exemplary refresh operation in this embodiment. As shown in FIG. 9, FMBLK=1 at the step 802 as to GOB1 on which whole-group refresh is performed at t=34, and hence the process advances to a step 213 on the basis of a determination result at a step 212. In other words, the mode selection part 2705 selects a dispersed refresh mode on the basis of FMBLK, whereby the dispersed refresh part 2707 starts dispersed refresh for GOB1 (t=35 in FIG. 9). In this case, however, there is motion of an object in the region of GOB1 and hence the process advances to a step 602 on the basis of a determination result in a step 215 in FIG. 8 and FMBLK is reset (FMBLK=0). Thus, the dispersed refresh for GOB1 is interrupted in a frame subsequent to the point (t=36). Further, since MOV=1 is set at the step 602, whereby whole-group refresh is performed for GOB1 at a point when RCOUNT=33.

According to this embodiment, as hereinabove described, whether a transmission error occurs in a group of blocks to be subjected to whole-group refresh and no dispersed refresh is performed after a lapse of a time T since motion of the object in the region of the group of blocks disappears or a transmission error occurs in a block for which dispersed refresh is being performed, every block of the group of blocks is necessarily refreshed by dispersed refresh up to a lapse of the time T.

As to a group of blocks to be subjected to whole-group refresh, detection of motion may be performed in advance in a next frame, for avoiding transmission of a block refreshed at different timing when there is motion in continuation.

Figure 10:
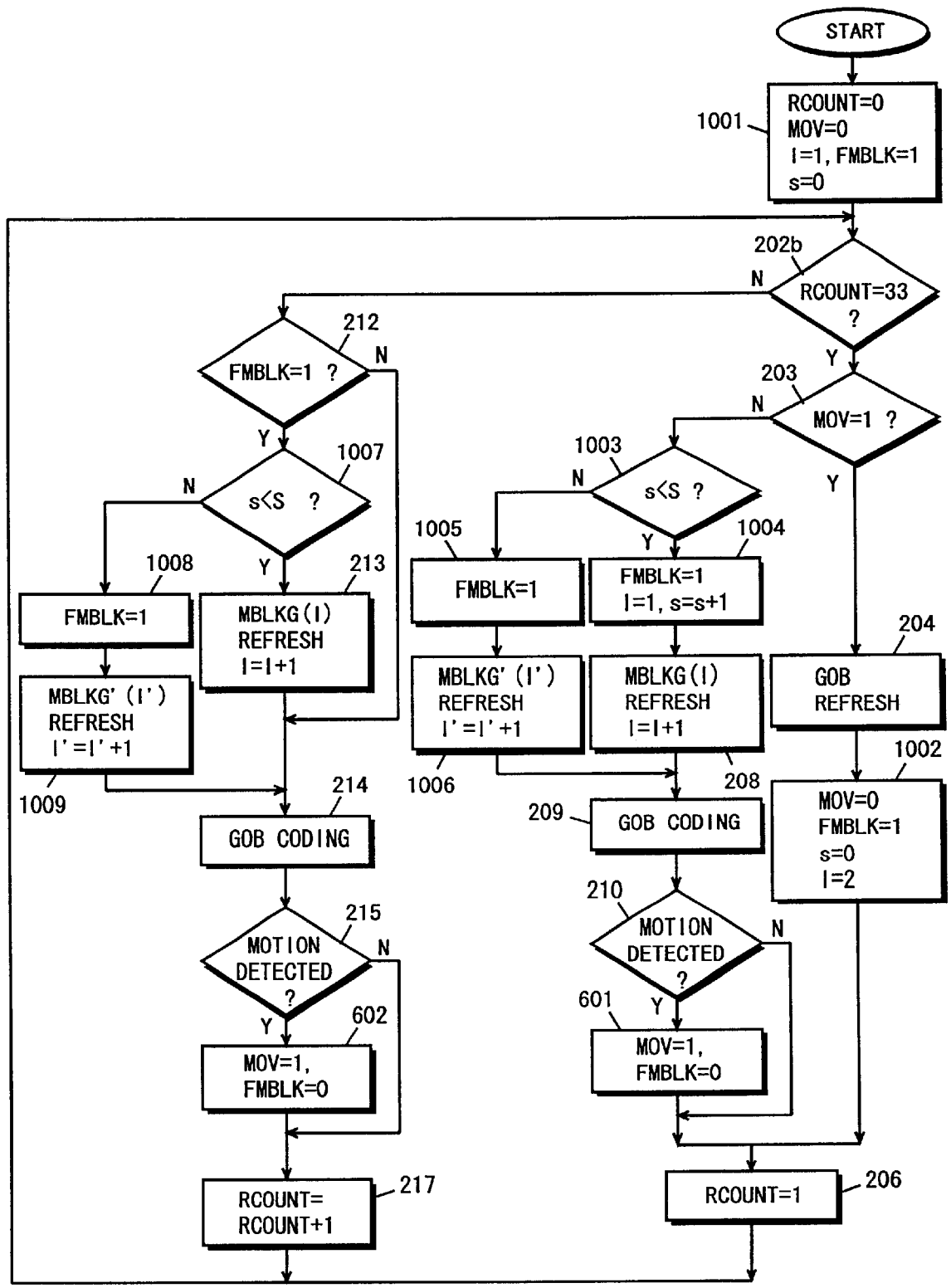
FIG. 10 is a flow chart showing a video coding method according to a modification of the fourth embodiment.

The coding efficiency can be improved while suppressing influence by a transmission error small by rendering the refresh cycle of dispersed refresh on a GOB greater than T, in which a still state continues. FIG. 10 is a flow chart showing an example of such a video coding method as to one GOB. In this flow chart, a variable s is newly introduced and the steps 801, 802 and 207 of the flow chart shown in FIG. 8 are changed to a step 1001 including initialization of the variable s, a step 1002 including initialization of the variable s and a step 1004 including increment of the variable s while steps 1003, 1005, 1006, 1007, 1008 and 1009 are newly added. In the video coding method shown by this flow chart, GOB is whole-group refreshed at a step 204, thereafter the mode selection part 2705 sets s=0 at the step 1002, and until the variable s reaches a previously set value S, the dispersed refresh part 2707 performs refresh at timing varying with the block according to hitherto MBLKG(I) at a step 208 or 213 on the basis of a determination at the step 1003 or 1007. When the variable s reaches S, the mode selection part 2705 sets FMBLK at the step 1005 or 1008 and thereafter the dispersed refresh part 2707 performs refresh at the step 1006 or 1009 in MBLKG'(I') at different timing from MBLKG(I). A frame not to be subjected to refresh may be present in MBLKG'(I'), and a time for entirely refreshing a group of blocks is greater than T. FIG. 10 is modulo that I' returns to 1 when reaching a certain value.

For a determination as to whether or not there is motion in the object in the GOB, a method such as that described with reference to the first embodiment can be employed. Alternatively, a method of comparing the motion vector absolute value total of each MBLK in the GOB with a previously set threshold and determining that there is motion in the object in the GOB when the total exceeds the threshold may be employed.

Fifth Embodiment

A video coding method according to a fifth embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

Figure 11A:
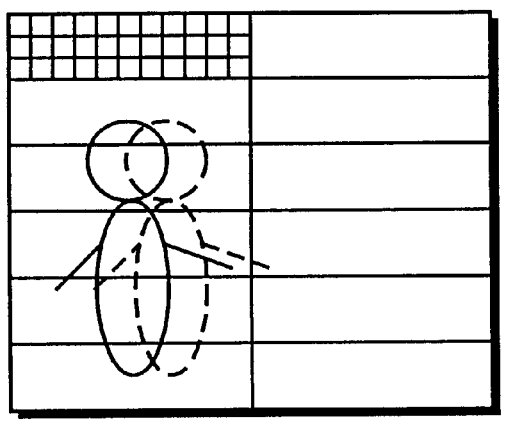
FIGS. 11A to 11C are diagrams showing exemplary refresh operations in a video coding method according to a fifth embodiment of the present invention.
Figure 11B:
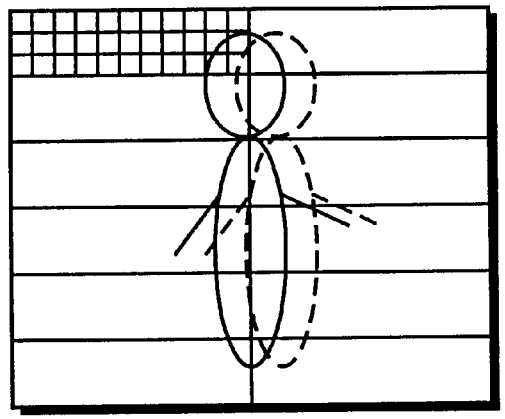

When regarding a group of blocks as a GOB as in the first to fourth embodiments and a moving object moves in either the left or right region of a screen as shown in FIG. 1A, dispersed refresh is performed on a group of blocks of the remaining half region while, when the moving object moves at the center of the screen as shown in FIG. 11B, motion is detected in all groups of blocks and hence whole-group refresh is performed on all groups of blocks. While this problem can be avoided when selecting the group of blocks in a region smaller than the GOB, blocks to be subjected to INTRA coding over two frames or three frames or blocks inhibited from motion compensation over two frames or three frames increase even if halving the number of blocks of a group of blocks to be subjected to whole-group refresh as described with reference to the description of background art, and hence the coding efficiency is reduced and the generated coding quantity is not much reduced. On the other hand, frames including a group of blocks to be subjected to whole-group refresh increase when the number of the groups of blocks increases and hence frames including no group of blocks to be subjected to whole-group refresh decrease assuming that the refresh cycle is left intact. Consequently, the coding efficiency is reduced and the picture quality is deteriorated. In this embodiment, therefore, a group of blocks is further L-divided while leaving intact the magnitude of the group of blocks and the timing for whole-group refresh for the group of blocks in the video coding method according to the third embodiment or the fourth embodiment, a motion information management part 2704 determines motion of an object for each region obtained by the dividing and a whole-group refresh part 2706 simultaneously refreshes a region determined as having motion exceeding a predetermined threshold in an object at timing for refreshing a group of blocks including the region.

Figure 11C:
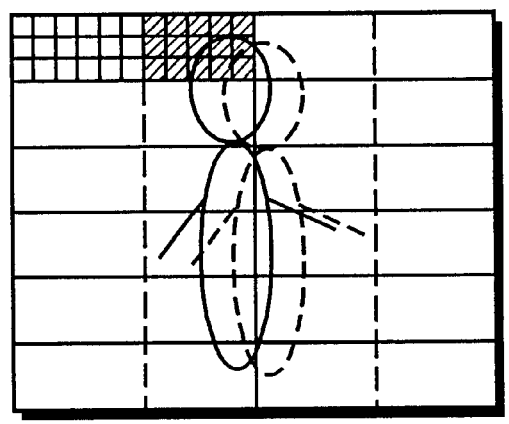

For example, each GOB is divided into two left and right regions, as shown in FIG. 11C. In this case, presence/absence of motion is independently detected on the left and the right as to each GOB for also independently deciding whether the region is simultaneously refreshed or a block in the region is refreshed at different timing. However, the timing for performing refresh is rendered common. In other words, this embodiment assumes that, in this case, the timing for refreshing each of the left and right regions of each GOB is identical and detection of motion and selection of a refresh mode are independently performed as to each of the left and right regions of each GOB, and executes each step shown in any flow chart of FIG. 2, FIG. 3, FIG. 5, FIG. 6, FIG. 8 and FIG. 10, thereby performing video coding.

In the following description, it is assumed that an operation of simultaneously refreshing each block of regions obtained by dividing each GOB is also referred to as "whole-group refresh", and an operation of refreshing each block of the regions obtained by dividing each GOB at timing varying with the block is also referred to as "dispersed refresh".

According to this embodiment, as hereinabove described, motion of an object small as compared with a group of blocks can be efficiently refreshed, and it is possible to obtain a picture having smaller disturbance resulting from refresh.

While the GOB is divided into two left and right portions, the method of dividing is not restricted to this but the GOB may be divided into three portions, i.e., left, middle and right portions, or may be divided into upper and lower portions. Further, the dividing may not be uniform.

Sixth Embodiment

A video coding method according to a sixth embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

In the case of FIG. 11A shown in the description of the fifth embodiment, only the GOB of the left half becomes a simultaneously refreshed group of blocks (i.e., a group of blocks of whole-group refresh), while the GOB on the right half becomes a group of blocks dispersively refreshed in the refresh cycle (i.e., a group of blocks of dispersed refresh). When refreshing the GOB on the right half after successively refreshing the GOB on the left half in this case, simultaneously refreshed frames are continuous six frames and the remaining 27 frames are continuous frames not simultaneously subjected to refresh, remarkably advantageously in view of the coding efficiency. When the object transversely moves as shown in FIG. 1, on the other hand, the coding efficiency is rather improved when successively refreshing the left and right GOBS.

Therefore, this embodiment changes the order of refreshing the groups of blocks in the video coding methods according to the first to fifth embodiments in response to the characteristics of an object of a picture to be coded and transmitted. In other words, this embodiment refreshes vertically and transversely arranged groups of blocks in the vertical direction when the object is vertically long or the object moves in the vertical direction while transversely refreshing the vertically and transversely arranged groups of blocks when the object is transversely long or the object moves in the transverse direction. In more concrete terms, refresh is performed in order of GOB1→GOB2→GOB3→. . . GOB12, giving preference to the transverse direction as shown in FIG. 1 when the object is transversely long or moves in the transverse direction, while refresh is performed in order of GOB1→GOB3→GOB11→GOB2→GOB4→. . . GOB12, giving preference to the vertical direction when the object is vertically long or moves in the vertical direction. Switching of the refresh direction, i.e., which one of the vertical direction and the transverse direction is given preference as the refresh direction may be decided from the start, in the case that the object is determined, may be rendered selectable in response to the object, or may be adaptively switched with supposition from the pattern of a simultaneously refreshed GOB. When adaptively switching the refresh direction with assumption from the pattern of a GOB to be subjected to whole-group refresh, the shape (whether vertically long or transversely long) of the object and the motion direction are supposed with information of a motion vector and the like obtained from a coding part 2708, for example, and a whole-group refresh part 2706 performs refresh in an order based on the result of the supposition.

According to this embodiment, as hereinabove described, groups of blocks to be subjected to whole-group refresh are continuous, whereby refresh can be efficiently performed while the number of continuous frames including no groups of blocks to be subjected to whole-group refresh increases and hence the picture quality can be improved by highly efficient video coding utilizing Inter-frame correlation.

Seventh Embodiment

A video coding method according to a seventh embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

In the aforementioned first to sixth embodiments, the predetermined threshold is employed for determination as to whether or not whole-group refresh is performed on a divided region for performing whole-group refresh when motion of an object in the divided region exceeds the threshold on the assumption that the region has motion. However, when fixing the threshold for determining whether or not whole-group refresh is performed as described above, the following problem arises:

When a camera vibrates due to manual holding or the camera vibrates even in a fixed state due to external environment such as a wind or automobiles passing by and the vibration of the camera is greater than the threshold employed for the determination as to whether or not whole-group refresh is performed, the object is determined as moving although not moving, and even a region not moving in practice is subjected to whole-group refresh. Consequently, compressibility lowers to result in a picture having deteriorated picture quality. When the directions of the vibration of the camera and the motion of the object are opposite to each other and the motion of the object is canceled, such inconvenience takes place that a region not moving in practice is determined as a moving region and subjected to whole-group refresh or a region moving in practice is determined as not moving and subjected to no whole-group refresh. When the threshold employed for the determination as to whether or not whole-group refresh is performed is set high in order to overcome the aforementioned inconvenience, in the case that and the motion of the object is small, a region where the object moves in practice is determined as a region having no motion of the object and subjected to no whole-group refresh despite the motion. Assuming that a transmission error occurs at this time, picture quality deterioration resulting from mismatch between frame memories on the coding side and the decoding side propagates to subsequent picture frames.

The seventh embodiment of the present invention is characterized in that, in order to solve the aforementioned problem, threshold set processing of not fixing a threshold employed for determination as to whether or not whole-group refresh is performed but setting the threshold in response to vibration of a camera every time coding a frame.

Figure 12:
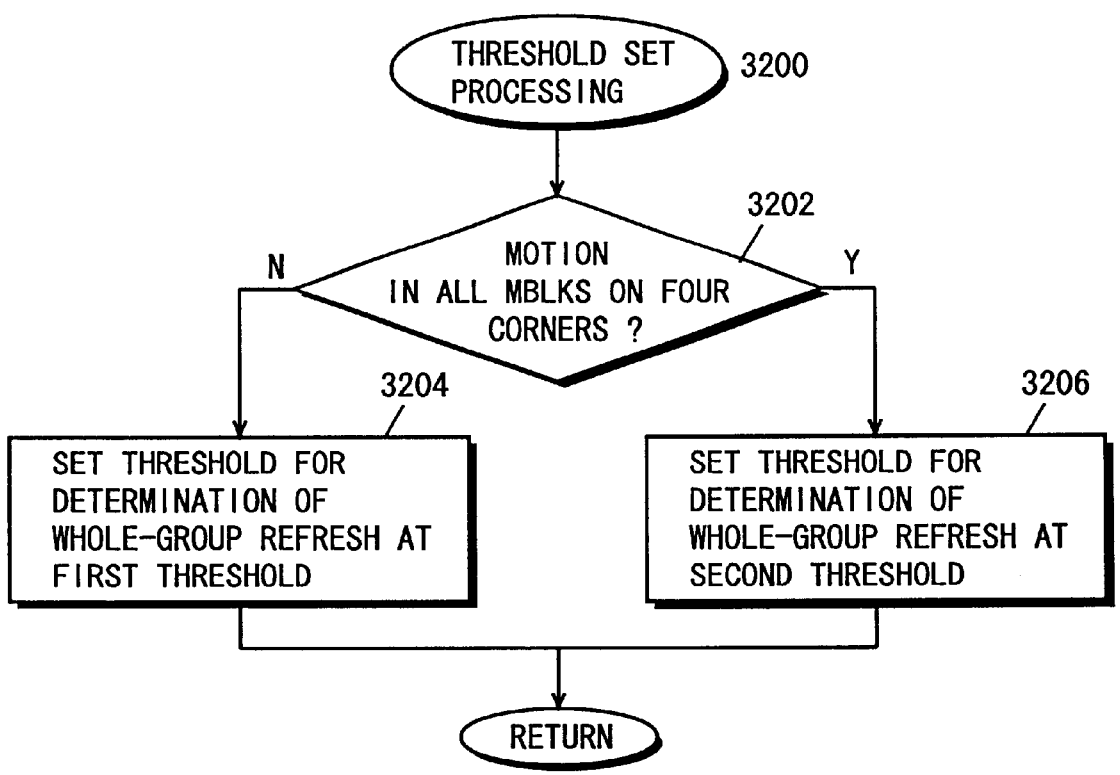
FIG. 12 is a flow chart showing the procedure of threshold set processing in a video coding method according to a seventh embodiment of the present invention.

FIG. 12 is a flow chart showing the procedure of the threshold set processing in this embodiment. In this embodiment, two thresholds, i.e., a first threshold employed when the camera has no vibration and a second threshold employed when the camera vibrates are previously prepared, and the second threshold is set to be greater than the first threshold. This threshold set processing is executed by a motion information management part 2704 every time coding a frame. In this embodiment, a determination is first made as to whether or not the camera vibrates by detecting whether or not there is motion in all MBLKs on four corners in a picture frame in this threshold set processing (step 3202). If there is at least one MBLK having no motion in the MBLKs on four corners in the picture frame, it is determined that the camera is not in vibration and the threshold employed for determining whether or not whole-group refresh is performed is set at the first threshold (step 3204). When there is motion in all MBLKs on the four corners in the picture frame, on the other hand, it is determined that the camera vibrates and the threshold employed for determination as to whether or not whole-group refresh is performed is set at the second threshold (step 3206).

Thus, the aforementioned problem is solved by changing the threshold in response to vibration of the camera, and effective refresh responsive to the set state of the camera or the external environment is enabled.

While whether or not there is motion in all MBLKs on the four corners in the picture frame is detected in the aforementioned threshold set processing in order to determine whether or not the camera vibrates, this corresponds to an operation of detecting the blur quantity of the camera or the picture. According to this embodiment, therefore, it follows that the threshold employed for determination as to whether or not whole-group refresh is performed is set in response to the blur quantity of the camera or the picture.

While it is assumed in the aforementioned seventh embodiment that presence/absence of camera vibration is determined by motion in the MBLKs on the four corners in the frame, presence/absence of vibration of the camera may be determined from a group of MBLKs in contact with the upper end, the lower end, the right end and the left end of the frame. Alternatively, presence/absence of vibration of the camera may be determined employing a part such as a gyro other than that for picture processing. While the aforementioned seventh embodiment is assumed to have two thresholds, i.e., the first threshold employed when the camera is not in vibration and the second threshold employed when the camera vibrates, the threshold may be adaptively set in response to the motion quantity of the MBLKs on the four corners in the frame. For example, the average of the motion quantity of the MBLKs on the four corners may be set as the threshold as to whether or not whole-group refresh is performed.

Eighth Embodiment

Figure 26:
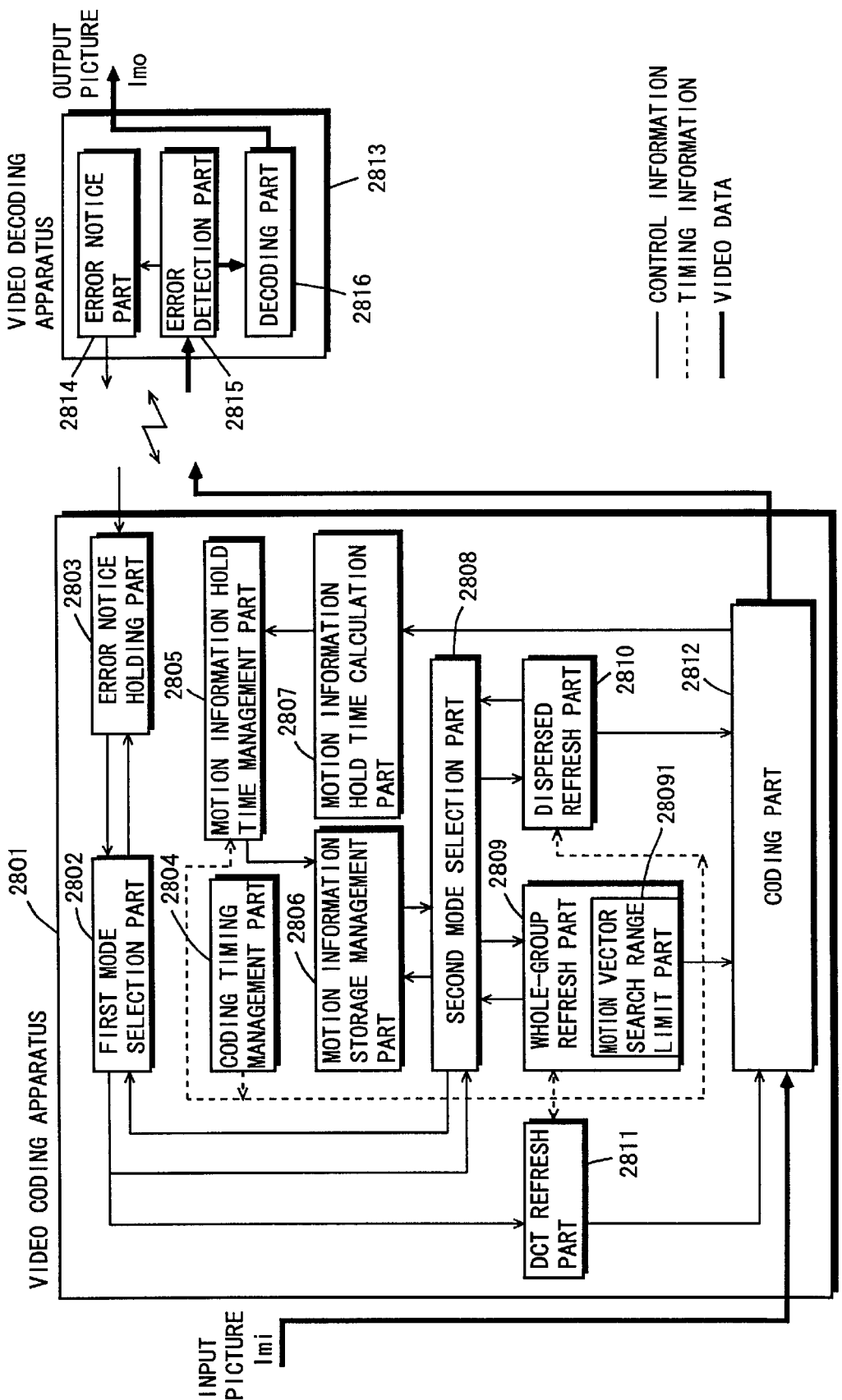
FIG. 26 is a block diagram showing the structure of a picture transmission system based on the video coding method according to the eighth embodiment.

FIG. 26 is a block diagram showing the structure of a picture transmission system based on a video coding method according to an eighth embodiment of the present invention. This system comprises a video coding apparatus 2801 and a video decoding apparatus 2813. The video coding apparatus 2801 performs compression coding on an input picture Imi and transmits coded data obtained by this coding. The video decoding apparatus 2813 receives the coded data transmitted from the video coding apparatus 2801, performs decoding and outputs a picture obtained by this decoding as an output picture Imo. The video decoding apparatus 2813 further detects whether or not there is a transmission error in the coded data transmitted from the video coding apparatus 2801, and if detecting an error, reports the video coding apparatus 2801 about the error.

The video coding apparatus 2801 has a coding part 2812 performing coding combining inter-picture coding and intra-picture coding, and additionally comprises, in order to perform refresh by making the coding part 2812 perform INTRA coding, an error notice holding part 2803, a first mode selection part 2802, a coding timing management part 2804, a motion information hold time management part 2805, a motion information storage management part 2806, a motion information hold time calculation part 2807, a second mode selection part 2808, a whole-group refresh part 2809 including a motion vector search range limit part 28091, a dispersed refresh part 2810, and a DCT refresh part 2811. The structure of the coding part 2812 is similar to the structure of the conventional encoder 116 shown in FIG. 33, and in the coding part 2812, selectors corresponding to the selectors 123 and 124 of the encoder 116 are controlled by the whole-group refresh part 2809, the dispersed refresh part 2810 and the DCT refresh part 2811.

The video decoding apparatus 2813 comprises a decoding part 2816, an error detection part 2815 and an error notice part 2814. The error detection part 2815 receives the coded data transmitted from the video coding apparatus 2801 and detects whether or not there is a transmission error, while supplying the received coded data to the decoding part 2816. The decoding part 2816 decodes the coded data and outputs the picture obtained by the decoding as the output picture Imo. On the other hand, the error notice part 2814 transmits an error notice message indicating the transmission error detected by the error detection part 2815 to the video coding apparatus 2801. This error notice message is received and held by the error notice holding part 2803 in the video coding apparatus 2801 as described above.

A video coding method according to this embodiment and the video coding apparatus 2801 based on the video coding method are now described.

Each part of the video coding apparatus 2801 may be directly implemented by hardware, while the same can be implemented employing software. In the latter case, each part of the video coding apparatus 2801 can be implemented by forming the video coding apparatus with a CPU (Central Processing Unit), a memory and an external memory device so that the CPU executes a prescribed program (hereinafter referred to as "video coding program" similarly to the first embodiment) loaded from the external memory device in the memory, for example. In this case, the video coding program is typically provided by a storage medium (floppy disk, CD-ROM, DVD or the like) storing the program. In other words, the user sets a purchased storage medium in the aforementioned video coding apparatus 2801, make the apparatus read the video coding program stored therein and installs the same in a memory device such as a hard disk unit. Alternatively, a video coding program transmitted to the video coding apparatus 2801 through a communication line online may be installed in the memory device. Further, the maker may previously install the video coding program in the memory device before shipping the video coding apparatus. The program installed in such a manner is loaded in the memory from the memory device and executed by the CPU.

Operations of the video coding apparatus 2801 having the aforementioned structure are now described while noting a refresh operation.

Figure 14:
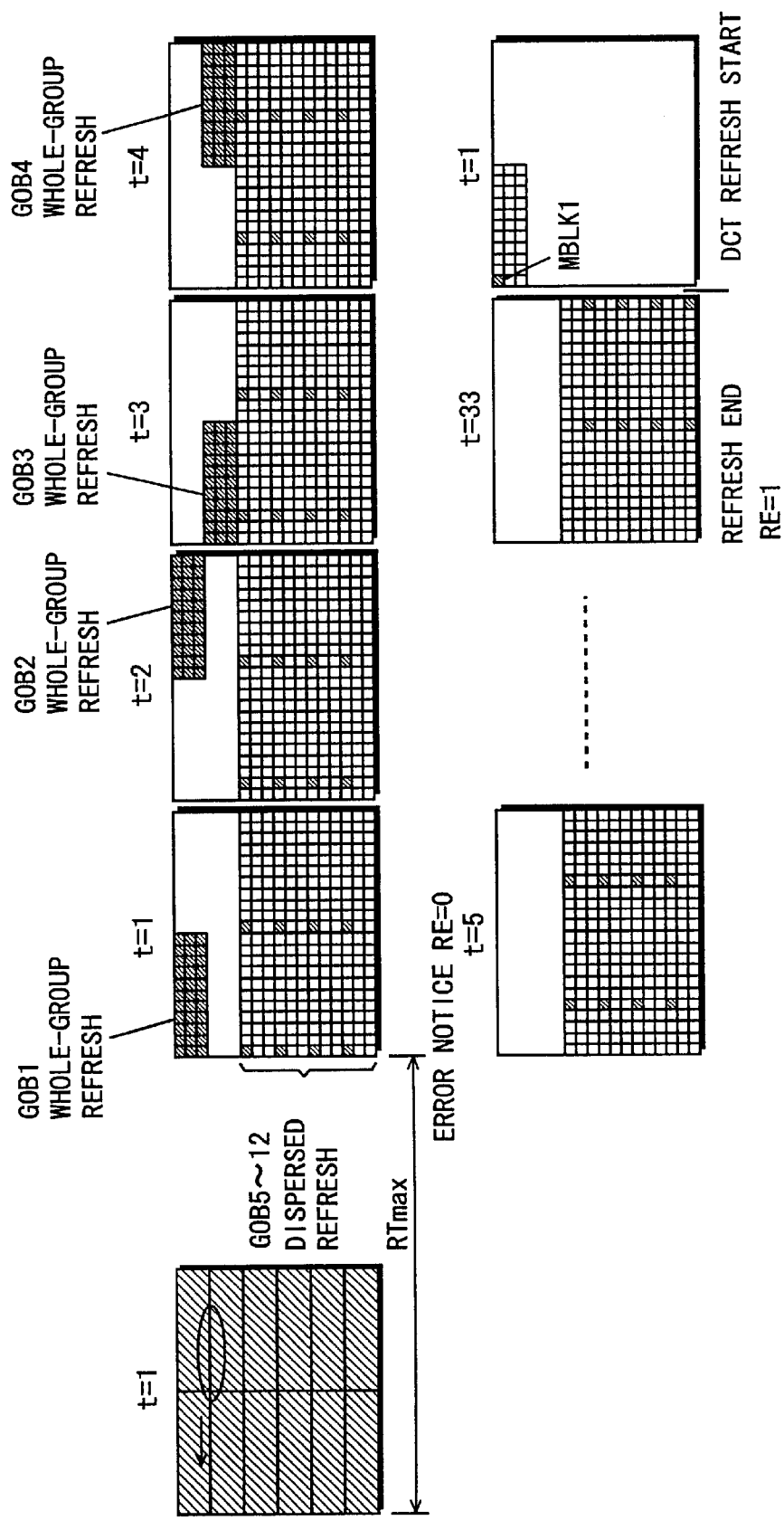
FIG. 14 is a diagram showing an exemplary refresh operation in a video coding method according to an eighth embodiment of the present invention.

FIG. 14 is a diagram showing an exemplary refresh operation in the case of applying the video coding method according to the eighth embodiment of the present invention to the CIF picture of H.261 or H.263 recommended by ITU (International Telecommunication Union). As already described, the CIF picture is of 352 by 288 dots, and this is divided into 22 by 18 blocks in units of a macroblock (MBLK) of 16 by 16 dots, and a GROUP OF BLOCKS (GOB) is formed every 11 by 3 blocks. In other words, the CIF picture is formed by 2 by 6 GOBs, and each GOB is further formed by 11 by 3 MBLKs. Also in this embodiment, "block" indicates MBLK, while a "group of blocks" is not limited to GOB. The following description is made with reference to the case of assuming the GOB as the group of blocks. Numbers from GOB1 to GOB12 are attached to the GOBs in the order shown in FIG. 14. When refreshing the same by performing INTRA coding on one GOB every frame in the order of the numbers, for example, refresh of the whole of one screen is completed in 12 frames. When refreshing one MBLK for one frame as to the MBLKs in each GOB, the refresh is completed in 33 frames.

In the video coding apparatus 2801, the motion information storage management part 2806 regularly determines and stores whether or not there is motion of an object in each GOB every frame in each frame previous to the point of coding by at least a time RTmax on the basis of the information obtained from the coding part 2812. The time RTmax is a time from coding up to a point when an error notice message therefor is returned from the decoding side. As to a determination method for presence/absence of motion, a method of comparing the magnitude of a motion vector of each MBLK in the GOB with a predetermined threshold and determining that the object in the GOB has motion if MBLKs having motion vectors exceeding the threshold are present in excess of a prescribed number. Alternatively, presence/absence of motion in the object in the GOB may be determined by comparing the coding quantity with a predetermined threshold. Further, the motion vector absolute value total of each MBLK in the GOB may be compared with a predetermined threshold for determining that there is motion in the object as to a GOB having a value exceeding the threshold.

In the video decoding apparatus 2813, the error detection part 2815 determines whether or not there is a transmission error in a picture frame to be decoded, and if any error is detected, the error notice part 2814 reports the coding side about this through a feedback transmission path, i.e., the error notice part 2814 returns the error notice message to the video coding apparatus 2801. For detecting the error, a method of transmitting the coded data with an error detection code on the coding side so that the decoding side detects the error employing this can be employed. Alternatively, an error may be determined through the coding rule when inconsistency takes place in decoding.

When the error notice message is returned from the error notice part 2814 in the video decoding apparatus 2813, the error notice holding part 2803 receives this in the video coding apparatus 2801 and the first mode selection part 2802 starts the second mode selection part 2808 on the basis of this error notice. The second mode selection part 2808 started in this manner determines whether or not there has been motion in the object of each block up to a point preceding a point for starting coding after the error notice by the time RTmax on the basis of motion information stored by the motion information storage management part 2806. On the basis of the result of this motion determination, the second mode selection part 2808 decides GOBs having motion as whole-group refresh GOBs and GOBs having no motion as dispersed refresh GOBs. As to the whole-group refresh GOBs, the whole-group refresh part 2809 entirely simultaneously refreshes the MBLKs in the GOBs successively GOB by GOB every time coding one frame from the point. As to the dispersed refresh GOBs, the dispersed refresh part 2810 successively refreshes the MBLKs in the GOBs by MBLK by MBLK for one frame with respect to all dispersed refresh GOBs every time coding one frame from the point.

In the example shown in FIG. 14, there has been motion in the object in the regions of GOB1 to GOB4 during the time RTmax and hence GOB 1 to GOB4 are decided as whole-group refresh GOBs and whole-group refreshed GOB by GOB every time coding one frame successively over t=1 to t=4. Referring to FIG. 14, slanted parts are blocks being subjected to INTRA coding. GOB5 to GOB12 are decided as dispersed refresh GOBs since there has been no motion in the object in the regions during the time RTmax. For each of GOB1 to GOB12, refresh is successively performed MBLK by MBLK every time a frame is coded such that MBLK1 is refreshed at t=1 and MBLK2 is refreshed at t=2, and when MBLK33 is refreshed at t=33, the refresh on GOB5 to GOB12 decided as dispersed refresh GOBs is ended. After the refresh end, the first mode selection part 2802 starts the DCT refresh part 2811, and the DCT refresh part 2811 executes the refresh stipulated in ITU-T recommendation H.261 for the purpose of refreshing accumulation of calculation errors in discrete cosine transform (DCT) on the coding side and the decoding side at the rate of one MBLK per frame, for example.

Figure 15:
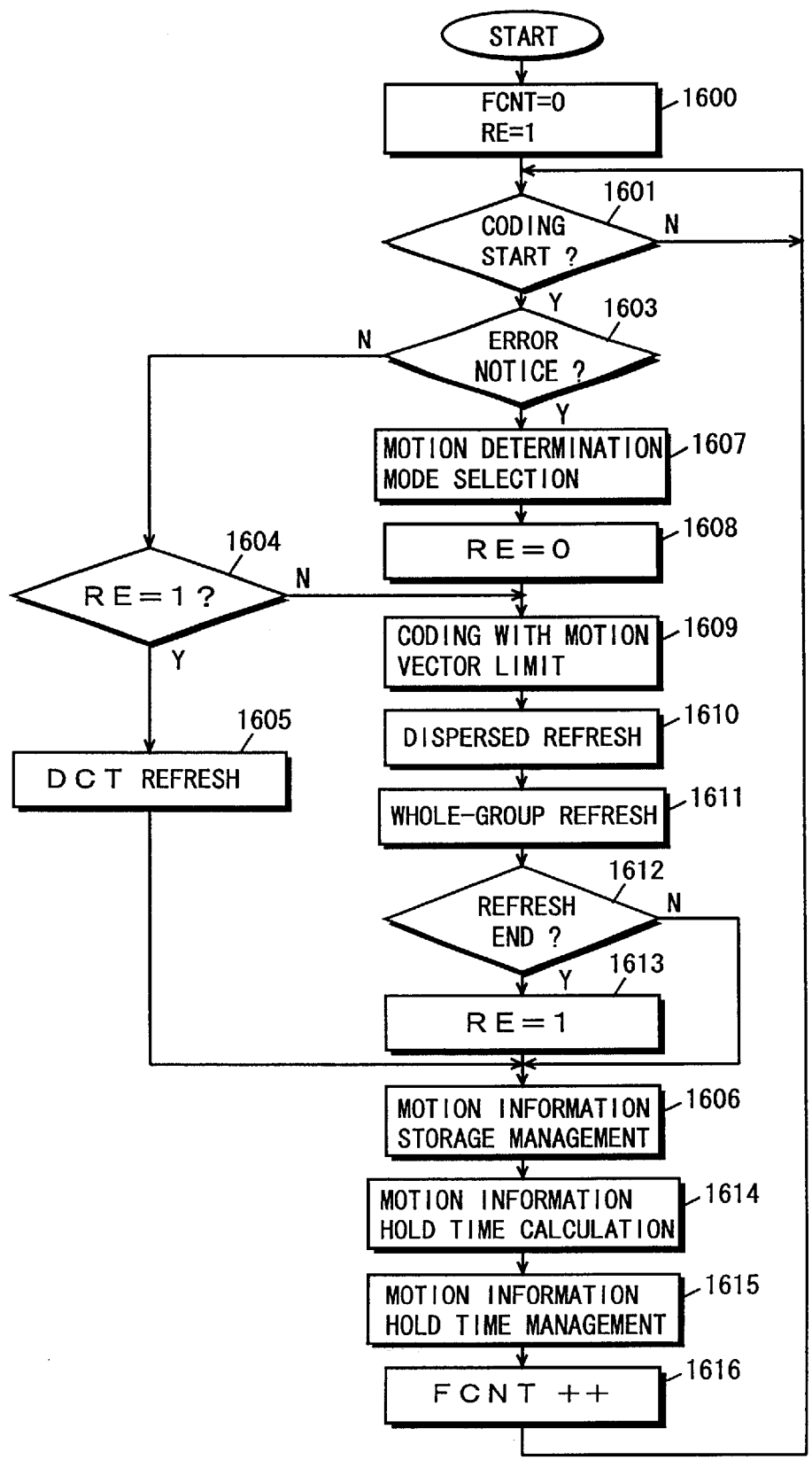
FIG. 15 is a flow chart showing the video coding method according to the eighth embodiment.

FIG. 15 is a flow chart showing the video coding method used in the video coding apparatus 2801. Referring to FIG. 15, FCNT indicates how many frames the motion vector absolute value total of each GOB of frames having been coded up to the current point are stored in arrays MV_GOB1 to MV_GOB12 described later, while RE is a refresh end flag, "1" indicates that refresh processing is ended and "0" indicates that refresh processing is in continuation. In this video coding method, FCNT is initialized to "0" while the flag RE is set at a step 1600. Then, start of coding is determined at a step 1601. A picture signal from a camera or the like is inputted at the rate of 30 frames per second, the so-called "frame skip" of skipping frames in coding may be performed depending on the balance between the communication rate of the transmission path transmitting the coded data and the coded data quantity. In this case, a coding control part in the coding part 2812 determines which frame is coded and which frame is frame-skipped with reference to the remaining data quantity or the like of a buffer. When performing coding on a current frame of the inputted picture signal as a result of this determination by the coding control part, an instruction of coding is outputted. If this instruction for coding is not outputted, the process waits at a step 1601, while the process advances to a step 1603 if the instruction for coding is outputted.

At the step 1603, the first mode selection part 2802 determines presence/absence of error notice from the decoding side. The error notice holding part 2803 stores data (hereinafter referred to as "error notice data") indicating presence/absence of error notice from a point previously performing coding up to the current point. The first mode selection part 2802 determines presence/absence of error notice on the basis of this error notice data, and the process advances to a step 1604 if there is no error notice.

At the step 1604, the first mode selection part 2802 determines whether or not refresh processing is in continuation by the refresh end flag RE. As a result, the process advances to a step 1609 if the refresh processing is in continuation (when RE=0), while the process advances to a step 1605 if error notice has never been made or processing after error notice is ended (when RE=1). At the step 1605, the DCT refresh part 2811 performs processing of DCT refresh on the current frame. By this processing of DCT refresh, coded data for one frame of the input picture Imi is obtained. Thereafter at a step 1606, the motion information storage management part 2806 stores motion information on the basis of the result of coding of the current frame by this DCT refresh (hereinafter referred to as "motion information storage management processing").

Figure 20:
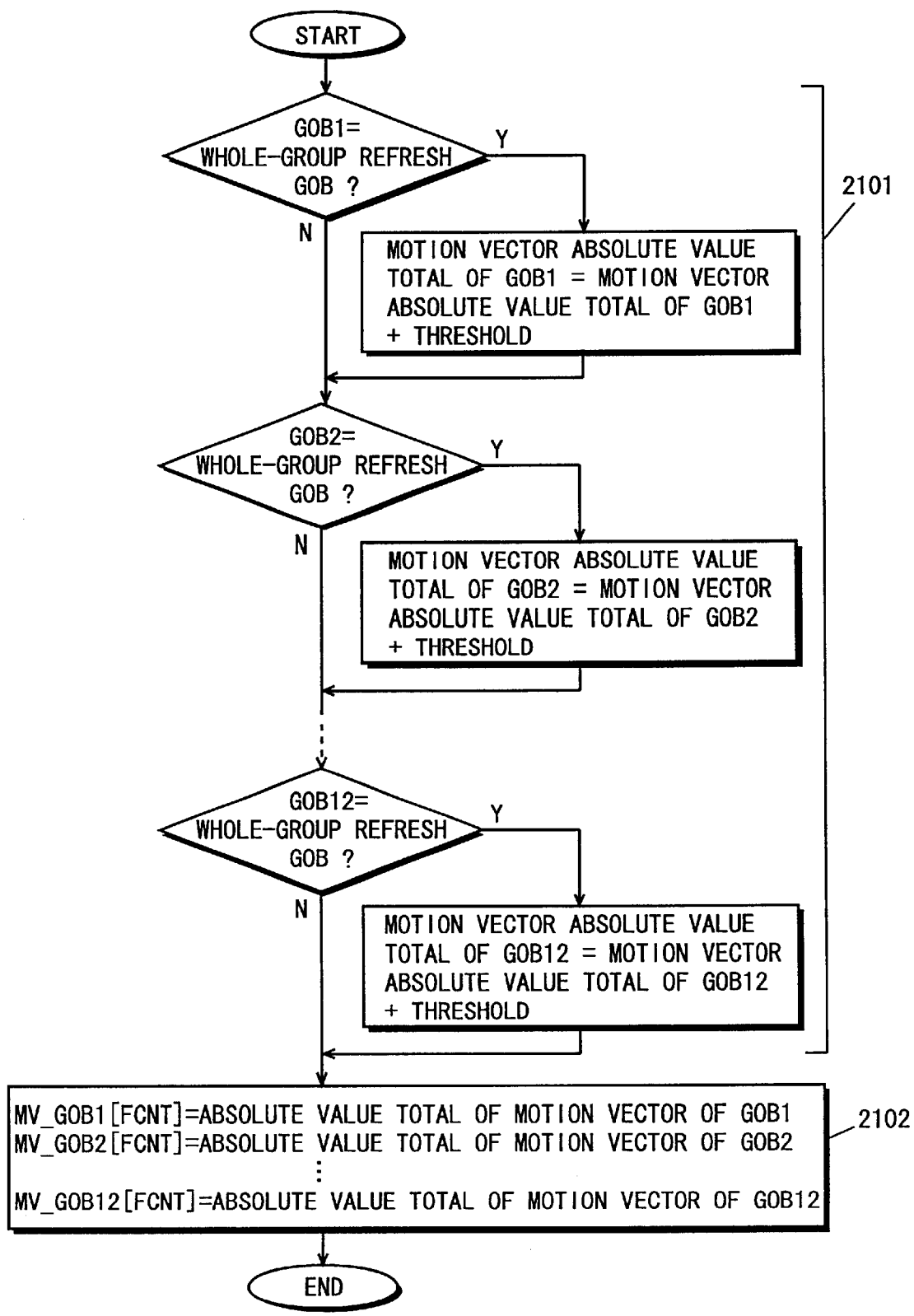
FIG. 20 is a flow chart showing the procedure of motion information storage management processing in the video coding method according to the eighth embodiment.

The motion information storage management processing is now described with reference to FIG. 20 and FIG. 21. FIG. 20 is a flow chart showing the procedure of the motion information storage management processing. Referring to FIG. 20, arrays MV_GOB1 to MV_GOB12 are arrays storing the motion vector absolute value total of each GOB of frames coded from a point previous by the time RTmax up to the current point. The variable FCNT, indicating the number of frames in which the motion vector absolute value total is stored in the arrays MV_GOB1 to MV_GOB12 at the current pint of time, is initialized at the step 1600 in FIG. 15 as described above and used as a pointer for storing motion information in the arrays MV_GOB1 to MV_GOB12.

In a step group 2101 of FIG. 20, the numbers of GOBs to be subjected to whole-group refresh in a frame are detected every time coding the frame, for adding a value exceeding the threshold for deciding whether whole-group refresh is performed or dispersed refresh is performed to the total of the motion vector absolute values of each GOB to be subjected to whole-group refresh. Thus, it is possible to simultaneously refresh an INTRA-coded group of blocks having low coding efficiency and likely causing an error when error notice is outputted from the decoding side similarly to a group of blocks having large motion of the object. At a next step 2102, the absolute value total of the motion vectors of each GOB is stored in a part indicated by the variable FCNT in the region of each array of the arrays MV_GOB1 to MV_GOB12.

Figure 21:
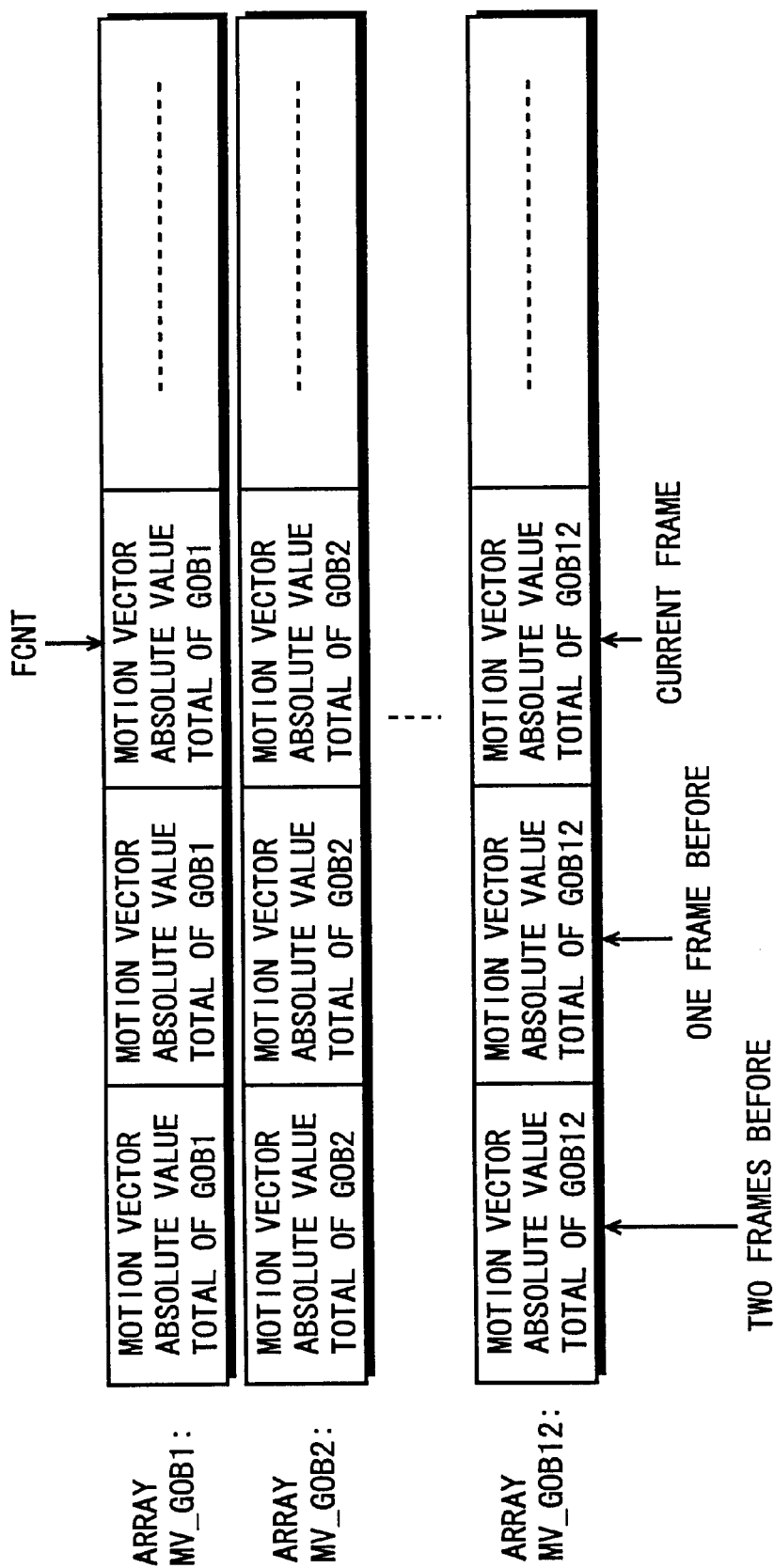
FIG. 21 is a diagram showing exemplary storage management of motion information used in the video coding method according to the eighth embodiment.

FIG. 21 shows exemplary storage management of motion information in the arrays MV_GOB1 to MV_GOB12. As shown in FIG. 21, motion information of each GOB is stored in the arrays MV_GOB1 to MV_GOB12 following motion information of frames coded previously. The motion information of the frames stored in the arrays MV_GOB1 to MV_GOB12 is employed for determination as to whether whole-group refresh is performed or dispersed refresh is performed.

After the motion information storage management processing is performed in the aforementioned manner, steps 1614 to 1616 are successively executed, while these steps are described later.

When it is determined at the step 1603 that there is error notice, error notice data is reset (i.e., set at a value indicating "there is no error notice"), and the process advances to a step 1607. At the step 1607, the second mode selection part 2808 classifies each GOB into a whole-group refresh GOB which is a GOB to be subjected to whole-group refresh and a dispersed refresh GOB which is a GOB to be subjected to dispersed refresh from the motion information of each frame stored in the arrays MV_GOB1 to MV_GOB12. In other words, it selects the mode for refresh of each GOB on the basis of the motion information as to each GOB (hereinafter referred to as "motion determination mode selection processing").

Figure 16:
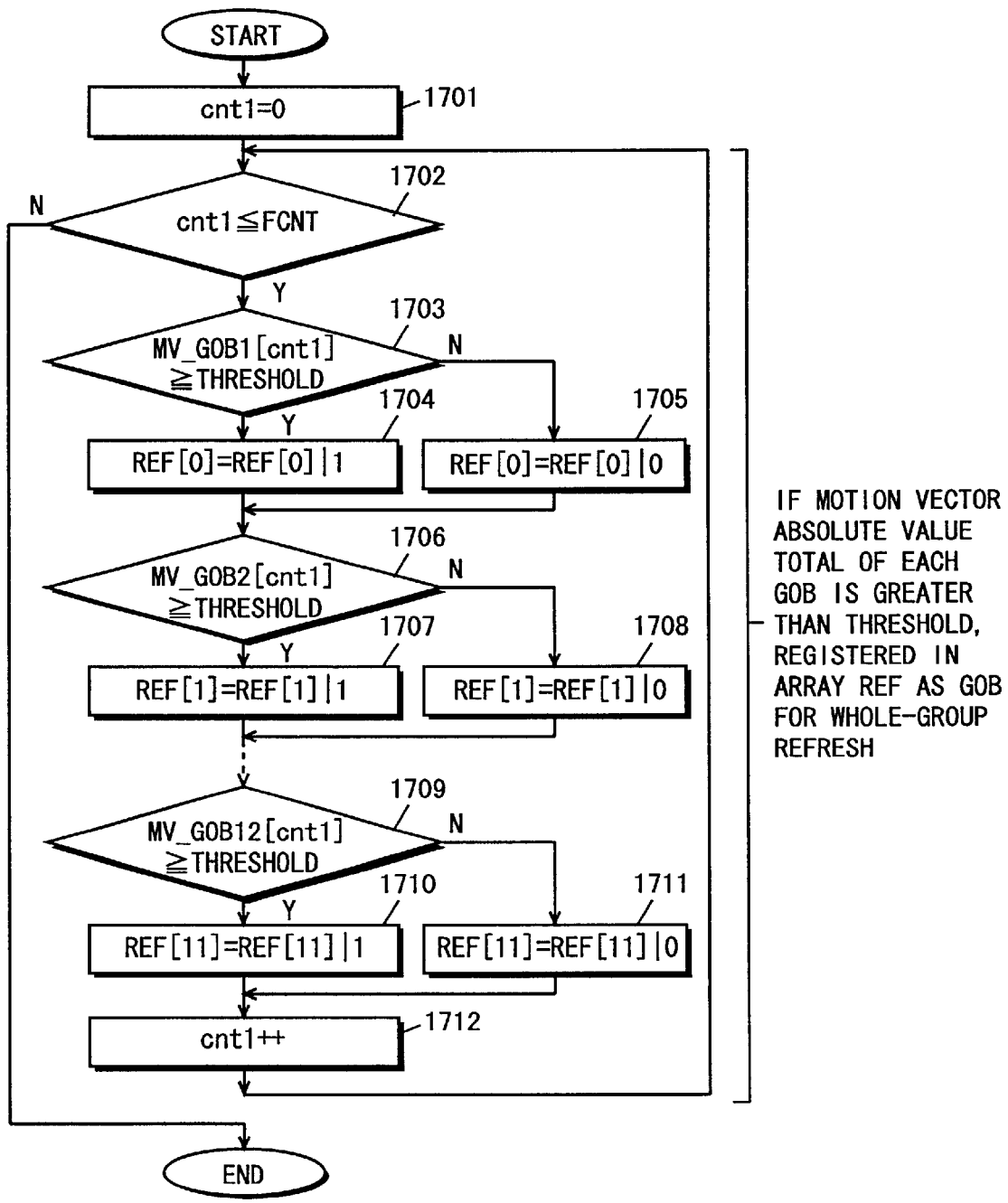
FIG. 16 is a flow chart showing the procedure of motion determination mode selection processing in the video coding method according to the eighth embodiment.
Figures 17, 18:
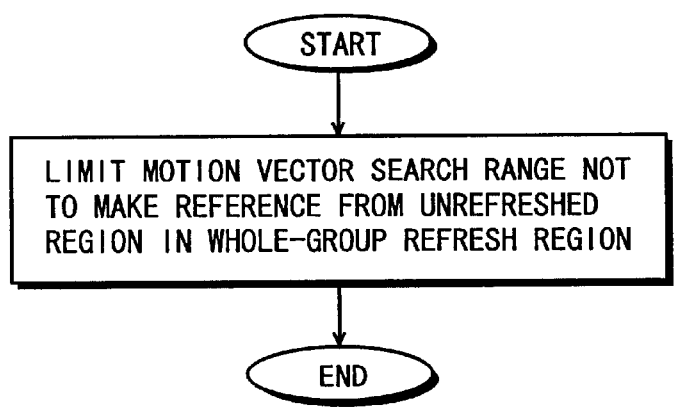
FIG. 17 is a diagram showing exemplary storage of GOB classification information, used in the video coding method according to the eighth embodiment, in an arrangement.
FIG. 18 is a flow chart showing motion vector limited coding processing in the video coding method according to the eighth embodiment.

The motion determination mode selection processing is now described with reference to FIG. 16 and FIG. 17. FIG. 16 is a flow chart showing the procedure of the motion determination mode selection processing. Referring to FIG. 16, a variable cnt1 is an internal counter, and employed as a pointer for the arrays MV_GOB1 to MV_GOB12. In the arrays MV_GOB1 to MV_GOB12, the absolute value total of the motion vectors of each GOB of the frames coded previously is stored as shown in FIG. 21 by the motion information storage management processing shown in FIG. 20. In an array REF, information (hereinafter referred to as "refresh information") indicating whether whole-group refresh is performed or dispersed refresh is performed on each GOB is stored as shown in FIG. 17 by this motion determination mode selection processing. Namely, "1" is stored in an element of the array REF corresponding to the whole-group refresh GOB and "0" is stored in an element of the array REF corresponding to the dispersed refresh GOB. The variable FCNT is the number of frames in which the absolute value total of the motion vectors of each GOB is stored in the arrays MV_GOB1 to MV_GOB12 at the current point as already described.

In this motion determination mode selection processing, the variable cnt1 is first initialized to "0" at a step 1701. Then, the variable cnt1 is compared with the variable FCNT at a step 1702, for ending the motion determination mode selection processing when the variable cnt1 is greater than the variable FCNT while advancing to a step 1703 when the variable cnt1 is less than the variable FCNT.

At the step 1703, a determination is made as to whether or not the motion vector absolute value total of GOB1 is greater than a previously set threshold. The process advances to a step 1704 if greater than the threshold, while advancing to a step 1705 if less than the threshold. At the step 1704, the logical sum of an array element REF[0] and "1" is obtained and this logical sum is re-stored as the array element REF[0]. At the step 1705, the logical sum of an array element REF[0] and "0" is obtained and this logical sum is re-stored as the array element REF[0]. After execution of the step 1704 or 1705, the process advances to a step 1706.

At the step 1706, a determination is made as to whether or not the motion vector absolute value total of GOB2 is greater than the previously set threshold. The process advances to a step 1707 if greater than the threshold, while advancing to a step 1708 if less than the threshold. At the step 1707, the logical sum of an array element REF[1] and "1" is obtained and this logical sum is re-stored as the array element REF[1]. At the step 1708, the logical sum of an array element REF[1] and "0" is obtained and this logical sum is re-stored as the array element REF[1].

Processing similar to the above is performed also as to GOB3 to GOB12, thereafter the variable cnt1 is incremented at a step 1712, and the process returns to the step 1702.

As described above, the steps 1702 to 1712 are repeatedly executed by the number of the variable FCNT. Thus, on the basis of the motion information of each frame stored in the arrays MV_GOB1 to MV_GOB12, each GOB is classified into a GOB to be subjected to whole-group refresh and a GOB to be subjected to dispersed refresh, and refresh information indicating the result of the classification is stored in the array REF as shown in FIG. 17. The refresh information stored in the array REF is cleared to zero when refresh of the GOB is completed.

Thus, a determination is made as to whether whole-group refresh is performed or dispersed refresh is performed at the point when detecting error notice for obtaining the logical sum of the result of determination and the current refresh state (the value of the array REF) and re-storing the logical sum in the array REF, whereby only a necessary GOB can be whole-group refreshed also when receiving error notice again while performing whole-group refresh. As shown in FIG. 17, the array REF is formed by 12 regions, so that refresh information for GOB1 is stored in the region of the array element REF[0], refresh information for GOB2 is stored in the region of the array element REF[1], and similarly, refresh information for GOB3 to GOB12 is stored in array elements REF[2] to REF[11] respectively.

After performing the aforementioned motion determination mode selection processing, the second mode selection part 2808 resets the refresh end flag RE at a step 1608.

At a next step 1609, coding with motion vector limit is performed. In the video coding apparatus 2801, the motion vector search range limit part 28091 is provided in the whole-group refresh part 2809 and this motion vector search range limit part 28091 controls motion compensation INTER coding in the coding part 2812, whereby coding with motion vector limit at the step 1609 is performed. The coding processing with motion vector limit is now described with reference to FIG. 18 and FIGS. 19A and 19B.

Figure 19A:
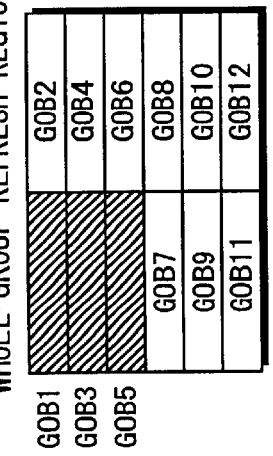
FIGS. 19A and 19B are diagrams showing exemplary limitation of a motion vector search range in the video coding method according to the eighth embodiment.
Figure 19B:
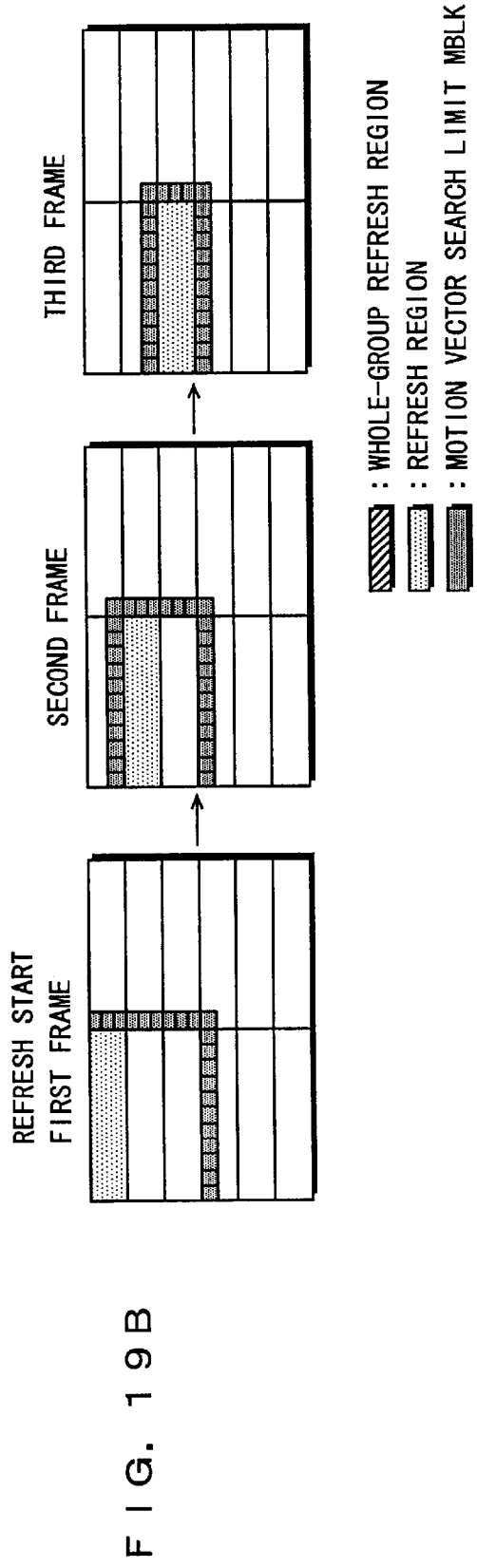

FIG. 18 is a flow chart showing the coding processing with motion vector limit. FIGS. 19A and 19B are diagrams showing limit examples of the motion vector search range. In the coding processing with motion vector limit, as shown in FIG. 18, the coding part 2812 limits the motion vector search range not to make reference from an unrefreshed region in a region to be subjected to whole-group refresh when performing motion compensation INTRA coding on each MBLK and performs coding. Concrete examples of this operation are described with reference to FIGS. 19A and 19B. FIG. 19A shows regions to be subjected to whole-group refresh. In this example, GOB1, 3 and 5 are the regions to be subjected to whole-group refresh. FIG. 19B shows MBLKs to be subjected to motion vector search limit during whole-group refresh. As shown in FIG. 19B, an error may spread when referring to GOB1, 3 and 5 since GOB1, 3 and 5 are not refreshed in the first frame after starting of refresh, and hence the motion vector search range for the MBLKs adjacent to GOB1, 3 and 5 is so limited as not to make reference from GOB1, 3 and 5. In the second frame, there is no apprehension that an error spreads even if referring to GOB1 since GOB1 is completely subjected to whole-group refresh, and hence motion vector search limit on MBLKs adjacent to unrefreshed regions, i.e., MBLKs adjacent to GOB3 and 5 is performed. In the third frame, there is no apprehension that an error spreads even if referring to GOB1 and 3 since GOB1 and 3 are completely whole-group refreshed and hence motion vector search limit is performed only on the MBLK adjacent to an unrefreshed region, i.e., the MBLK adjacent to GOB5. In order to simplify the processing, the motion vectors may be so limited that blocks of each GOB do not refer to blocks of GOBs other than the GOB during a period for performing refresh simultaneously by INTRA coding.

By the aforementioned coding processing with motion vector limit, it is possible to prevent propagation of influence by an error to a group of blocks not simultaneously to be subjected to refresh by INTRA coding.

After performing the aforementioned coding processing with motion vector limit, at a next step 1610, the second mode selection part 2808 refers to the array REF, and performs dispersed refresh on a GOB decided as a dispersed refresh GOB at the step 1607 by the dispersed refresh part 2810. At a next step 1611, the second mode selection part 2808 refers to the array REF and performs whole-group refresh on a GOB decided as a whole-group refresh GOB at the step 1607 by the whole-group refresh part 2809. As to the GOB whole-group refreshed here, motion information indicating that there is motion in the GOB is stored at the step 1606. By the dispersed refresh processing at the step 1610 and the whole-group refresh processing at the step 1611, coded data for one frame of the input picture Imi is obtained.

Then, at a step 1612, the second mode selection part 2808 determines whether or not the processing of refresh after error notice is ended. If it is consequently determined that the processing of refresh after error notice is ended, the refresh end flag RE is set at a step 1613 and thereafter the process advances to the step 1606. If it is consequently determined that the processing of refresh after error notice is not ended, the process directly advances to the step 1606.

At the step 1606, the motion information for each GOB of the current frame is stored in the arrays MV_GOB1 to MV_GOB12 as shown in FIG. 21 by the motion information storage management processing shown in FIG. 20, as described above.

Figure 22:
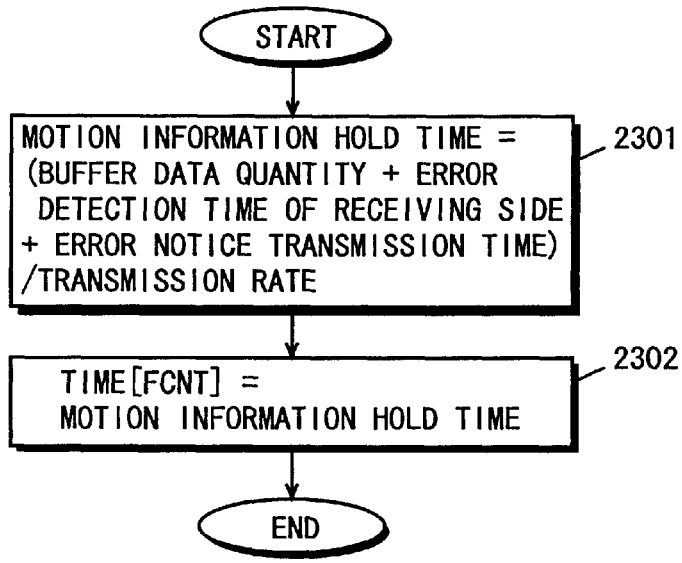
FIG. 22 is a flow chart showing the procedure of motion information hold time calculation processing in the video coding method according to the eighth embodiment.
Figure 23:
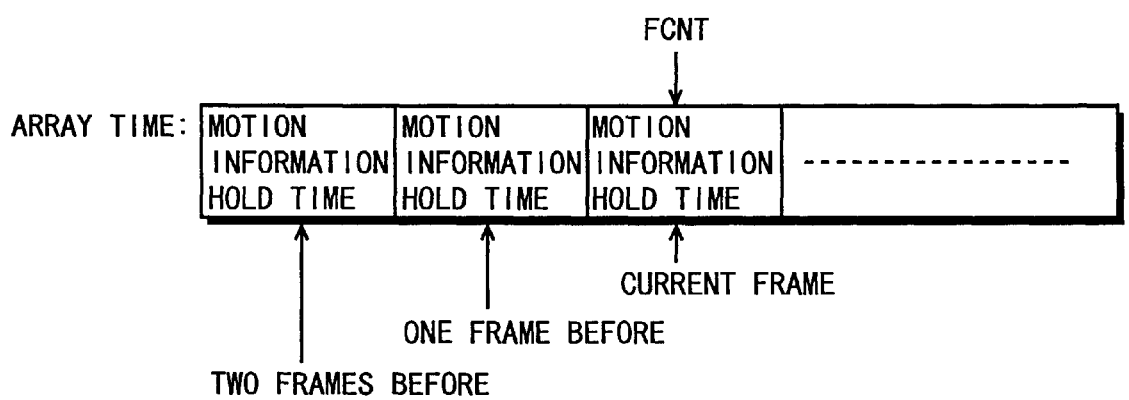
FIG. 23 is a diagram showing an exemplary motion information hold time, used in the video coding method according to the eighth embodiment, in an arrangement.

Then at a step 1614, the motion information hold time calculation part 2807 calculates the time for storing the motion information for the frames in the arrays MV_GOB1 to MV_GOB12 every time it performs coding of one frame. The motion information hold time calculation processing is now described with reference to FIGS. 22 and 23. FIG. 22 is a flow chart showing the procedure of the motion information hold time calculation processing. FIG. 23 shows exemplary storage of the motion information hold time in an array TIME. The motion information hold time is a time necessary for determining that receiving is made on the decoding side with no error, and an error reported from the decoding side after a lapse of the motion information hold time from coding of a certain frame can be determined as not an error for this frame. Referring to FIG. 22, the array TIME is an array holding the motion information hold time. The variable FCNT is the number of frames in which the motion vector absolute value total as motion information is stored in the arrays MV_GOB1 to MV_GOB12 at the current point as already described, and used as a pointer for the array TIME.

In this motion information hold time calculation processing, the motion information hold time calculation part 2807 first calculates the motion information hold time from the buffer data quantity at the current point, the error detection time of the decoding side, the transmission time of the error notice message and the transmission rate at a step 2301. Then, at a step 2302, the motion information hold time calculation part 2807 stores the calculated motion information hold time in a region of the array TIME indicated by the variable FCNT. The motion information hold time for each frame is stored in the array TIME following motion information hold time for frames coded previously, as shown in FIG. 23.

Figure 24:
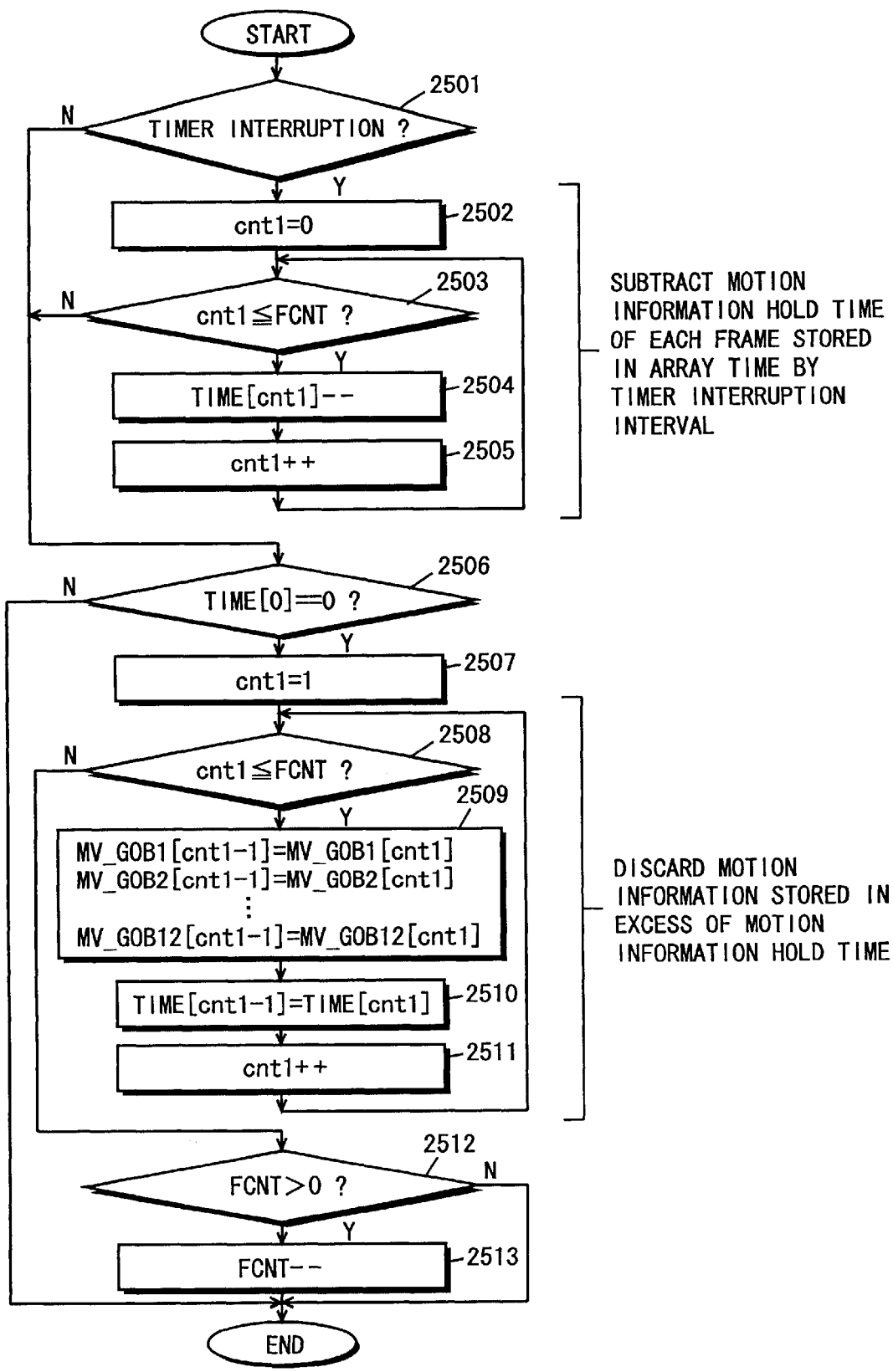
FIG. 24 is a flow chart showing the procedure of motion information hold time management processing in the video coding method according to the eighth embodiment.

After performing the aforementioned motion information hold time calculation processing, the motion information hold time management part 2805 discards motion information related to frames which can be determined as being received on the decoding side with no error among motion information of the frames coded previously at a step 1615. The motion information hold time management processing is now described with reference to FIG. 24. FIG. 24 is a flow chart showing the procedure of the motion information hold time management processing. Referring to FIG. 24, the variable cnt1 is a counter. The variable FCNT is the number of frames in which the motion information is stored in the arrays MV_GOB1 to MV_GOB12 at the current point as already described, and used as a pointer for the array TIME and the arrays MV_GOB1 to MV_GOB12. The array TIME is an array storing the motion information hold time, as already described. In the arrays MV_GOB1 to MV_GOB12, the total of the absolute values of the motion vectors of each GOB of the frames coded previously is stored as the motion information.

In this motion information hold time management processing, a determination is first made at a step 2501 as to whether or not there is timer interruption. If timer interruption is generated as a result, the variable cnt1 is initialized to "0" at a step 2502 and the variable FCNT is compared with the variable cnt1 at a next step 2503. If the variable cnt1 is not more than the variable FCNT as a result, the value of the array TIME indicated by the variable cnt1 is decremented at a step 2504. Thereafter the variable cnt1 is incremented at a step 2505, and the process returns to the step 2503. Thereafter the steps 2503 to 2505 are repeatedly executed while the variable cnt1 is not more than the variable FCNT, whereby the motion information hold time for each frame stored in the array TIME is subtracted by the time of a timer interruption interval.

When it is determined at the step 2501 that there is no timer interruption or the variable cnt1 is determined as greater than the variable FCNT at the step 2503, the process advances to a step 2506 for determining whether or not the value of an array TIME [0] is "0". Consequently, the motion information hold time management processing is ended if the value of the array TIME[0] is not "0", while the process advances to a step 2507 if the value of the array TIME[0] is "0".

At the step 2507, the variable cnt1 is set to 1 and the variable FCNT is compared with the variable cnt1 at a next step 2508. When the variable cnt1 is less than the variable FCNT as a result, values of the arrays MV_GOB1 to MV_GOB12 indicated by the variable cnt1 are stored in regions of the arrays MV_GOB1 to MV_GOB12 indicated by a variable cnt1-1 respectively at a step 2509. Then, at a step 2510, the value of the array TIME indicated by the variable cnt1 is stored in a region of the array TIME indicated by the variable cnt1-1. Thereafter the variable cnt1 is incremented at a step 2511, and the process returns to the step 2508. Thereafter the steps 2508 to 2511 are repeatedly executed while the variable cnt1 is not more than the variable FCNT, whereby motion information of frames passing the motion information hold time is discarded from the arrays MV_GOB1 to MV_GOB12, and exchange of the values stored in the arrays MV_GOB1 to MV_GOB12 is performed. Also in relation to the values stored in the array TIME, exchange is similarly performed.

When it is determined at the step 2508 that the variable cnt1 is greater than the variable FCNT, the process advances to a step 2512 for determining whether or not the variable FCNT is greater than "0". If the variable FCNT is greater than "0" as a result, the variable FCNT is decremented at a step 2513 and thereafter the motion information hold time management processing is ended. If the variable FCNT is not more than "0", the motion information hold time management processing is directly ended.

According to the aforementioned motion information hold time management processing, it follows that, by discarding motion information of the frames passing the motion information hold time set when coding the frames, only motion information of the minimum necessary frame employed for determination as to whether whole-group refresh is performed or dispersed refresh is performed is held.

In consideration of the dispersion in buffer size or in error notice, the maximum time from coding up to return of error notice therefor may be assumed and this may be regarded as RTmax (fixed value), thereby omitting the step 1614 of the motion information hold time calculation processing.

After performing the motion information hold time management processing at the step 1615, the variable FCNT is incremented at a step 1616 and the process returns to the step 1601 in order to perform coding on a next frame. Thereafter every time the steps 1601 to 1616 are executed, coding on the input picture Imi is performed frame by frame with the refresh operation similarly to the above.

According to this embodiment, as hereinabove described, largeness/smallness of motion of the object per group of blocks can be determined going back to the point coding the frame of an error at the point when the error is reported from the decoding side to the coding side, whereby it is possible to simultaneously refresh only a necessary group of blocks when necessary, and it is possible to improve the coding efficiency without damaging error resistance.

Figure 25:
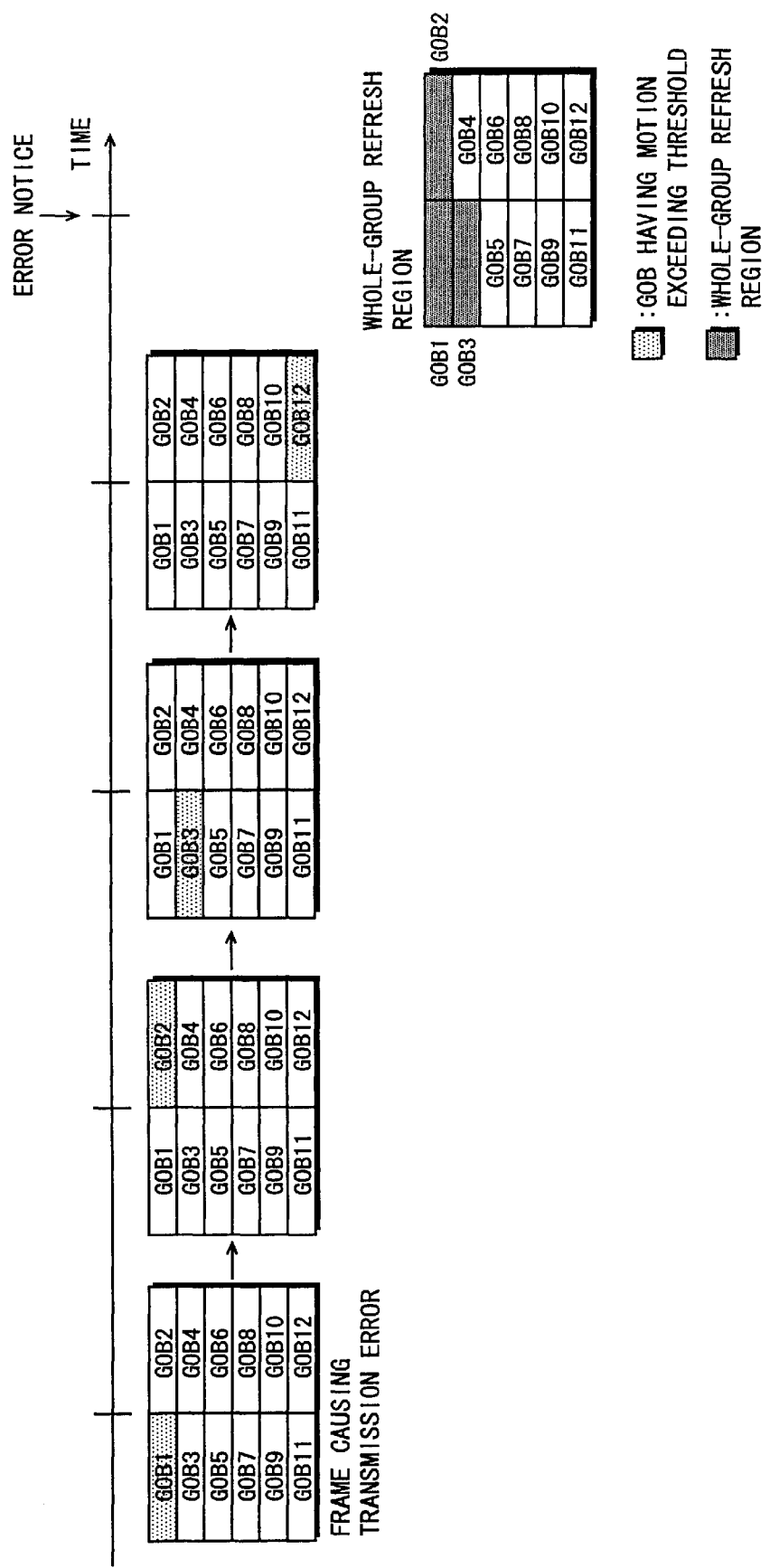
FIG. 25 is a diagram for illustrating motion determination mode selection processing in a modification of the eighth embodiment.

In the motion determination mode selection processing according to this embodiment, whether whole-group refresh is performed or dispersed refresh is performed as to GOBs of all frames in which motion information is stored in the arrays MV_GOB1 to MV_GOB12 is decided on the basis of the motion information as shown in FIG. 16 when the coding side receives error notice from the decoding side. Noting a GOB of a frame conceivably causing a transmission error corresponding to error notice among GOBs on which performance of whole-group refresh has been decided in such a manner, however, dispersed refresh may be performed in place of whole-group refresh on GOBs decided to be subjected to whole-group refresh but not in contact with the noted GOB. For example, FIG. 25 shows that motion information for four frames is stored in the arrays MV_GOB1 to MV_GOB12 at a point receiving error notice, and in this case, a frame conceivably causing a transmission error is the oldest frame among these four frames. Only motion in GOB1 exceeds the threshold in this oldest frame, while there is motion exceeding the threshold in GOB2, 3 and 12 among the remaining frames. In this case, therefore, no whole-group refresh is performed on GOB12 not in contact with GOB1 among GOB1, 2, 3 and 12 determined as having motion exceeding the threshold according to the aforementioned method.

When a frame causing a transmission error cannot be specified due to dispersion the buffer size or of error notice, the maximum time from coding up to return of error notice therefor may be assumed and this may be regarded as RTmax while giving a time varying with dispersion of the buffer size or of error notice as T for regarding a frame coded during a lapse of the time T from a point precedent by the time RTmax as a frame causing a transmission error.

Ninth Embodiment

A video coding method according to a ninth embodiment of the present invention and a video coding apparatus based on the video coding method are now described. The structure of this video coding apparatus is similar to that of the video coding apparatus 2701 according to the first embodiment, as shown in FIG. 13. In the video coding apparatus according to this embodiment, parts identical to those of the video coding apparatus 2701 according to the first embodiment are denoted by the same reference numerals, to omit redundant description.

In the video coding apparatus according to this embodiment, a refresh cycle management part 2702 calculates timing information indicating the refresh cycle for each GOB, and supplies the timing information to a motion information management part 2704, a whole-group refresh part 2706 and a dispersed refresh part 2707.

A refresh cycle calculation method employed in the refresh cycle management part 2702 is now described with reference to FIGS. 32 and 33.

Figure 32:
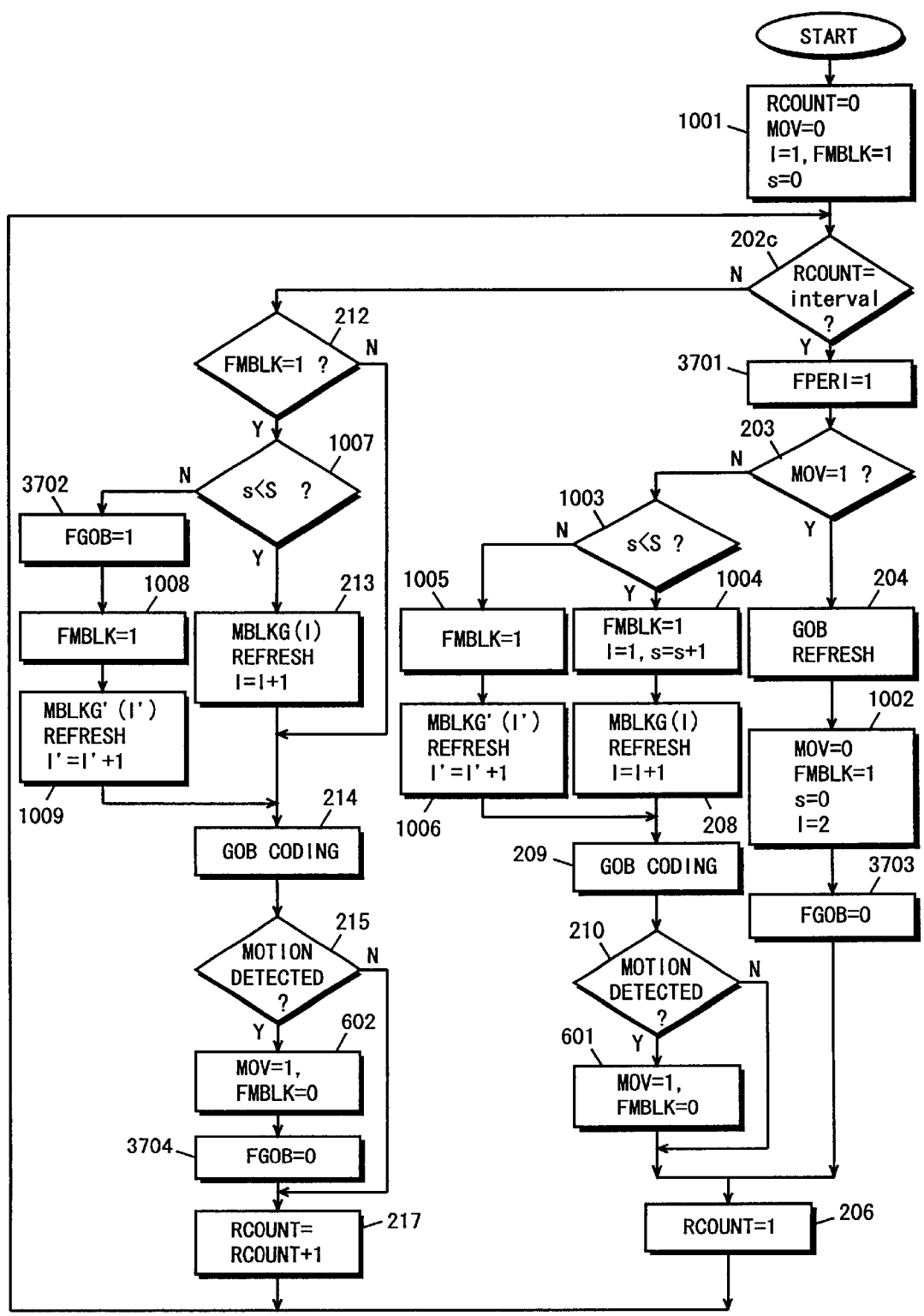
FIG. 32 is a flow chart showing a video coding method according to a ninth embodiment of the present invention.

FIG. 32 is a flow chart showing the video coding method according to this embodiment as to one GOB. In the flow chart shown in FIG. 32, the step 202*b* of the flow chart shown in FIG. 10 is changed to a step 202*c*, steps 3701 to 3704 are added, and a variable interval, a cycle set flag FPERI and a GOB flag FGOB are newly introduced. At the step 202*c*, a determination is made as to whether or not the value of RCOUNT which is a count value is equal to the value of the variable interval. It is assumed that the refresh cycle is set in the variable interval. At the step 3701, the cycle set flag FPERI is set to "1". At the step 3702, the GOB flag FGOB is set to "1". At the step 3703 and the step 3704, the GOB flag FGOB is cleared to zero. The GOB flag FGOB is referred to in a flow chart of FIG. 33 described below.

Figure 33:
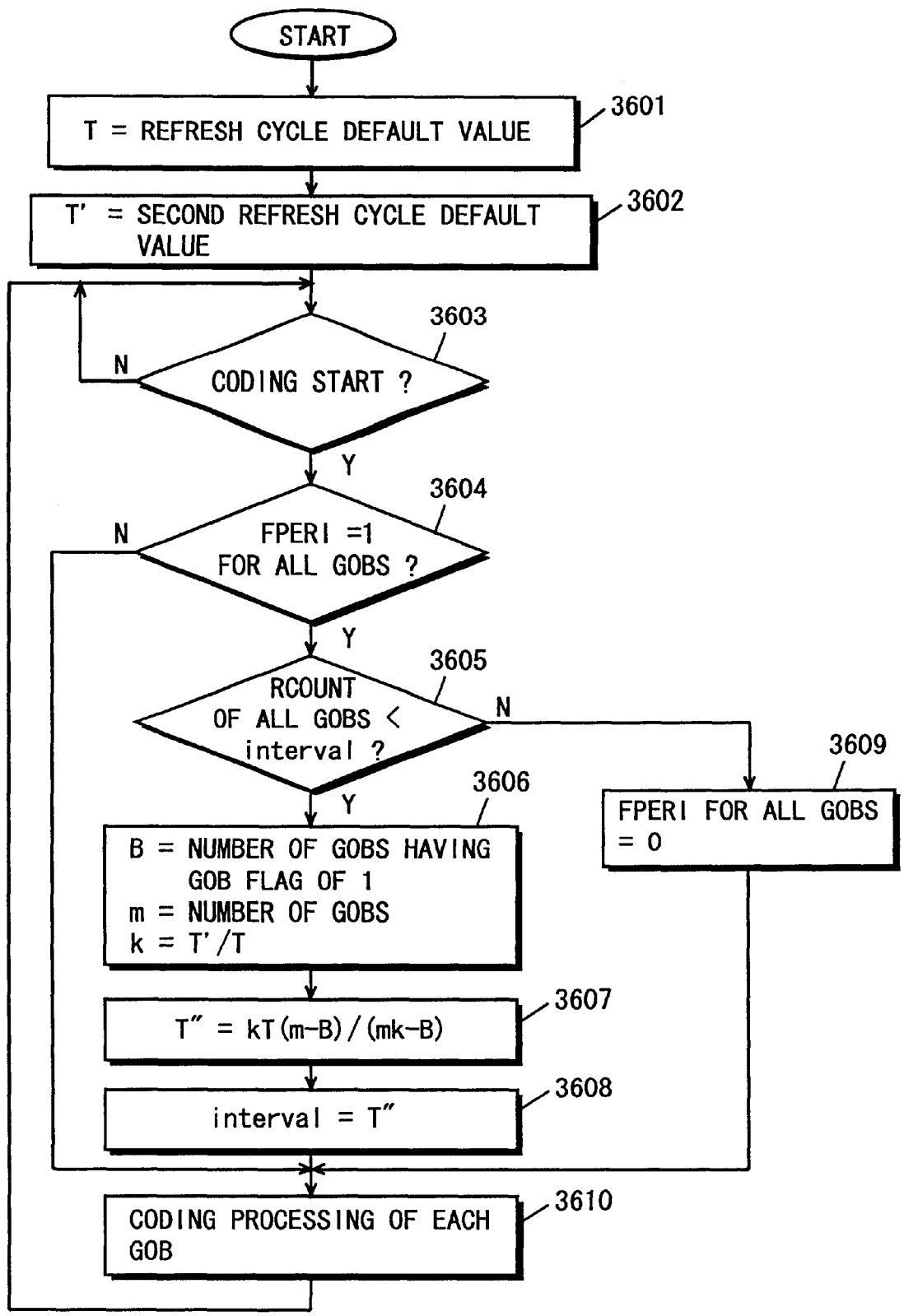
FIG. 33 is a flow chart showing a method of calculating a refresh period in the ninth embodiment.
Figure 34A:
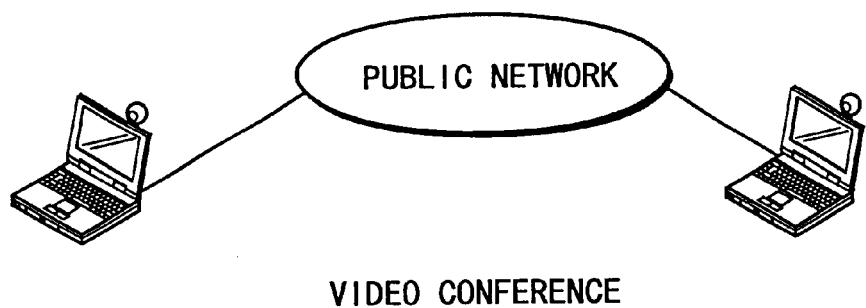
FIGS. 34A to 34C are system diagrams for illustrating the application field of the present invention.
Figure 34B:
Figure 34C:
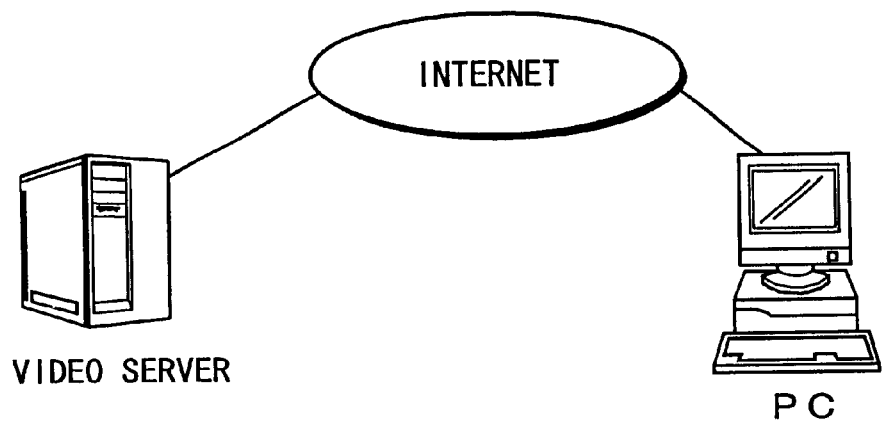
Figure 36:
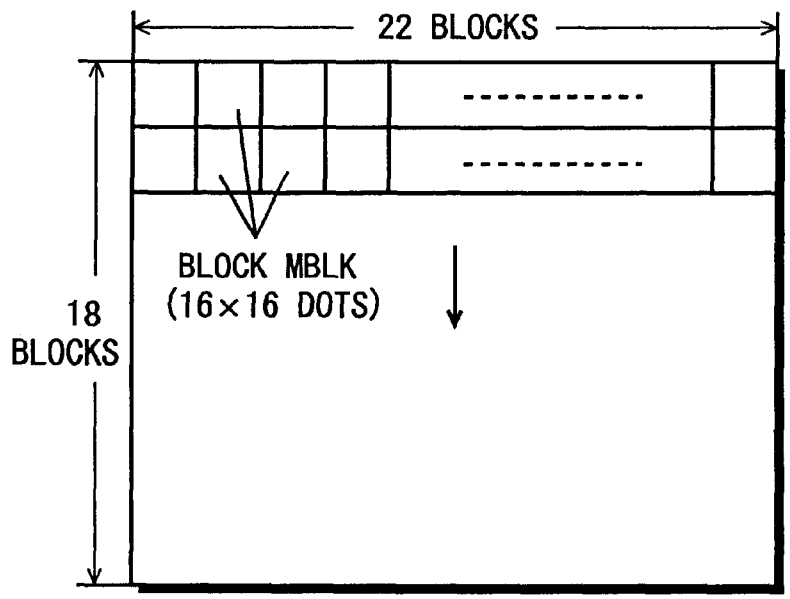
FIG. 36 is a diagram for illustrating a refresh method in conventional video coding.
Figure 37:
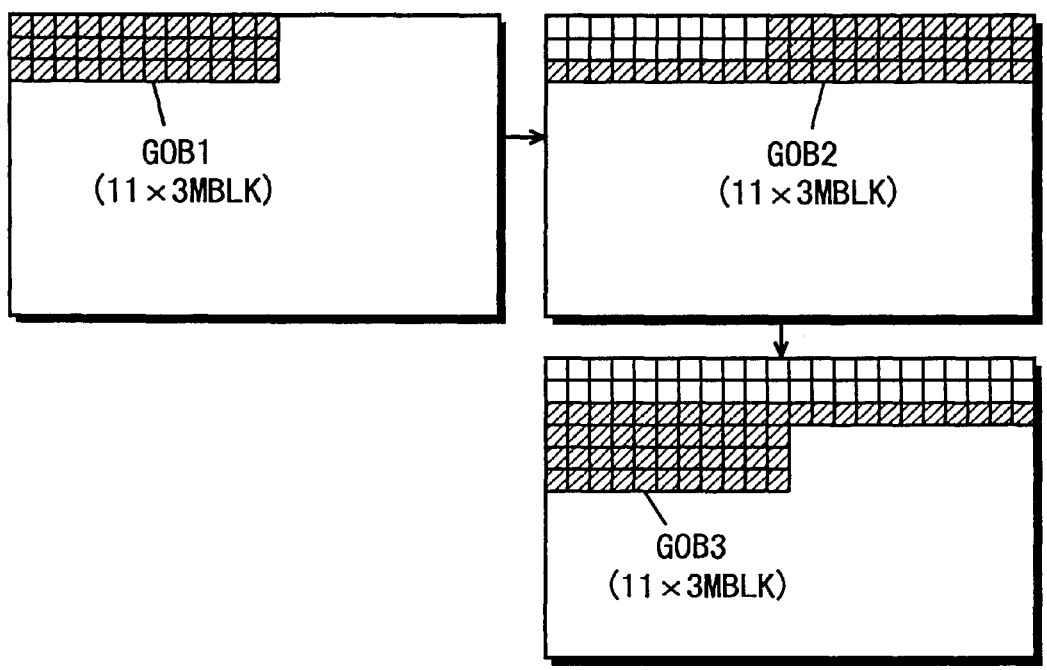
FIG. 37 is a diagram showing an exemplary refresh operation in conventional video coding.

FIG. 33 is a flow chart showing the method of calculating the refresh cycle in this embodiment. In this refresh cycle calculation method, a default value of the refreshed cycle is set in a variable T at a step 3601. Then, at a step 3602, a default value of a second refresh cycle is set at a variable T'. The second refresh cycle stands for a refresh cycle of dispersed refresh for a GOB in which a still state continues, i.e., a refresh cycle of the dispersed refresh in such a case that blocks of GOB being in the process of the dispersed refresh are INTRA-coded in frames varying with the block continuously at least S times.

After the default values are set at the variables T and T', a determination is made at a step 3603 as to whether or not it is coding start timing. Consequently, the process waits up to coding start timing if it is not coding start timing, while the process advances to a step 3604 when reaching the coding start timing. At the step 3604, a determination is made as to whether or not cycle set flags FPERI for all GOBs are set to "1". As understood from the flow chart of FIG. 32, the cycle set flag FPERI is set to "1" when the value of RCOUNT is equal to the value of the variable interval. This means start of the refresh cycle. Therefore, such a state that the cycle set flags FPERI for all GOBs are set to "1" means that each GOB refreshed in displacement frame by frame entirely enters a new refresh cycle.

When it is determined at the step 3604 that the cycle set flags FPERI for all GOBs are set to "1", the process advances to a step 3605 for determining whether or not the values of RCOUNT for all GOBs are less than the value of the variable interval. Consequently, when the values of RCOUNT for all GOBs are less than the value of the variable interval, steps 3606 and 3607 are carried out thereby calculating a refresh cycle T'''. If there is such a GOB for which the value of RCOUNT is greater than the value of the variable interval, the cycle set flags RPERI for all GOBs are cleared to zero at a step 3609 and the process advances to a step 3610.

When the values of RCOUNT for all GOBs are greater than the value of the variable interval, it means that the refresh cycle shifts to a next refresh cycle. Such a state that a determination of no is made at the step 3605 means that the first GOB of each GOB refreshed in displacement frame by frame enters a new refresh cycle.

If the values of RCOUNT for all GOBs are less than the value of the variable interval, the number of GOBs in which the GOB flags FGOB are set to "1" is set at a variable B, at the step 3606, the number of GOBs is set at a variable n, and T'/T is set at a variable k. Then, at the step 3607, the refresh cycle T''' is calculated in accordance with the following equation on the basis of the values of these variables:

$$T'''=kT(m-B)/(mk-B)$$

While T' preferably takes an integral value, the picture quality can be improved by rounding up figures below the decimal point and error resistance of GOBs having motion can be improved by rounding down the figures below the decimal point. The above equation decides T''' so that the number of INTRA blocks in the refresh cycle is equal. Namely, according to the above equation, such a refresh cycle T''' that decrement of the number of INTRA-coded blocks in a group of blocks in which a still region continues and increment of the number of INTRA-coded blocks in a group of blocks of a region having motion are equal to each other is calculated. T''' thus calculated is set at the variable interval at a next step 3608. Thereafter the process advances to a step 3610.

At the step 3610, coding processing such as that shown in FIG. 10 is performed on each GOB, and thereafter the process returns to the step 3603.

According to the aforementioned flow chart of FIG. 33, the processing from the step 3606 up to the step 3608 is repeatedly executed from a point when each GOB refreshed in displacement frame by frame entirely enters a new refresh cycle until the first GOB of each GOB refreshed in displacement frame by frame enters a next refresh cycle. Thus, the refresh cycle (T''') is sequentially updated in response to the motion of the object.

According to this embodiment, as hereinabove described, it is possible to render the refresh cycle for a GOB to be subjected to whole-group refresh variable (shorter than a default refresh cycle) in response to the rate of GOBs for which the refresh cycle is set longer than the default refresh cycle T included in one picture frame among GOBs to be subjected to dispersed refresh, whereby error resistance of the GOBs to be subjected to whole-group refresh can be improved while maintaining the picture quality.

Modification

In each of the aforementioned embodiments, it has been assumed that a group of blocks (a region serving as the reference for dividing in the fifth embodiment) is a GOB. By thus rendering the group of blocks in the unit of GOB, deterioration of the picture quality caused by a transmission error can be kept in the GOB and error resistance can be improved even if the transmission error is generated in information in coding of a frame and the information is erroneous. When rendering the group of blocks a predetermined region other than the unit of GOB, control of the operation of simultaneously whole-group refresh performing refresh of the group of blocks and the operation of dispersed refresh performing refresh of the group of blocks at timing varying with the block can be simply performed.

While the refresh cycle has been set as 12 frames or 33 frames in each of the aforementioned embodiments, the refresh cycle is not restricted to these values. Resistance against errors is attained when shorting the refresh cycle, while the picture quality can be improved when contrarily retarding the refresh cycle.

When, in each of the aforementioned embodiments, a frame to be currently coded includes a group of blocks to be subjected to whole-group refresh while a frame coded n ($n \geq 1$) frames before includes no group of blocks to be subjected to whole-group refresh, the picture quality of the frame to be currently coded may be rendered inferior to the picture quality of the frame coded n frames before. When the frame to be currently coded includes no group of blocks to be subjected to whole-group refresh while the frame coded n ($n \geq 1$) frames before includes a group of blocks to be subjected to whole-group refresh, the picture quality of the frame to be currently coded may be rendered superior to the picture quality of the frame coded n frames before.

By the aforementioned technique, the information quantity between the frames can be smoothed and a motion picture having small frame skip can be obtained.

As a method of improving or degrading the picture quality, quantization precision in coding may be changed. In this case, the picture quality can be improved when increasing the quantization precision, while the picture quality can be degraded when contrarily reducing the quantization precision. By employing the quantization precision for change of the picture quality, the information quantity between the frames can be simply smoothed and a motion picture having small frame skip can be obtained by merely changing the parameter of the quantization precision.

Figure 27:
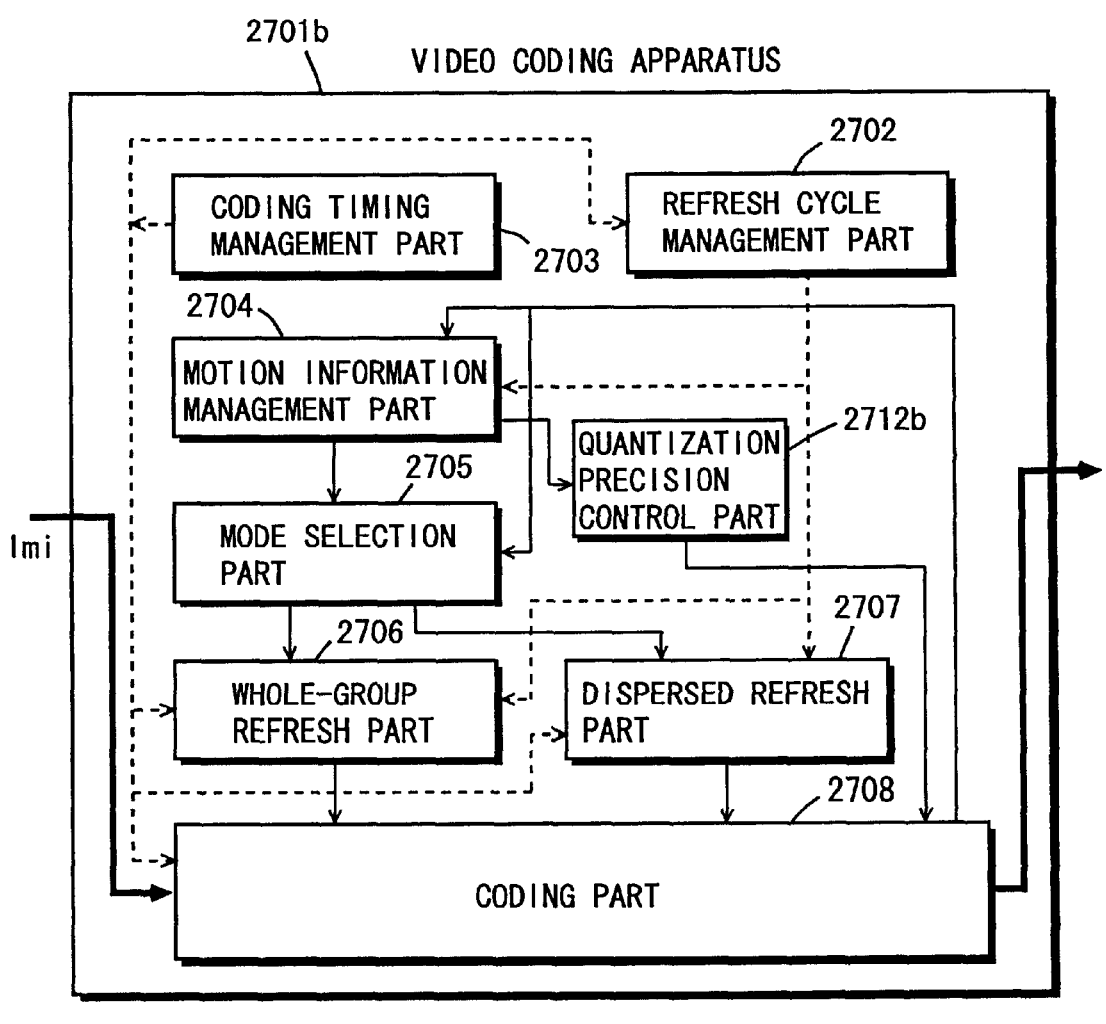
FIG. 27 is a block diagram showing the structure of a video coding apparatus based on a video coding method according to a first modification of the first embodiment.

FIG. 27 is a block diagram showing the structure of a video coding apparatus 2701b for controlling quantization precision in the aforementioned manner. This video coding apparatus 2701b comprises, in addition to the structure elements shown in FIG. 13, a quantization precision control part 2712b for controlling quantization precision in a coding part 2708 on the basis of information obtained by a motion information management part 2704.

Figure 28:
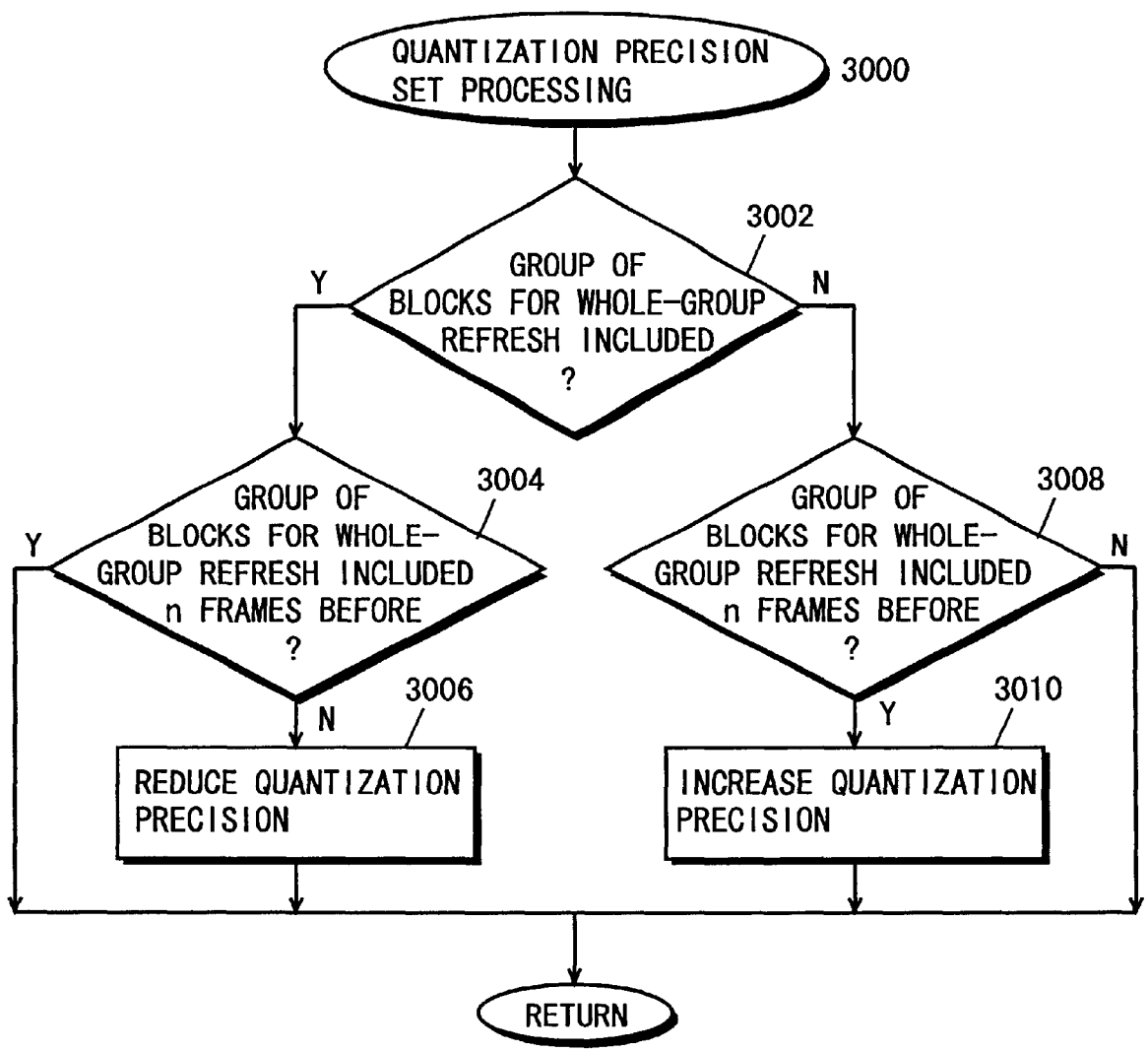
FIG. 28 is a flow chart showing the procedure of quantization precision set processing in the video coding method; according to the first modification of the first embodiment.

In such a video coding apparatus 2701b, the quantization precision control part 2712b first performs quantization precision set processing on each frame of an inputted picture Imi, and thereafter performs coding by any of the video coding methods of the aforementioned embodiments. FIG. 28 is a flow chart showing the procedure of this quantization precision set processing. In this quantization precision set processing, a determination is first made, with a determination result by the motion information management part 2704 as to motion of an object in each GOB, as to whether or not a frame to be currently coded includes a group of blocks to be subjected to whole-group refresh (a group of blocks to be simultaneously subjected to GOB refresh) (step 3002), and then a determination is made, on the basis of a previously set natural number n, a frame coded n frames before includes a group of blocks to be subjected to whole-group refresh (3004 and 3006). In response to the results of these determinations, the quantization precision control part 2712b controls quantization precision in the coding part 2708. Namely, when the frame to be currently coded includes a group of blocks to be subjected to whole-group refresh while the frame coded n frames before includes no group of blocks to be subjected to whole-group refresh, the parameter of the quantization precision is changed by a prescribed value thereby reducing the quantization precision for the frame to be currently coded (step 3006), and when the frame to be currently coded includes no group of blocks to be subjected to whole-group refresh while the frame coded n frames before includes a group of blocks to be subjected to whole-group refresh, the parameter of the quantization precision is changed by a prescribed time thereby improving the quantization precision for the frame to be currently coded (step 3010), and thereafter the quantization precision set processing is ended. If corresponding to neither case, the quantization precision set processing is ended without changing the quantization precision.

While the quantization precision has been controlled in the unit of the frame in the aforementioned video coding apparatus 2701b in order to smooth the information quantity between the frames, the picture quality of MBLKs to be subjected to refresh may be rendered superior to the picture quality of the remaining MBLKs in the frame in a group of blocks to be subjected to refresh by INTRA coding at timing varying with the MBLK. Further, the lower limit of the picture quality of the MBLKs to be subjected to refresh may be set so that the picture quality of each MBLK is not below the set lower limit. When the picture quality of MBLKs to be subjected to refresh exceeds the set lower limit, further, the picture quality may be rendered substantially equal to the picture quality of the remaining MBLKs in the frame, while, when the picture quality of the MBLKs to be subjected to refresh is below the set lower limit, the picture quality of the MBLKs to be subjected to refresh may be set at the set lower limit.

By the aforementioned technique, quantization distortion resulting from refresh can be eliminated in a still region.

As the method of improving or degrading the picture quality, the quantization precision in coding may be changed as already described. In this case, the picture quality can be improved when increasing the quantization precision, while the picture quality can be degraded when contrarily reducing the quantization precision. By employing the quantization precision for change of the picture quality, quantization distortion resulting from refresh can be easily eliminated in the still region by merely changing the parameter of the quantization precision.

Figure 29:
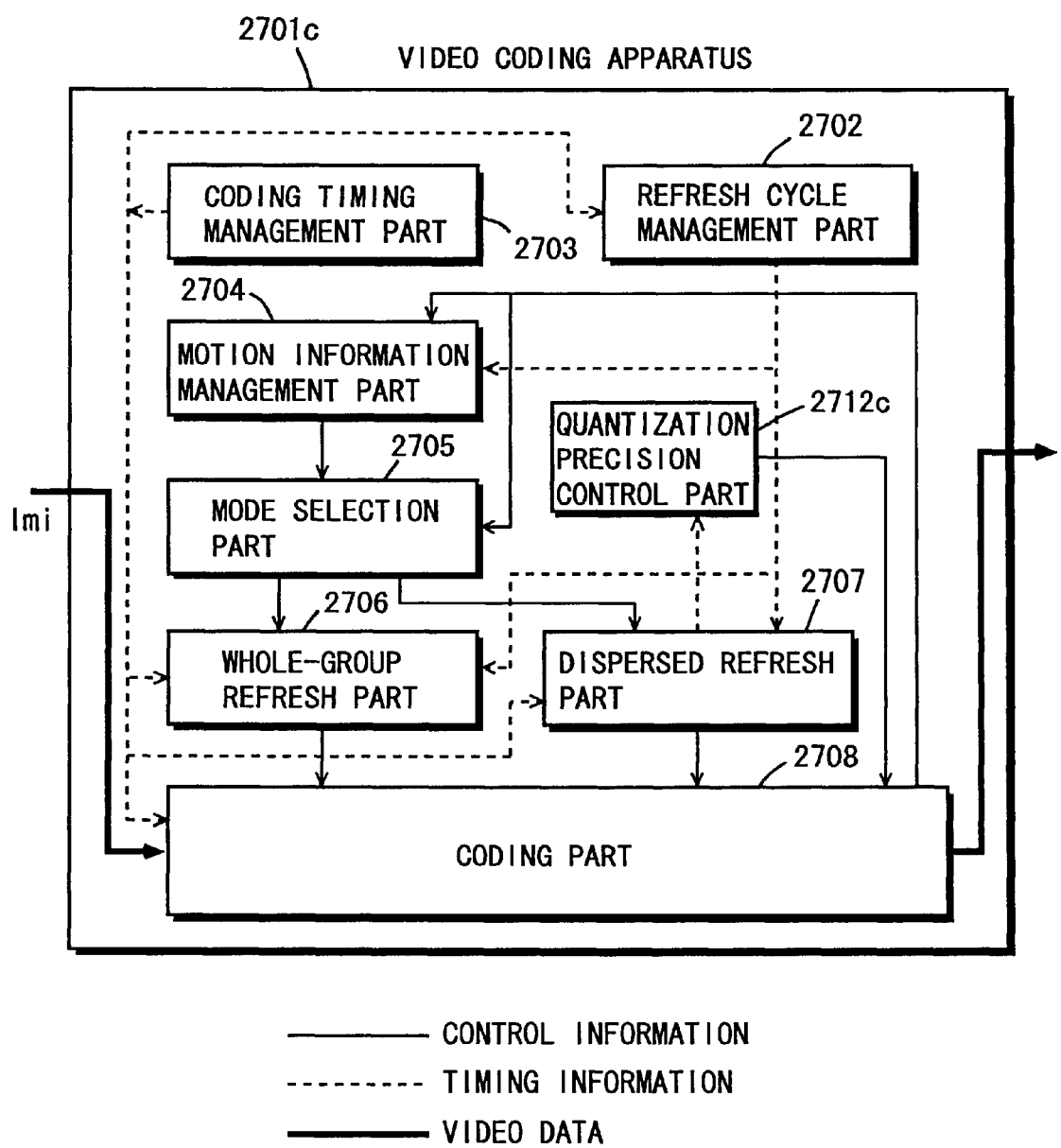
FIG. 29 is a block diagram showing the structure of a video coding apparatus based on a video coding method according to a second modification of the first embodiment.

FIG. 29 is a block diagram showing the structure of a video coding apparatus 2701c controlling quantization precision in the aforementioned manner. This video coding apparatus 2701c comprises, in addition to the structure elements shown in FIG. 13, a quantization precision control part 2712c controlling quantization precision in a coding part 2708 on the basis of timing information outputted from a dispersed refresh part 2707.

Figure 30:
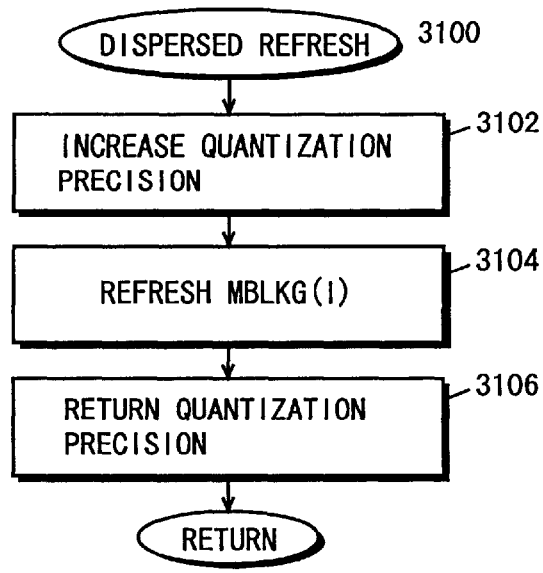
FIG. 30 is a flow chart showing the procedure of dispersed refresh in the second modification of the first embodiment.

FIG. 30 is a flow chart showing an exemplary procedure of dispersed refresh in the aforementioned video coding apparatus 2701c, and shows internal processing at the steps 208 and 213 in the flow chart of FIG. 2, for example. In this video coding apparatus 2701c, the quantization precision control part 2712c receives timing information indicating the period of dispersed refresh from a dispersed refresh part 2707 for improving quantization precision at the current point by first changing the parameter of the quantization precision by a prescribed value before coding blocks belonging to MBLKG(I) to be refreshed in a dispersed refresh mode (step 3102). Thereafter the MBLKs belonging to MBLKG (I) are INTRA-coded, i.e., refreshed (step 3104). After this refresh, the parameter of the quantization precision is returned to that before the change (step 3106), I is incremented (step 3108) and single dispersed refresh is ended.

Figure 31:
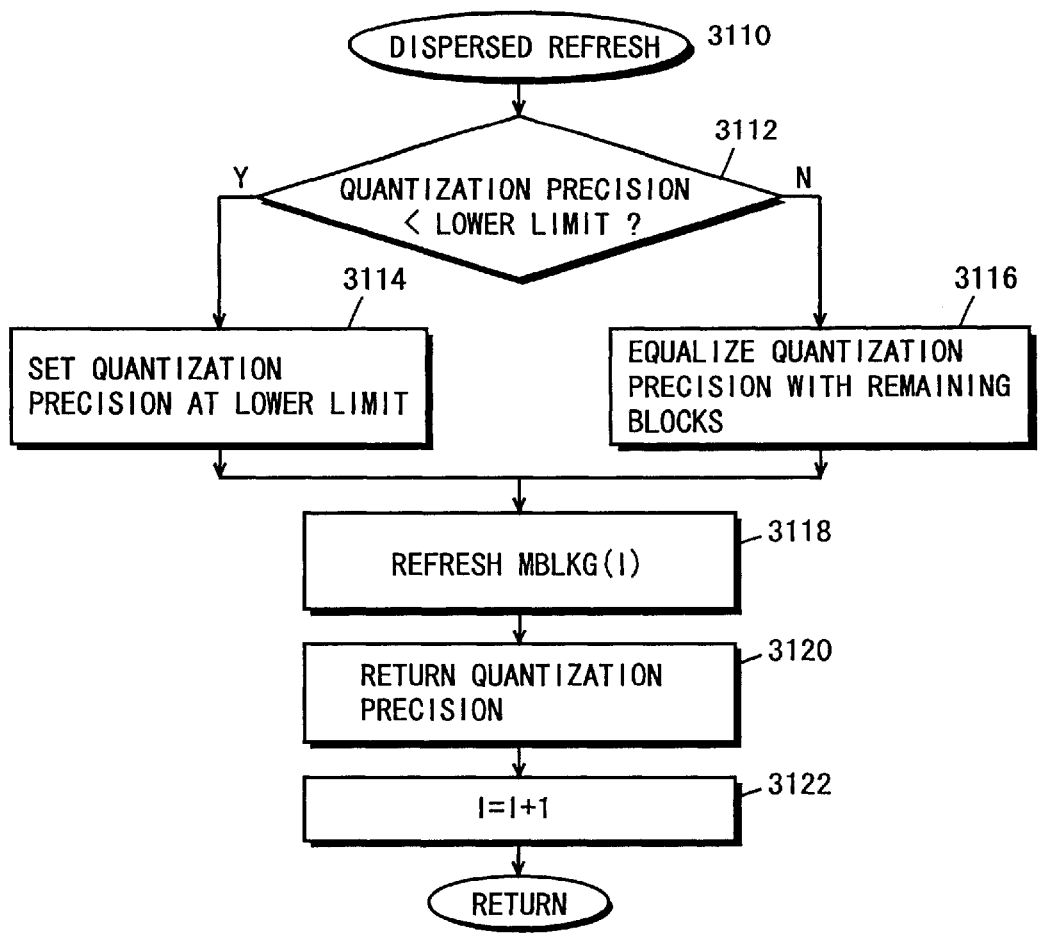
FIG. 31 a flow chart showing another example of the procedure of dispersed refresh in the second modification of the first embodiment.

FIG. 31 is a flow chart showing another exemplary procedure of dispersed refresh in the aforementioned video coding apparatus 2701c. In this example, the quantization precision control part 2712c receives timing information indicating the period of dispersed refresh from the dispersed refresh part 2707, and first determines whether or not quantization precision at the current point is lower than a previously set lower limit before coding the blocks belonging to MBLKG (I) to be refreshed in the dispersed refresh mode (step 3114). Then, the quantization precision control part 2712c controls the quantization precision in the coding part 2708 in response to the result of this determination. Namely, it sets the quantization precision at the lower limit if the quantization precision is lower than the lower limit (step 3114), while setting the quantization precision at a degree substantially identical to quantization precision for the remaining MBLKs (blocks other than those for the current dispersed refresh) (step 3116). Thereafter the MBLKs belonging to MBLKG (I) are INTRA-coded, i.e., refreshed (step 3118). After this refresh, the quantization precision is returned to that before the change (step 3120), I is incremented (step 3122), and single dispersed refresh is ended.

While the invention has been described in detail, the foregoing description is in all aspects illustrative and not restrictive. It is understood that numerous other modifications and variations can be devised without departing from the scope of the invention.

What is claimed is:

1. A video coding apparatus, dividing each frame of a motion picture into a predetermined number m of groups of blocks, for coding the motion picture while switching a coding mode between an INTER coding mode and an INTRA coding mode in units of block included in each group of blocks, comprising:

motion determination means for determining whether or not there is motion exceeding a predetermined threshold in an object in each region of said number m of groups of blocks in each frame during a lapse of a prescribed time T from a prescribed point;

whole-group refresh means for performing whole-group refresh, defined as an operation of INTRA-coding all blocks included in a group of blocks in a coding process for the same frame, on a group of blocks of a region determined by said motion determination means as having motion exceeding said threshold; and dispersed refresh means for performing dispersed refresh, defined as an operation of INTRA-coding each block included in a group of blocks in a coding process for frames varying with the block while regarding groups of blocks being in the same position in the respective frames among groups of blocks in the frames as the same group of blocks, on a group of blocks of a region determined by said motion determination means as having no motion exceeding said threshold.

2. The video coding apparatus in accordance with claim 1, wherein said whole-group refresh means performs, on the basis of a determination result by said motion determination means, whole-group refresh on a group of blocks subjected to said whole-group refresh at least MS times (MS: prescribed natural number) even after motion exceeding said threshold disappears from the object in the region of said group of blocks.

3. The video coding apparatus in accordance with claim 1, further comprising refresh timing management means for managing the timing of said whole-group refresh and said dispersed refresh so that said whole-group refresh means performs said whole-group refresh on a group of blocks of a region determined by said motion determination means as having motion exceeding said threshold in a coding process for a frame at a point after a lapse of said time T from said prescribed point and said dispersed refresh means completes said dispersed refresh on a group of blocks of a region determined by said motion determination means as having no motion exceeding said threshold during a lapse of said time T from said prescribed point.

4. The video coding apparatus in accordance with claim 3, wherein said dispersed refresh means completes, when blocks of a group of blocks being in the process of said dispersed refresh are continuously INTRA-coded at least S times (S: prescribed natural number) in frames varying with the block, said disperse refresh on said group of blocks during a lapse of a prescribed time T' longer than said time T.

5. The video coding apparatus in accordance with claim 3, wherein said dispersed refresh means divides a group of blocks to be subjected to dispersed refresh into subgroups of blocks of a number equal to a frame number corresponding to said time T and INTRA-codes one subgroup of blocks in a coding process for one frame.

6. The video coding apparatus in accordance with claim 4, wherein said dispersed refresh means divides a group of blocks to be subjected to dispersed refresh into subgroups of blocks of a number equal to a frame number corresponding to said time T' and INTRA-codes one subgroup of blocks in a coding process for one frame.

7. The video coding apparatus in accordance with claim 4, wherein said whole-group refresh means performs said whole-group refresh in a coding process for a frame at a point after a lapse of a prescribed time T'' shorter than said time T in response to the ratio of groups of blocks completely subjected to said dispersed refresh during a lapse of said prescribed time T'.

8. The video coding apparatus in accordance with claim 7, wherein said refresh timing management means calculates said prescribed time T'' in accordance with the following equation:

T''=kT(m−B)/(mk−B)

where m is said number of groups of blocks in each frame, B is the number of groups of blocks completely subjected to said dispersed refresh during a lapse of said prescribed time T' and an integer not more than in, and k is T'/T.

9. A video coding apparatus, dividing each frame of a motion picture into a predetermined number m of groups of blocks, for coding the motion picture while switching a coding mode between an INTER coding mode and an INTRA coding mode in units of block included in each group of blocks, comprising:

whole-group refresh means for performing whole-group refresh, defined as an operation of INTRA-coding all blocks included in a group of blocks in a coding process for the same frame, on one group of blocks at most with respect to each frame; and refresh timing management means for managing the timing of whole-group refresh so that a frame number Tf corresponding to an interval for performing whole-group refresh on groups of blocks being in the same position in respective frames among groups of blocks in the frames is greater than said number m.

10. The video coding apparatus in accordance with claim 3, wherein said refresh timing management means manages the timing for performing INTRA coding so that a frame number Tf corresponding to an interval for performing INTRA coding on blocks being in the same position in respective frames among blocks in the frames is greater than said number m.

11. The video coding apparatus in accordance with claim 1, further comprising refresh timing management means for managing the timing of whole-group refresh and dispersed refresh so that an interval in which INTRA coding is performed on blocks being in the same position in respective frames among blocks in the frames by said whole-group refresh means or said dispersed refresh means is said time T, wherein said motion determination means determines, on the basis of management by said refresh timing management means, whether or not there is motion exceeding said threshold in an object in each region during a lapse of said time T from a point displaced frame by frame every region of said number m of groups of blocks in each frame, and said whole-group refresh means performs, on the basis of management by said refresh timing management means, whole-group refresh on one group of blocks at most with respect to each frame.

12. The video coding apparatus in accordance with claim 9, further comprising motion determination means for determining, on the basis of management by said refresh timing management means, whether or not there is motion exceeding said threshold in an object in respective regions of said number m of groups of blocks in each frame during a lapse of said time T from a point displaced frame by frame for each of said regions, wherein said whole-group refresh means performs said whole-group refresh on a group of blocks of a region determined by said motion determination means as having motion exceeding said threshold.

13. The video coding apparatus in accordance with claim 11, wherein said motion determination means determines presence/absence of motion also with respect to a region of a group of blocks subjected to dispersed refresh by detecting whether or not there is motion exceeding said threshold in an object in respective regions of the groups of blocks during a lapse of said time T from a point displaced frame by frame for each of said regions in parallel with said dispersed refresh, said dispersed refresh means terminates, when motion exceeding said threshold is detected in an object in a region of a group of blocks being in the process of said dispersed refresh by said motion determination means, said dispersed refresh on said group of blocks, and said whole-group refresh means performs, after a lapse of said time T from a point when said dispersed refresh on a group of blocks in a region where motion exceeding said threshold is detected is started, whole-group refresh on a group of blocks of said region.

14. The video coding apparatus in accordance with claim 11, wherein said motion determination means determines presence/absence of motion by detecting whether or not there is motion exceeding said threshold in an object in respective regions of the groups of blocks during a lapse of said time T from a point displaced frame by frame for each of said regions in parallel with dispersed refresh by said dispersed refresh means, said dispersed refresh means performs said dispersed refresh on each group of blocks from a point when determination of presence/absence of motion of an object in a region of said group of blocks is started by said motion determination means and terminates said dispersed refresh on said group of blocks when motion exceeding said threshold is detected in an object in a region of a group of blocks being in the process of said dispersed refresh, and said whole-group refresh means performs, after a lapse of said time T from a point when dispersed refresh on a group of blocks of a region where motion exceeding said threshold is detected is started, whole-group refresh on the group of blocks of said region.

15. The video coding apparatus in accordance with claim 11, wherein said motion determination means divides the region of each group of blocks into a prescribed number of divided regions and detects whether or not there is motion exceeding a previously set threshold in an object every divided region thereby determining presence/absence of motion in each divided region, and said whole-group refresh means INTRA-codes, in a coding process for a frame at a point of next whole-group refresh on said group of blocks of a region including said divided region determined as having motion, all blocks in said divided region in place of said whole-group refresh.

16. The video coding apparatus in accordance with claim 11, wherein said motion determination means divides the region of each group of blocks into a prescribed number of divided regions and detects whether or not there is motion exceeding a previously set threshold in an object every divided region thereby determining presence/absence of motion in each divided region, said dispersed refresh means terminates, when a divided region included in the region of a group of blocks being in the process of said dispersed refresh is determined by said motion determination means as having motion, dispersed refresh on the group of blocks of the region including said divided region, and said whole-group refresh means INTRA-codes, in a coding process for a frame at a point of next whole-group refresh on said group of blocks of the region including said divided region determined as having motion, all blocks in said divided region in place of said whole-group refresh.

17. The video coding apparatus in accordance with claim 11, wherein said whole-group refresh means refreshes, when an object is vertically long or the object moves in the vertical direction, respective groups of blocks along the vertical direction among groups of blocks arranged in the vertical and transverse directions.

18. The video coding apparatus in accordance with claim 11, wherein said whole-group refresh means refreshes, when the object is transversely long or the object moves in the transverse direction, respective groups of blocks along the transverse direction among groups of blocks arranged in the vertical and transverse directions.

19. The video coding apparatus in accordance with claim 1, wherein said motion determination means has threshold set means for changing said threshold.

20. The video coding apparatus in accordance with claim 19, wherein said threshold set means has:

means for detecting a blur quantity of a camera or a picture, and means for setting a value varying with said blur quantity as said threshold.

21. The video coding apparatus in accordance with claim 1, further comprising coding precision control means for rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of said frame coded n frames before on the basis of a determination result by said motion determination means.

22. The video coding apparatus in accordance with claim 9, further comprising coding precision control means for rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of said frame coded n frames before on the basis of a determination result by said motion determination means.

23. The video coding apparatus in accordance with claim 1, further comprising coding precision control means for rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of said frame coded n frames before on the basis of a determination result by said motion determination means.

24. The video coding apparatus in accordance with claim 9, further comprising coding precision control means for rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of said frame coded n frames before on the basis of a determination result by said motion determination means.

25. The video coding apparatus in accordance with claim 21, wherein said coding precision control means includes quantization precision control means for rendering the picture quality of said frame to be currently coded inferior to the picture quality of said frame coded n frames before by lowering quantization precision for said frame to be currently coded.

26. The video coding apparatus in accordance with claim 23, wherein said coding precision control means includes quantization precision control means for rendering the picture quality of said frame to be currently coded superior to the picture quality of said frame coded n frames before by improving quantization precision for said frame to be currently coded.

27. The video coding apparatus in accordance with claim 1, further comprising coding precision control means for rendering the picture quality of a block to be subjected to INTRA coding among blocks included in a group of blocks to be subjected to dispersed refresh by said dispersed refresh means superior to the picture quality of the remaining blocks in a frame including said group of blocks.

28. The video coding apparatus in accordance with claim 1, further comprising coding precision control means for controlling precision of coding so that the picture quality of a block to be subjected to INTRA coding among blocks included in a group of blocks to be subjected to dispersed refresh by said dispersed refresh means does not lower below a previously set lower limit.

29. The video coding apparatus in accordance with claim 1, further comprising coding precision control means for controlling precision of coding so as to equalize, when the picture quality of a block to be subjected to INTRA coding among blocks included in a group of blocks to be subjected to dispersed refresh by said dispersed refresh means is higher than a previously set lower limit, said picture quality with the picture quality of the remaining blocks in a frame including said group of blocks and to set, when the picture quality of said block to be subjected to INTRA coding is lower than said lower limit, said picture quality at said lower limit.

30. The video coding apparatus in accordance with claim 27, wherein said coding precision control means includes quantization precision control means for rendering quantization precision for said block to be subjected to INTRA coding higher than quantization precision for the remaining blocks in said frame.

31. The video coding apparatus in accordance with claim 1, further comprising quantization precision control means for controlling quantization precision so that quantization precision for a block to be subjected to INTRA coding among blocks included in a group of blocks to be subjected to dispersed refresh by said dispersed refresh means does not lower below a previously set lower limit.

32. The video coding apparatus in accordance with claim 1, further comprising quantization precision control means for controlling quantization precision so as to equalize, when quantization precision for a block to be subjected to INTRA coding among blocks included in a group of blocks to be subjected to dispersed refresh by said dispersed refresh means is higher than a previously set lower limit, said quantization precision with quantization precision for the remaining blocks in a frame including said group of blocks and to set, when quantization precision for said block to be subjected to INTRA coding is lower than said lower limit, said quantization precision at said lower limit.

33. The video coding apparatus in accordance with claim 1, wherein each group of blocks is formed by a plurality of blocks in each of m predetermined regions in each frame.

34. The video coding apparatus in accordance with claim 9, wherein each group of blocks is formed by a plurality of blocks in each of m predetermined regions in each frame.

35. The video coding apparatus in accordance with claim 33, wherein said predetermined region is a GROUP OF BLOCKS.

36. The video coding apparatus in accordance with claim 34, wherein said predetermined region is a GROUP OF BLOCKS.

37. A video coding apparatus dividing each frame of a motion picture into a predetermined number m of groups of blocks for coding the motion picture while switching a coding mode between an INTER coding mode and an INTRA coding mode in units of block included in each group of blocks, comprising:

coding quantity determination means for determining whether or not a coding quantity resulting from coding of each group of blocks during a lapse of a prescribed time T from a prescribed point is in excess of a predetermined threshold;

whole-group refresh means for performing whole-group refresh, defined as an operation of INTRA-coding all blocks included in a group of blocks in a coding process for the same frame, on a group of blocks so determined by said coding quantity determination means that said coding quantity is in excess of said threshold; and dispersed refresh means for performing dispersed refresh, defined as an operation of INTRA-coding each block included in a group of blocks in a coding process for frames varying with the block while regarding groups of blocks being in the same position in respective frames as the same group of blocks among groups of blocks in the frames, on a group of blocks so determined by said coding quantity determination means that said coding quantity is less than said threshold.

38. A video coding apparatus, employed in a picture transmission system formed by a coding apparatus for coding motion picture and transmitting coded data of said motion picture and a decoding apparatus for receiving said transmitted coded data and decoding the same while performing detection of an error in said coded data to be decoded and transmitting error notice to said coding apparatus when an error is detected as said coding apparatus, for dividing each frame of said motion picture into a predetermined number m of groups of blocks and coding said motion picture while switching a coding mode between an INTER coding mode and an INTRA coding mode in units of block included in each group of blocks, comprising:

error receiving means for receiving said error notice;

refresh selection means for determining, when said error notice is received by said error receiving means, whether or not there is motion exceeding a predetermined threshold in an object in a region of each group of blocks in each frame coded up to a moment preceding a point of receiving of said error notice by a prescribed time RTmax and deciding performance of refresh by INTRA coding on a group of blocks of a region having motion exceeding said threshold; and whole-group refresh means for performing whole-group refresh, defined as an operation of INTRA-coding all blocks included in a group of blocks in a coding process for the same frame, on a group of blocks decided by said refresh selection means to be subjected to refresh.

39. The video coding apparatus in accordance with claim 38, further comprising dispersed refresh means for performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks decided by said refresh selection means to be subjected to refresh.

40. The video coding apparatus in accordance with claim 38, wherein said refresh selection means includes motion information storage management means for storing, in coding each frame of said motion picture, motion information indicating the magnitude of motion of an object in a region of each group of blocks in said frame, and holding said motion information from a point of coding of said frame up to a point after a lapse of a prescribed time RTmax, and determines, on the basis of said motion information held by said motion information storage management means, whether or not there is motion exceeding said threshold in an object in a region of each group of blocks in each frame coded up to a moment preceding a point of receiving of said error notice by said time RTmax.

41. The video coding apparatus in accordance with claim 38, wherein said time RTmax is the maximum value of a time from a point when any frame in said motion picture is coded up to a point when said error receiving means receives said error notice when coded data of said frame is transmitted to said decoding apparatus and an error is detected in said coded data.

42. The video coding apparatus in accordance with claim 40, further comprising time calculation means for calculating a time from a point when each frame in said motion picture is coded up to a point when said error receiving means receives said error notice when coded data of said frame is transmitted to said decoding apparatus and an error is detected in said coded data as said time RTmax every frame of said motion picture, wherein
said motion information storage management means holds said motion information on the basis of said time RTmax calculated by said time calculation means.

43. The video coding apparatus in accordance with claim 38, wherein said whole-group refresh means performs whole-group refresh, when performance of refresh for a plurality of groups of blocks being in different regions is decided by said refresh selection means, on each of said plurality of groups of blocks once while successively displacing the same frame by frame.

44. The video coding apparatus in accordance with claim 43, wherein said refresh selection means determines, when said error notice is received by said error receiving means while said whole-group refresh means performs whole-group refresh on each of said plurality of groups of blocks once while successively displacing the same frame by frame, whether or not there is motion exceeding said threshold in an object in a region of each group of blocks in each frame coded up to a moment preceding a point of said receiving by said time RTmax and additionally decides a group of blocks of a region having motion exceeding said threshold on the basis of a result of said determination as a group of blocks to be subjected to refresh, and
said whole-group refresh means performs refresh on each of a plurality of groups of blocks for which performance of refresh is decided by said refresh selection means, inclusive of a group of blocks for which performance of refresh is redundantly decided, while successively displacing the same frame by frame.

45. The video coding apparatus in accordance with claim 40, wherein said motion information storage management means stores, in coding each frame of said motion picture, prescribed motion information indicating motion exceeding said threshold as said motion information about a group of blocks subjected to whole-group refresh in said coding and holds said prescribed motion information from a point of said coding up to a point after a lapse of said time RTmax.

46. The video coding apparatus in accordance with claim 38, further comprising search range limit means for limiting, in coding of a block adjacent to a group of blocks queued to whole-group refresh, being a group of blocks to be subjected to said whole-group refresh but not yet subjected to said whole-group refresh, among blocks included in a group of blocks not subjected to said whole-group refresh, a motion vector search range so that said group of blocks queued to whole-group refresh is not referred to.

47. The video coding apparatus in accordance with claim 46, wherein said search range limit means limits the motion vector search range, in coding of a block included in each group of blocks, so that no block of a group included in blocks other than the group of blocks including the currently-coded block is referred to during a period when said whole-group refresh is performed.

48. A video coding method of dividing each frame of a motion picture into a predetermined number m of groups of blocks for coding the motion picture while switching a coding mode between an INTER coding mode and an INTRA coding mode in units of a block included in each group of blocks, comprising:
a motion determination step of determining whether or not there is motion exceeding a predetermined threshold in an object in each region of said number m of groups of blocks in each frame during a lapse of a prescribed time T from a prescribed point;
a whole-group refresh step of performing whole-group refresh, defined as an operation of INTRA-coding all blocks included in a group of blocks in a coding process for the same frame, on a group of blocks of a region determined in said motion determination step as having motion exceeding said threshold; and
a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks of a region determined in said motion determination step as having no motion exceeding said threshold.

49. The video coding method in accordance with claim 48, wherein whole-group refresh is performed on the basis of a determination result in said motion determination step at least MS times (MS: prescribed natural number) on a group of blocks subjected to said whole-group refresh even after motion exceeding said threshold disappears from an object in a region of said group of blocks.

50. The video coding method in accordance with claim 48, wherein said whole-group refresh is performed in a coding process for frames at a point after a lapse after said time T from said prescribed point, and
said dispersed refresh is completed during a lapse of said time T from said prescribed point.

51. The video coding method in accordance with claim 50, wherein, when blocks in a group of blocks being in the process of said dispersed refresh are INTRA-coded in frames varying with the block continuously in excess of S times (S: prescribed natural number), said dispersed refresh for said group of blocks is completed during a lapse of a prescribed time T' longer than said time T.

52. The video coding method in accordance with claim 51, wherein said whole-group refresh is performed in a coding process for frames at a point after a lapse after a prescribed time T" shorter than said time T in response to the rate of blocks completely subjected to said dispersed refresh during a lapse of said prescribed time T'.

53. The video coding method in accordance with claim 52, wherein said prescribed time T" is calculated in accordance with the following equation:

$$T''=kT(m-B)/(mk-B)$$

where m is said number of said groups of blocks in each frame, B is the number of groups of blocks completely subjected to said dispersed refresh during a lapse of said prescribed time T' and an integer not more than m, and k is T'/T.

54. The video coding method in accordance with claim 48, wherein a group of blocks to be subjected to said dispersed refresh is divided into subgroups of blocks of a number equal to a frame number corresponding to said time T and one subgroup of blocks is INTRA-coded in a coding process for one frame in said dispersed refresh step.

55. A video coding method, which divides each frame of a motion picture into a predetermined number m of groups of blocks, for coding the motion picture while switching a coding mode between an INTER coding mode and an INTRA coding mode in units of block included in each group of blocks, comprising:

a whole-group refresh step of performing whole-group refresh, defined as an operation of INTRA-coding all blocks included in a group of blocks in a coding process for the same frame, on one group of blocks at most with respect to each frame, wherein a frame number Tf corresponding to an interval for performing said whole-group refresh on groups of blocks being in the same position in respective frames among groups of blocks in the frames is greater than said number m.

56. The video coding method in accordance with claim 48, wherein a frame number Tf corresponding to an interval for performing INTRA coding on blocks being in the same position in respective frames among blocks in the frames is greater than said number m.

57. The video coding method in accordance with claim 48, wherein an interval in which INTRA coding is performed by said whole-group refresh or said dispersed refresh on blocks being in the same position in respective frames among blocks in the frames is said time T, a determination is made in said motion determination step as to whether or not there is motion exceeding said threshold in an object in each region during a lapse of said time T from a point displaced frame by frame every region of said number m of groups of blocks in each frame, and said whole-group refresh is performed on one group of blocks at most with respect to each frame.

58. The video coding method in accordance with claim 55, further comprising a motion determination step of determining whether or not there is motion exceeding said threshold in an object in respective regions of said number m of groups of blocks in each frame during a lapse of said time T from a point displaced frame by frame for each of said regions, wherein said whole-group refresh is performed on a group of blocks of a region determined as having motion exceeding said threshold in said whole-group refresh step.

59. The video coding method in accordance with claim 57, wherein presence/absence of motion is determined in said motion determination step by detecting whether or not there is motion exceeding said threshold in an object in respective regions of the groups of blocks during a lapse of said time T from a point displaced frame by frame for each of said regions also as to a region of a group of blocks to be subjected to said dispersed refresh in parallel with said dispersed refresh, when motion exceeding said threshold is detected in an object in a region of a group of blocks being in the process of said dispersed refresh, said dispersed refresh on said group of blocks is terminated, and after a lapse of said time T from a point when said dispersed refresh on a group of blocks of a region where motion exceeding said threshold is detected, said whole-group refresh is performed on a group of blocks of said region.

60. The video coding method in accordance with claim 57, wherein presence/absence of motion is determined in said motion determination step by detecting whether or not there is motion exceeding said threshold in an object in respective regions of the groups of blocks during a lapse of said time T from a point displaced frame by frame for each of said regions in parallel with said dispersed refresh, when said dispersed refresh on each group of blocks is performed from a point when determination of presence/absence of motion of an object in a region of said group of blocks is started and motion exceeding said threshold is detected in an object in a region of a group of blocks being in the process of said dispersed refresh, said dispersed refresh on said group of blocks is terminated, and after a lapse of said time T from a point when said dispersed refresh on a group of blocks of a region where motion exceeding said threshold is detected is started, said whole-group refresh is performed on the group of blocks of said region.

61. The video coding method in accordance with claim 57, wherein a region of each group of blocks is divided into a prescribed number of divided regions in said motion determination step and presence/absence of motion in each divided region is determined by detecting whether or not there is motion exceeding a previously set threshold in an object every divided region, and all blocks of said divided region are INTRA-coded in a coding process for a frame at a point of next whole-group refresh on said group of blocks of a region including a divided region where motion exceeding said threshold is detected.

62. The video coding method in accordance with claim 57, wherein a region of each group of blocks is divided into a prescribed number of divided regions in said motion determination step and presence/absence of motion in each divided region is determined by detecting whether or not there is motion exceeding a previously set threshold in an object every divided region, when motion exceeding said threshold is detected in an object in a divided region included in a region of a group of blocks being in the process of said dispersed refresh, dispersed refresh on the group of blocks of a region including said divided region is terminated, and all blocks of said divided region are INTRA-coded in a coding process for a frame at a point of next whole-group refresh on said group of blocks of a region including a divided region where motion exceeding said threshold is detected.

63. The video coding method in accordance with claim 57, wherein, when an object is vertically long or the object moves in the vertical direction, groups of blocks subjected to said whole-group refresh are respectively refreshed along the vertical direction among groups of blocks arranged in the vertical and transverse directions.

64. The video coding method in accordance with claim 57, wherein, when an object is transversely long or the object moves in the transverse direction, groups of blocks subjected to said whole-group refresh are respectively refreshed along the transverse direction among groups of blocks arranged in the vertical and transverse directions.

65. The video coding method in accordance with claim 48, further comprising a threshold set step of changing said threshold used in said motion determination step.

66. The video coding method in accordance with claim 65, wherein said threshold set step includes:
   a step of detecting a blur quantity of a camera or a picture, and
   a step of setting a value varying with said blur quantity as said threshold.

67. The video coding method in accordance with claim 48, further comprising a coding precision control step of rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of said frame coded n frames before on the basis of a determination result in said motion determination step.

68. The video coding method in accordance with claim 55, further comprising a coding precision control step of rendering, when a group of blocks to be subjected to whole-group refresh is included in a frame to be currently coded and no group of blocks subjected to whole-group refresh is included in a frame coded n (n: predetermined natural number) frames before, the picture quality of the frame to be currently coded inferior to the picture quality of the frame coded n frames before on the basis of a determination result in said motion determination step.

69. The video coding method in accordance with claim 48, further comprising a coding precision control step of rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of the frame coded n frames before on the basis of a determination result in said motion determination step.

70. The video coding method in accordance with claim 55, further comprising a coding precision control step of rendering, when no group of blocks to be subjected to whole-group refresh is included in a frame to be currently coded and a group of blocks subjected to whole-group refresh is included in a frame coded n (n: predetermined natural number) frames before, the picture quality of the frame to be currently coded superior to the picture quality of the frame coded n frames before on the basis of a determination result in said motion determination step.

71. The video coding method in accordance with claim 67, wherein said coding precision control step includes a quantization precision control step of rendering the picture quality of said frame to be currently coded inferior to the picture quality of said frame coded n frames before by lowering quantization precision for said frame to be currently coded.

72. The video coding method in accordance with claim 69, wherein said coding precision control step includes a quantization precision control step of rendering the picture quality of said frame to be currently coded superior to the picture quality of said frame coded n frames before by improving quantization precision for said frame to be currently coded.

73. The video coding method in accordance with claim 48, wherein said dispersed refresh step includes a coding precision control step of rendering the picture quality of a block to be subjected to INTRA coding among blocks included in a group of blocks to be subjected to said dispersed refresh superior to the picture quality of the remaining blocks in a frame including said blocks.

74. The video coding method in accordance with claim 48, wherein said dispersed refresh step includes a coding precision control step of controlling precision of coding so that the picture quality of a block to be subjected to INTRA coding among blocks included in a group of blocks to be subjected to said dispersed refresh does not lower below a previously set lower limit.

75. The video coding method in accordance with claim 48, wherein said dispersed refresh step includes a coding precision control step of controlling precision of coding for equalizing, when the picture quality of a block to be subjected to INTRA coding among blocks included in a group of blocks to be subjected to said dispersed refresh is higher than a previously set lower limit, said picture quality with the picture quality of the remaining blocks in a frame including said group of blocks and setting, when the picture quality of said block to be subjected to INTRA coding is lower than said lower limit, said picture quality at said lower limit.

76. The video coding method in accordance with claim 73, wherein said coding precision control step includes a quantization precision control step of rendering quantization precision for said block to be subjected to INTRA coding higher than quantization precision for the remaining blocks in said frame.

77. The video coding method in accordance with claim 48, wherein said dispersed refresh step includes a quantization precision control step of controlling quantization precision so that quantization precision for a block to be subjected to INTRA coding among blocks included in a group of blocks to be subjected to said dispersed refresh does not lower below a previously set lower limit.

78. The video coding method in accordance with claim 48, wherein said dispersed refresh step includes a quantization precision control step of controlling quantization precision for equalizing, when quantization precision for a block to be subjected to INTRA coding among blocks included in a group of blocks to be subjected to said dispersed refresh is higher than a previously set lower limit, said quantization precision with quantization precision for the remaining blocks in a frame including said group of blocks and setting, when quantization precision for said block to be subjected to INTRA coding is lower than said lower limit, said quantization precision at said lower limit.

79. The video coding method in accordance with claim 48, wherein each group of blocks is formed by a plurality of blocks in each of m predetermined regions in each frame.

80. The video coding method in accordance with claim 55, wherein each group of blocks is formed by a plurality of blocks in each of m predetermined regions in each frame.

81. The video coding method in accordance with claim 79, wherein said predetermined region is a GROUP OF BLOCKS.

82. The video coding method in accordance with claim 80, wherein said predetermined region is a GROUP OF BLOCKS.

83. A video coding method of dividing each frame of a motion picture into a predetermined number m of groups of blocks for coding the motion picture while switching a coding mode between an INTER coding mode and an INTRA coding mode in units of block included in each group of blocks, comprising:
   a coding quantity determination step of determining whether or not a coding quantity resulting from coding of each group of blocks during a lapse of a prescribed time T from a prescribed point is in excess of a predetermined threshold;

a whole-group refresh step of performing whole-group refresh, defined as an operation of INTRA-coding all blocks included in a group of blocks in a coding process for the same frame, on a group of blocks so determined in said coding quantity determination step that said coding quantity is in excess of said threshold; and a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same groups of blocks, on a group of blocks so determined in said coding quantity determination step that said coding quantity is less than said threshold.

84. A video coding method, employed in a picture transmission system formed by a coding apparatus for coding a motion picture and transmitting coded data of said motion picture and a decoding apparatus for receiving said transmitted coded data and decoding the same while performing detection of an error in said coded data to be decoded and transmitting error notice to said coding apparatus when an error is detected, for dividing each frame of said motion picture into a predetermined number m of groups of blocks and coding said motion picture while switching a coding mode between an INTER coding mode and an INTRA coding mode in units of block included in each group of blocks, comprising:

an error receiving step of receiving said error notice;

a refresh selection step of determining, when said error notice is received, whether or not there is motion exceeding a predetermined threshold in an object in a region of each group of blocks in each frame coded up to a moment preceding a point of receiving of said error notice by a prescribed time RTmax and deciding performance of refresh by INTRA coding on a group of blocks of a region having motion exceeding said threshold; and a whole-group refresh step of performing whole-group refresh, defined as an operation of INTRA-coding all blocks included in a group of blocks in a coding process for the same frame, on a group of blocks decided in said refresh selection step to be subjected to refresh.

85. The video coding method in accordance with claim 84, further comprising a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks decided in said refresh selection step to be subjected to refresh.

86. The video coding method in accordance with claim 84, further comprising a motion information storage step of storing, in coding each frame of said motion picture, motion information indicating the magnitude of motion of an object in a region of each group of blocks in said frame, and a hold time management step of managing a hold time for said motion information so as to hold said motion information stored in said motion information storage step at least for said time RTmax, wherein a determination is made in said refresh selection step on the basis of said motion information whose hold time is managed as to whether or not there is motion exceeding said threshold in an object in a region of each group of blocks in each frame coded up to a moment preceding a point of receiving of said error notice by said time RTmax.

87. The video coding method in accordance with claim 84, wherein said time RTmax is the maximum value of a time from a point when any frame in said motion picture is coded up to a point when said error notice is received by said coding apparatus when coded data of said frame is transmitted to said decoding apparatus and an error is detected in said coded data.

88. The video coding method in accordance with claim 86, further comprising a time calculation step of calculating a time from a point when each frame in said motion picture is coded up to a point when said error notice is received by said coding apparatus when coded data of said frame is transmitted to said decoding apparatus and an error is detected in said coded data, wherein the hold time for said motion information is managed in said hold time management step employing said time calculated in said time calculation step as said prescribed time RTmax.

89. The video coding method in accordance with claim 84, wherein, when performance of refresh on a plurality of groups of blocks being in different regions is decided in said refresh selection step, each of said plurality of groups of blocks is performed whole-group refresh once while being successively displaced frame by frame.

90. The video coding method in accordance with claim 89, wherein, when said error notice is received while each of said plurality of groups of blocks is performed whole-group refresh once while being successively displaced frame by frame, whether or not there is motion exceeding said threshold in an object of a region of each group of blocks in each frame coded up to a moment preceding a point of said receiving by said time RTmax is determined in said refresh selection step and a group of blocks of a region having motion exceeding said threshold is additionally decided as a group of blocks to be subjected to refresh on the basis of a result of said determination, and each of a plurality of groups of blocks for which performance of refresh is decided in said refresh selection step, inclusive of a group of blocks for which performance of refresh is redundantly decided, is performed whole-group refresh once while being successively displaced frame by frame.

91. The video coding method in accordance with claim 86, wherein prescribed motion information indicating motion exceeding said threshold is stored in said motion information storage step in coding each frame of said motion picture as said motion information about a group of blocks subjected to whole-group refresh in said coding, and said prescribed motion information is held by management of said hold time in said hold time management step from a point of said coding up to a point after a lapse of at least said prescribed time RTmax.

92. The video coding method in accordance with claim 84, further comprising a search range limit step of limiting, in coding of a block adjacent to a group of blocks queued to whole-group refresh, being a group of blocks to be subjected to said whole-group refresh but not yet subjected to said whole-group refresh, among blocks included in a group of blocks not subjected to said whole-group refresh, a motion vector search range so that said group of blocks queued to whole-group refresh is not referred to.

93. The video coding method in accordance with claim 92, wherein the motion vector search range is so limited in said search range limit step, in coding of a block included in each group of blocks, that no block included in a group of blocks other than the group of blocks including the currently-coded block is referred to during a period when said refresh is performed.

94. A storage medium containing a video coding program thereon for dividing each frame of a motion picture into a predetermined number m of groups of blocks and coding the motion picture while switching a coding mode between an INTER coding mode and an INTRA coding mode in units of block included in each group of blocks as a program executed in a computer unit, said storage medium containing said video coding program recorded thereon for implementing on said computer unit operating environment including:

a motion determination step of determining whether or not there is motion exceeding a predetermined threshold in an object in each region of said number m of groups of blocks in each frame during a lapse of a prescribed time T from a prescribed point;

a whole-group refresh step of performing whole-group refresh, defined as an operation of INTRA-coding all blocks included in a group of blocks in a coding process for the same frame, on a group of blocks of a region determined in said motion determination step as having motion exceeding said threshold; and a dispersed refresh step of performing dispersed refresh, defined as an operation of INTRA-coding each block included in a group of blocks while regarding groups of blocks being in the same position in respective frames among groups of blocks in the frames as the same group of blocks in a coding process for frames varying with the block, on a group of blocks of a region determined in said motion determination step as having no motion exceeding said threshold.

95. A storage medium containing a video coding program thereon for dividing each frame of a motion picture into a predetermined number m of groups of blocks and coding the motion picture while switching a coding mode between an INTER coding mode and an INTRA coding mode in units of block included in each group of blocks as a program executed in a computer unit, said storage medium containing said video coding program recorded thereon for implementing on said computer unit operating environment including:

a whole-group refresh step of performing whole-group refresh, defined as an operation of INTRA-coding all blocks included in a group of blocks in a coding process for the same frame, on one group of blocks at most with respect to each frame, wherein a frame number Tf corresponding to an interval for performing said whole-group refresh on groups of blocks being in the same position in respective frames among groups of blocks in the frames is greater than said number m.

96. A storage medium containing a video coding program thereon for dividing each frame of a motion picture into a predetermined number m of groups of blocks and coding the motion picture while switching a coding mode between an INTER coding mode and an INTRA coding mode in units of block included in each group of blocks as a program executed in a computer unit, said storage medium containing said video coding program recorded thereon for implementing on said computer unit operating environment including:

a coding quantity determination step of determining whether or not a coding quantity resulting from coding of each group of blocks during a lapse of a prescribed time T from a prescribed point is in excess of a predetermined threshold;

a whole-group refresh step of performing whole-group refresh, defined as an operation of INTRA-coding all blocks included in a group of blocks in a coding process for the same frame, on a group of blocks so determined in said coding quantity determination step that said coding quantity is in excess of said threshold; and a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks so determined in said coding quantity determination step that said coding quantity is less than said threshold.

97. A storage medium containing a video coding program thereon, employed in a picture transmission system formed by a coding apparatus for coding a motion picture and transmitting coded data of said motion picture and a decoding apparatus for receiving transmitted said coded data and decoding the same while performing detection of an error in said coded data to be decoded and transmitting error notice to said coding apparatus when an error is detected, for dividing each frame of said motion picture into a predetermined number m of groups of blocks and coding said motion picture while switching a coding mode between an INTER coding mode and an INTRA coding mode in units of block included in each group of blocks as a program executed on a computer unit, said storage medium containing said video coding program recorded thereon for implementing on said computer unit operating environment including:

an error receiving step of receiving said error notice;

a refresh selection step of determining, when said error notice is received, whether or not there is motion exceeding a predetermined threshold in an object in a region of each group of blocks in each frame coded up to a moment preceding a point of receiving of said error notice by a prescribed time RTmax and deciding performance of refresh by INTRA coding on a group of blocks of a region having motion exceeding said threshold; and a whole-group refresh step of performing whole-group refresh, defined as an operation of INTRA-coding all blocks included in a group of blocks in a coding process for the same frame, on a group of blocks decided in said refresh selection step to be subjected to refresh.

98. The storage medium in accordance with claim 97, containing a video coding program thereon for implementing on said computer unit operating environment further including a dispersed refresh step of performing dispersed refresh, defined as an operation of INTRA-coding each block included in a group of blocks in a coding process for frames varying with the block while regarding groups of blocks being in the same position in respective frames among groups of blocks in the frames as the same group of blocks, on a group of blocks other than a group of blocks for which performance of refresh is decided in said refresh selection step.

* * * * *